US012660731B2

(12) United States Patent
Miyashita et al.

(10) Patent No.: US 12,660,731 B2
(45) Date of Patent: Jun. 23, 2026

(54) AGRICULTURAL MACHINE

(71) Applicant: Kubota Corporation, Osaka (JP)

(72) Inventors: Shunsuke Miyashita, Sakai (JP); Toru Tambo, Sakai (JP); Mitsuaki Nagao, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 50 days.

(21) Appl. No.: 18/735,270

(22) Filed: Jun. 6, 2024

(65) Prior Publication Data

US 2024/0315159 A1 Sep. 26, 2024

Related U.S. Application Data

(63) Continuation of application No. PCT/JP2022/045040, filed on Dec. 7, 2022.

(30) Foreign Application Priority Data

Dec. 24, 2021 (JP) ................................ 2021-210081
Dec. 24, 2021 (JP) ................................ 2021-210082

(51) Int. Cl.
  *A01B 69/04* (2006.01)
  *G05D 1/22* (2024.01)
  *G06V 20/10* (2022.01)
  *G05D 109/10* (2024.01)

(52) U.S. Cl.
  CPC ............. *A01B 69/008* (2013.01); *G05D 1/22* (2024.01); *G06V 20/10* (2022.01); *G05D 2109/10* (2024.01)

(58) Field of Classification Search
  None
  See application file for complete search history.

(56) References Cited

U.S. PATENT DOCUMENTS

2018/0373259 A1* 12/2018 Aberle ..................... B62D 1/28
2022/0381920 A1 12/2022 Kano
2023/0094371 A1* 3/2023 Varma Bhupatiraju .....................
                                              B60W 40/10
                                              701/1

FOREIGN PATENT DOCUMENTS

JP 2016-146061 A 8/2016
JP 2016-208871 A 12/2016
JP 2021-65115 A 4/2021

OTHER PUBLICATIONS

Official Communication issued in International Patent Application No. PCT/JP2022/045040, mailed on Feb. 21, 2023.

* cited by examiner

*Primary Examiner* — Tamara L Weber
(74) *Attorney, Agent, or Firm* — Keating & Bennett, LLP

(57) ABSTRACT

An agricultural machine includes an image recognition system to detect a row region including at least one of a crop and a ridge on a ground surface of a field, traveling equipment including a wheel responsible for steering, a controller configured or programmed to control the traveling equipment, and a start switch to give a command to start row-following travel where the controller is configured or programmed to control the traveling equipment to travel along the row region as detected by the image recognition system.

12 Claims, 30 Drawing Sheets

40

42

SCANNING LINE POSITION

SCANNING LINE POSITION

SCANNING LINE POSITION

AGRICULTURAL MACHINE

CROSS REFERENCE TO RELATED APPLICATIONS

This application claims the benefit of priority to Japanese Patent Application Nos. 2021-210081 and 2021-210082 filed on Dec. 24, 2021 and is a Continuation Application of PCT Application No. PCT/JP2022/045040 filed on Dec. 7, 2022. The entire contents of each application are hereby incorporated herein by reference.

BACKGROUND OF THE INVENTION

1. Field of the Invention

The present disclosure relates to agricultural machines.

2. Description of the Related Art

Research and development has been directed to the automation of work vehicles, such as tractors, to be used in fields. For example, work vehicles have been put to practical use which travel via automatic steering by utilizing a positioning system capable of precise positioning, e.g., GNSS (Global Navigation Satellite System). Work vehicles that automatically perform speed control as well as automatic steering have also been put to practical use.

Moreover, vision guidance systems are being developed which detect rows of crops (crop rows) or ridges in a field by using an imaging device such as a camera, and control the travel of a work vehicle along the detected crop rows or ridges.

Japanese Laid-Open Patent Publication No. 2016-208871 discloses a work machine that travels along a ridge in cultivated land where crops are planted in ridges which are formed in rows. Japanese Laid-Open Patent Publication No. 2016-208871 describes binarizing a raw image acquired by capturing cultivated land from obliquely above with an onboard camera, and thereafter generating a planar perspective projection image.

SUMMARY OF THE INVENTION

When an agricultural machine utilizes an image recognition technique in order to travel along a row region such as a crop row or ridge via automatic steering, it is necessary to ensure, through determination of the row region with high positional accuracy, that the wheels will not travel on or contact the crop row or ridge.

Example embodiments of the present invention provide agricultural machines that can solve such problems.

In an illustrative, non-limiting example embodiment, an agricultural machine according to the present disclosure includes an image recognition system to detect, from an acquired image, a row region including at least one of a crop and a ridge on a ground surface of a field; traveling equipment including a wheel responsible for steering; a controller configured or programmed to control the traveling equipment; and a start switch to give a command to start row-following travel where the controller is configured or programmed to control the traveling equipment to travel along the row region as detected by the image recognition system, wherein the controller is configured or programmed to determine whether row-following travel is possible or not based on a result of detection by the image recognition system, and if the row-following travel is possible, start row-following travel in response to the command from the start switch to start row-following travel, and if row-following travel is not possible, does not start row-following travel even in the presence of the command from the start switch to start row-following travel.

In another illustrative, non-limiting example embodiment, an agricultural machine according to the present disclosure includes an image recognition system to detect, from an acquired image, at least one of a crop and a ridge on a ground surface of a field, and to determine a row region based on the at least one of a crop and a ridge detected; traveling equipment including a wheel responsible for steering; a command generator to command the image recognition system to perform computation to determine the row region with the image recognition system; and a controller configured or programmed to perform row-following travel by causing the traveling equipment to travel along the row region as determined by the image recognition system.

General or specific aspects of various example embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to example embodiments of the present disclosure, in situations where agricultural machines have a position and orientation such that it is difficult perform row-following travel, row-following travel is prevented from starting to prevent crop rows or ridges from being traveled on and crushed under wheels.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
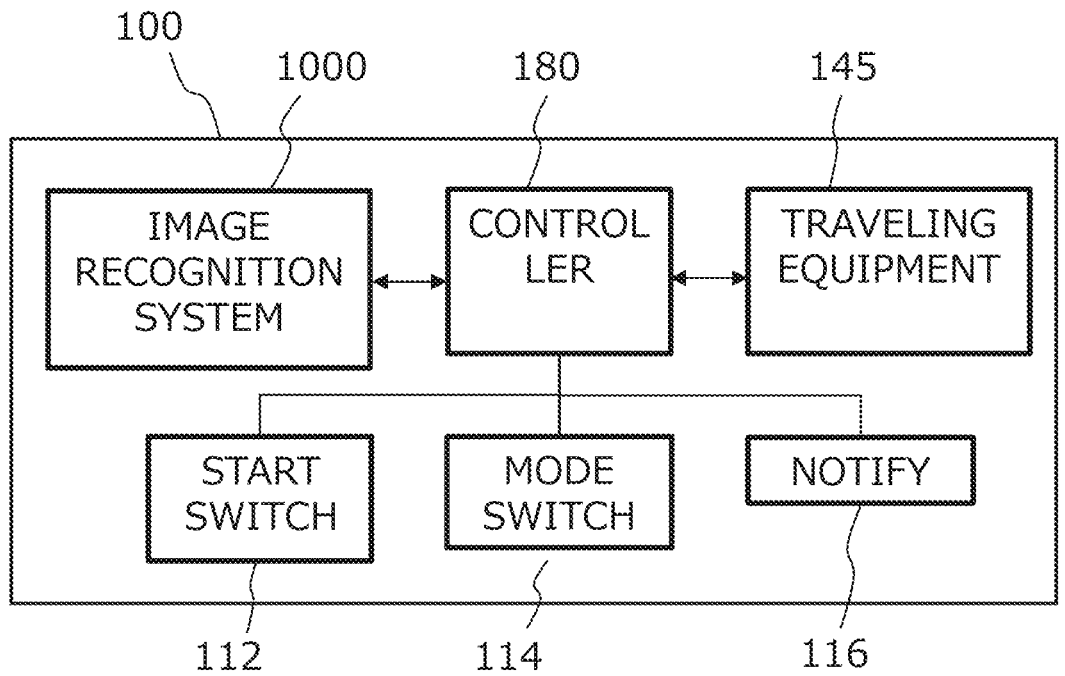
FIG. 1 is a block diagram schematically showing an example of a basic configuration of an agricultural machine according to the present disclosure.

Hereinafter, example embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, elements, features, characteristics, etc., having identical or similar functions are denoted by identical reference numerals.

The following example embodiments are only exemplary, and the techniques according to the present disclosure is not limited to the following example embodiments. For example, numerical values, shapes, materials, steps, and orders of steps, layout of a display screen, etc., that are indicated in the following example embodiments are only exemplary, and various modifications are possible so long as it makes technological sense. Any one implementation may be combined with another so long as it makes technological sense to do so.

As used in the present disclosure, an "agricultural machine" broadly includes any machine that performs basic tasks of agriculture, e.g., "tilling", "planting", and "harvesting", in fields. An agricultural machine is a machine that has a functionality and structure to perform agricultural operations such as tilling, seeding, preventive pest control, manure spreading, planting of crops, or harvesting for the ground surface within a field. Such agricultural work, tasks, or operations may be referred to as "groundwork", or simply as "work", "tasks", or "operations". Not only does a work vehicle, such as a tractor, function as an "agricultural machine" by itself alone, but an implement that is attached to or towed by a work vehicle and the work vehicle may as a whole function as one "agricultural machine". Examples of agricultural machines include tractors, vehicles for crop management, vegetable transplanters, mowers, and field-moving robots.

Prior to specifically describing example embodiments of the present disclosure, an example of a basic configuration and operation of an agricultural machine according to the present disclosure will be described.

Figure 2:
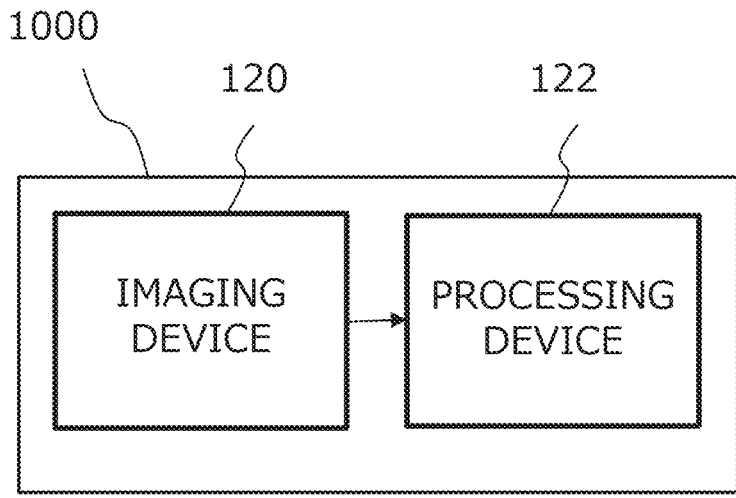
FIG. 2 is a block diagram showing an example configuration of an image recognition system.

FIG. 1 is a block diagram schematically showing an example of a basic configuration of an agricultural machine according to the present disclosure. The agricultural machine 100 in this example includes an image recognition system 1000, traveling equipment including a wheel(s) responsible for steering 145, and a controller 180 to control the traveling equipment 145. As shown in FIG. 2, for example, the image recognition system 1000 includes an imaging device 120 (e.g., a camera) mounted on the agricultural machine 100 and a processing device 122 that can be implemented by at least one computer. The image recognition system 1000 is configured or programmed to detect a row region including at least one of a crop and a ridge that is made on a ground surface of a field from images acquired by the imaging device 120. A method of row region detection by the image recognition system 1000 will be described later in detail.

Apart from traveling by usual manual steering, the agricultural machine 100 according to the present disclosure is also able to perform "row-following travel". "Row-following travel" means that the image recognition system 1000 travels along a detected row region via automatic steering. Under the row-following travel mode, the controller 180 controls the traveling equipment 145 to travel along a row region that is detected by the image recognition system 1000. The orientation of the wheels responsible for steering during row-following travel is automatically controlled by, e.g., a steering motor, without any person manipulating the steering wheel. Such row-following travel is performed by the controller 180 controlling the traveling equipment 145 so that the wheels included in the traveling equipment (i.e., all wheels, including the wheels responsible for steering) move through a region between two adjacent row regions (a work path). Therefore, during row-following travel, the image recognition system 1000 is able to monitor the relationship between the position(s) of a row region(s) to be followed (e.g., the position(s) of the "edge(s)" of the row region(s)) and the wheels, with a high accuracy on the order of several centimeters.

In the present disclosure, a "wheel" means a "tired wheel" or a "wheel with a track around it". Hereinafter, the term "tire" will be used to refer to the tire portion of a wheel, for example, whereas the term "metal wheel" will be used to refer to the metallic "wheel" portion, for example.

Thus, the image recognition system 1000 is configured or programmed to not only detect a row region from within an image, but also calculate the relative position of a detected row region against the agricultural machine 100 through computation, with a high accuracy. The relative position of a row region against the agricultural machine 100 may be the coordinates of the row region in a local coordinate system that is fixed to the agricultural machine 100, for example. When performing row-following travel, the coordinates of a row region do not need to be converted into coordinates in a world coordinate system that is fixed to the ground. Therefore, the agricultural machine 100 during row-following travel does not need to accurately measure its own position in a world coordinate system (e.g., latitude and longitude). However, in the case where the agricultural machine 100 includes a localization device, the coordinates of a row region in a local coordinate system that is fixed to the agricultural machine 100 may be converted into coordinates in a world coordinate system that is fixed to the ground, thereby generating a map of row regions.

As shown in FIG. 1, the agricultural machine 100 according to the present disclosure includes a start switch 112 to give a command to start row-following travel. More specifically, the start switch 112 gives a command to start row-following travel, in response to which the controller 180 controls the traveling equipment 145 to travel along a row region that is detected by the image recognition system 1000. Although the start switch 112 is illustrated as being connected to the controller 180 in the example of FIG. 1, the start switch 112 may be connected to the image recognition system 1000.

Figure 3:
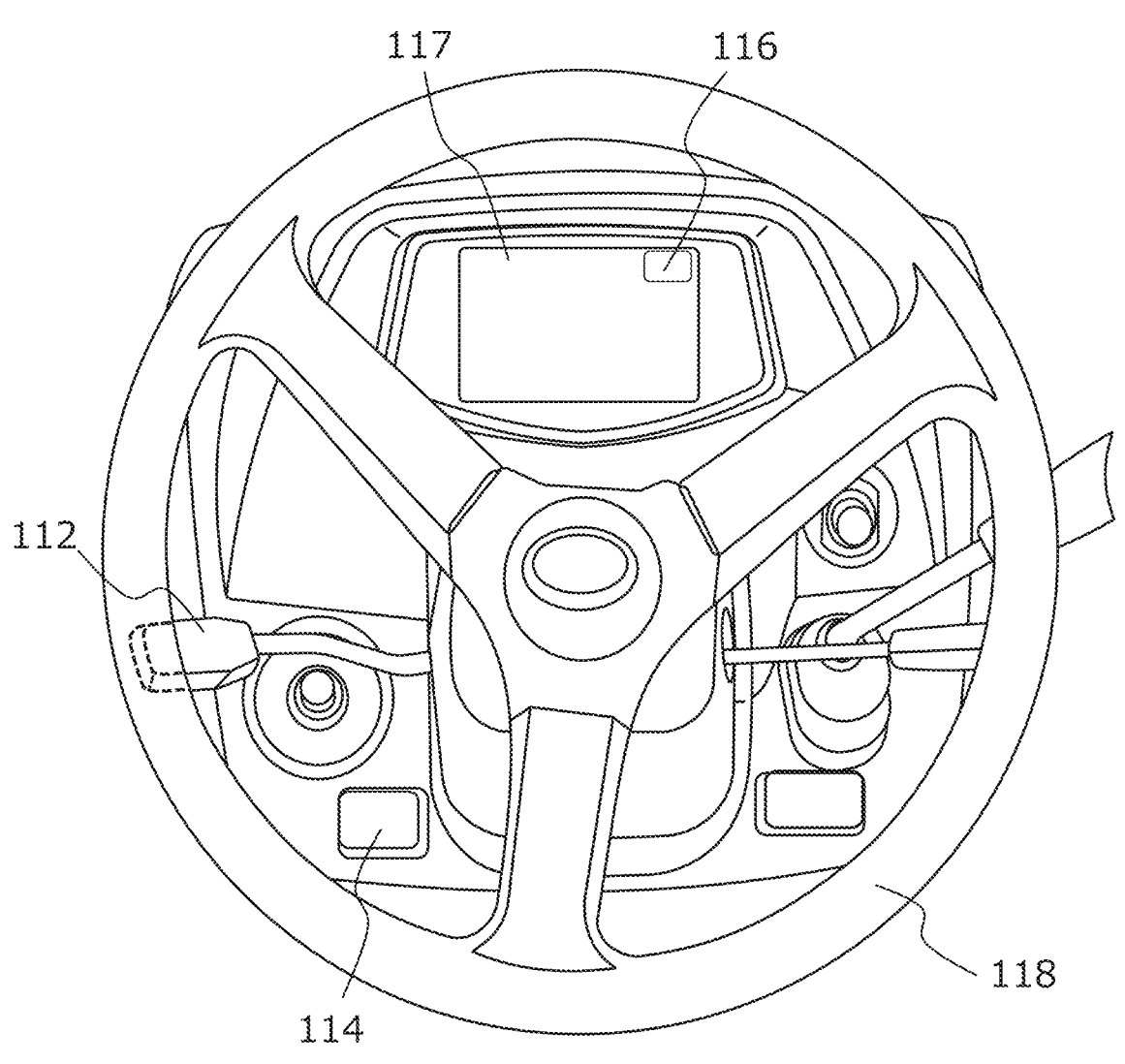
FIG. 3 is a diagram schematically showing an example where a start switch is provided in the neighborhood of a steering wheel of the agricultural machine.

The start switch 112 may be provided near the driver's seat of the agricultural machine 100, or in the neighborhood of the steering wheel. FIG. 3 is a diagram schematically showing an example where the start switch 112 is provided in the neighborhood of the steering wheel 118 of the agricultural machine 100. In this example, the start switch 112 is a lever that is capable of shifting in upper, lower, front, and rear directions from a neutral position, for example. The start switch 112 is one of the structures to be manipulated by a driver of the agricultural machine 100. Various switches to be manipulated by the driver are provided in the agricultural machine 100. Hereinafter, the driver of the agricultural machine 100 will be referred to as the "operator".

FIG. 1 is referred to again. The controller 180 is configured or programmed to determine whether row-following travel is possible or not based on a result of detection by the image recognition system 1000. When row-following travel is possible, the controller 180 starts row-following travel in response to a command to start row-following travel from the start switch 112. However, if row-following travel is not possible, even if a command to start row-following travel from the start switch 112 is given, the controller 180 does not start row-following travel.

In one implementation, if the image recognition system 1000 detects a row region and also detects a work path region having a predetermined width or greater on both sides or one side of the row region, the controller 180 determines whether the wheels responsible for steering are able to pass through the work path region or not based on the positions of the wheels responsible for steering. Then, if it is decided that the wheels responsible for steering are able to pass through the work path region, the controller 180 determines that row-following travel is possible. For example, if the detected work path region has a width which is equal to or greater than the width of the wheels responsible for steering, and the positions of the wheels responsible for steering are within the work path region, the controller 180 determines that row-following travel is possible. In doing this, it may be determined that row-following travel is possible when the orientation of the wheels responsible for steering makes an angle of a predetermined value or smaller with respect to the row region.

Figure 4:
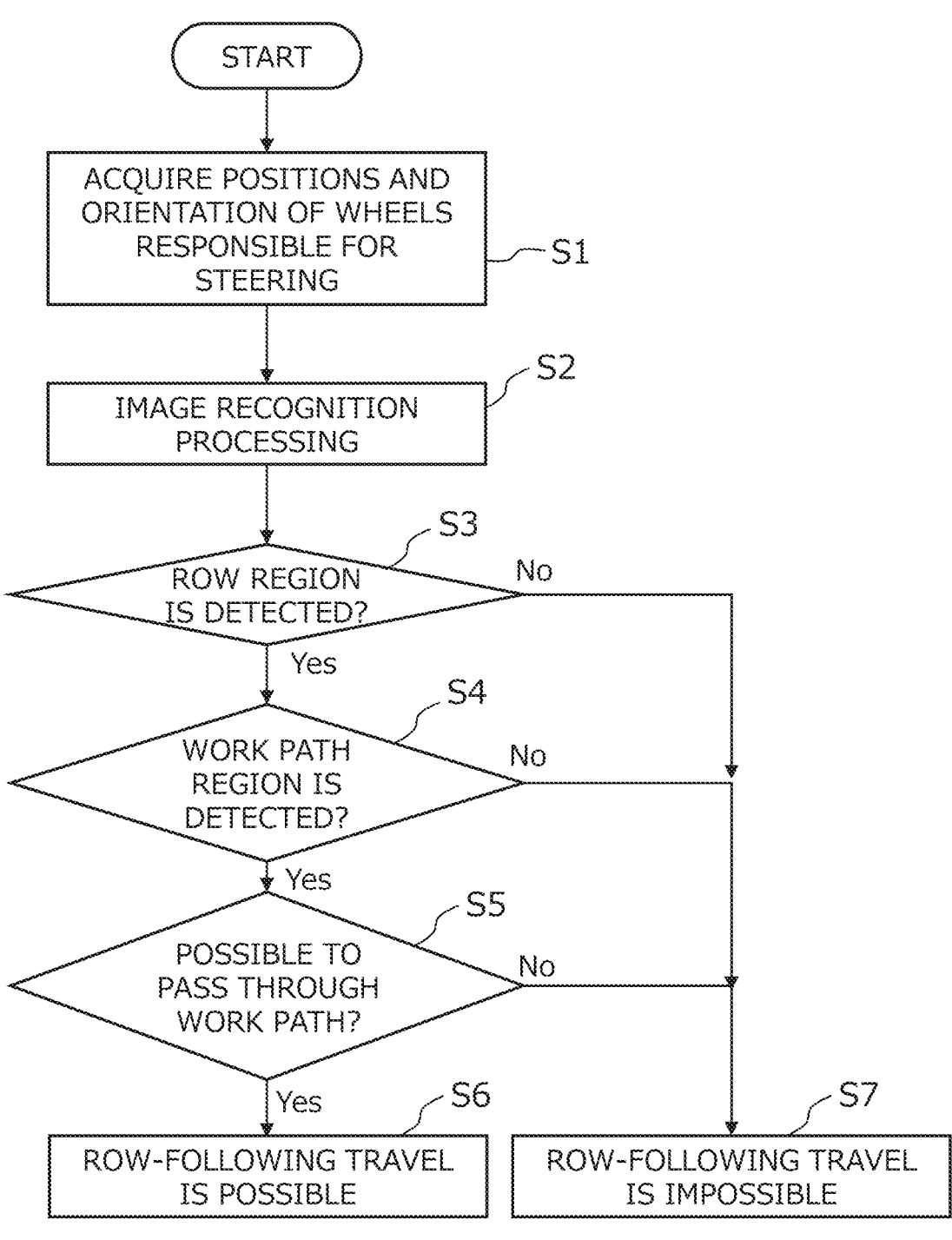
FIG. 4 is a flowchart showing an example procedure of determining whether row-following travel is possible or not.

Hereinafter, with reference to FIG. 4, a procedure of the above determination will be described. FIG. 4 is a flowchart showing an example procedure of determining whether row-following travel is possible or not.

First, at step S1, the controller 180 acquires the positions and orientation of the wheels responsible for steering of the agricultural machine 100. The relative position (coordinate values in a coordinate system that is fixed to the agricultural machine 100) of the wheels responsible for steering with respect to the agricultural machine 100 may have known values which are in accordance with the model of the agricultural machine 100. In this example, the wheels responsible for steering are the right and left front wheels. The right and left rear wheels respectively move on paths that are traveled by the right and left front wheels. The operator may input the positions of wheels, including the wheels responsible for steering, to the controller 180 in advance. Measurement values of the orientation of the wheels responsible for steering may be fed from a steering angle sensor (angle-of-turn sensor) to the controller 180, for example.

At step S2, image recognition processing by the image recognition system 1000 is begun. Specifically, the controller 180 causes the image recognition system 1000 to begin image recognition processing. The image recognition processing may include finding a row region from an image that is acquired by the imaging device 120 (FIG. 2), detecting a region between adjacent row regions (work path), and performing computation to determine the relative position of a row region with respect to the agricultural machine 100 ("determining a row region"), and so on. Steps S1 and step S2, which may be performed simultaneously, may be performed in any order not limited to the example of FIG. 4.

At step S3, the image recognition system 1000 determines whether a row region has been detected or not. If a row region is detected (Yes), control proceeds to step S4; if no row region is detected (No), control proceeds to step S7. When proceeding to step S7, it is decided that row-following travel is impossible. Note that the determination as to whether row-following travel is possible or not is made by the controller 180 based on a result of detection by the image recognition system 1000.

At step S4, it is determined whether a work path region has been detected or not. If a work path region is detected (Yes), control proceeds to step S5; if no work path region is detected (No), control proceeds to step S7.

At step S5, based on the positions and orientation of the wheels responsible for steering, the controller 180 determines whether all wheels, including the wheels responsible for steering, are able to pass through the work path region or not. Specifically, it may be determined whether the positions of the wheels responsible for steering are located within the work path region and whether the orientation of the wheels responsible for steering matches the direction in which the work path extends or not. If it is possible to pass (Yes), control proceeds to step S6; if it is impossible to pass (No), control proceeds to step S7. When proceeding to step S6, it is decided that row-following travel is possible.

As mentioned earlier, if row-following travel is not possible, even if a command to start row-following travel is given from the start switch 112, the controller 180 does not start row-following travel.

The agricultural machine 100 may include a notifier to notify the operator as to whether row-following travel is possible or not. Examples of such a notifier include a display device that displays an icon, text, or a symbol; a light emitting device such as an LED; and an acoustic device that emits a sound or vibration, such as a buzzer or a loudspeaker. For example, when row-following travel is possible, an icon, text, or a symbol indicating that "ROW-FOLLOWING TRAVEL IS POSSIBLE" may be displayed on the screen of the display device, and when row-following travel is impossible, an icon, text, or a symbol indicating that "ROW-FOLLOWING TRAVEL IS NOT POSSIBLE" may be displayed in the screen of the display device. Furthermore, when row-following travel is impossible, if the start switch 112 has been manipulated by the operator to give a command to start row-following travel, a voice that "ROW-FOLLOWING TRAVEL IS CURRENTLY NOT POSSIBLE", for example, may be issued from the acoustic device, or this text may be displayed on the display device.

In the example of FIG. 3, a symbol indicating whether or not "row-following travel" is possible may be displayed as a notification 116 on a display device 117 that is located in the neighborhood of the steering wheel 118.

Figure 5:
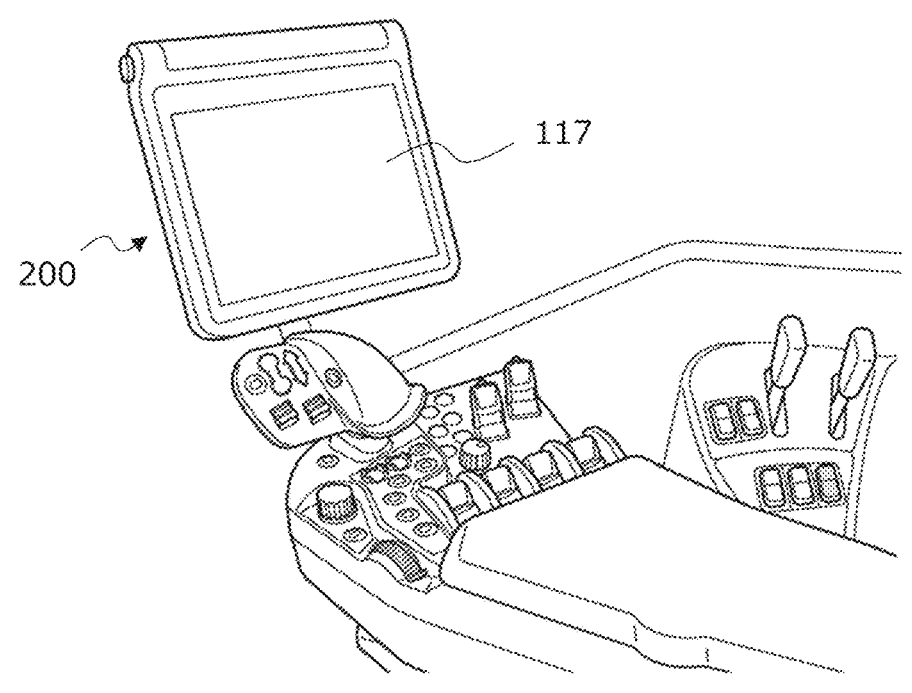
FIG. 5 is a perspective view showing another example of a display device.
Figure 6:
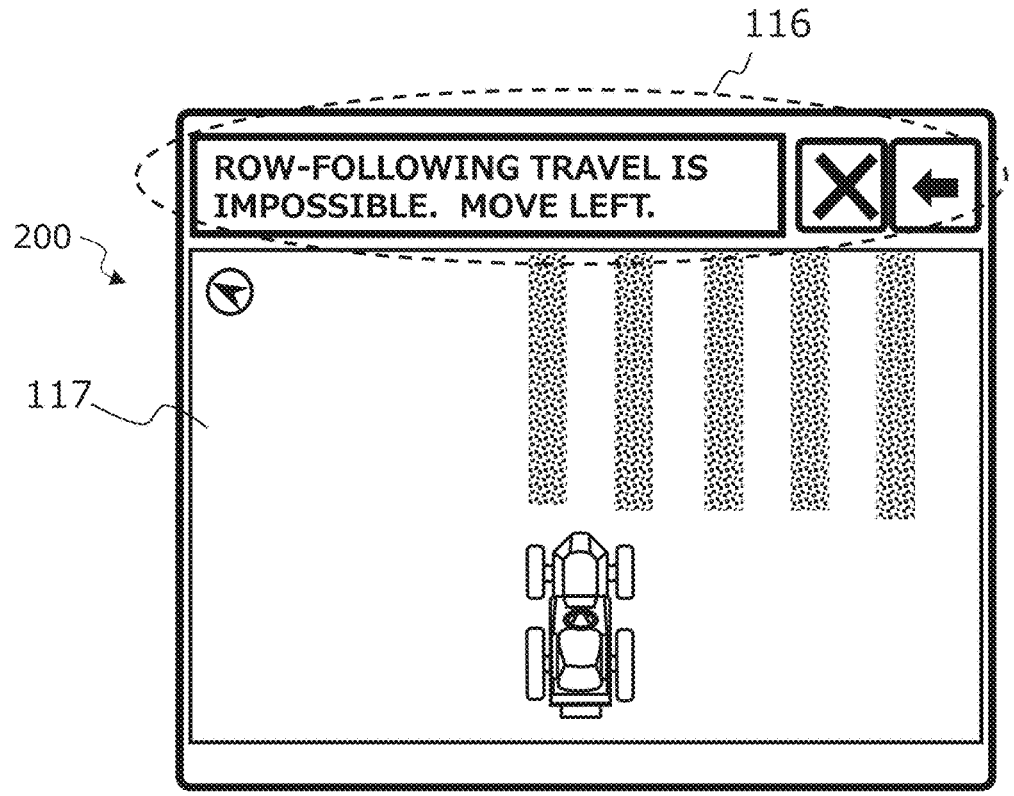
FIG. 6 is a diagram showing an example screen on which a text, symbol, or other notification indicating whether row-following travel is possible or not is displayed.

FIG. 5 is a perspective view showing an example of the display device 117. The display device 117 may be included in an operational terminal 200 that is provided in the neighborhood of the driver's seat. On the display device 117 of this operational terminal 200, as shown in FIG. 6, a text, symbol, or other notification 116 indicating whether or not row-following travel is possible is displayed. In FIG. 6, row regions being displayed on the display device 117 are schematically depicted as hatched bar regions.

As shown in FIG. 1 and FIG. 3, the agricultural machine 100 may include a mode switch 114 to switch between an automatic steering mode and a manual steering mode. When the automatic steering mode is selected with the mode switch 114, the controller 180 is able to permit row-following travel to be started with the start switch 112. Specifically, when the automatic steering mode is selected with the mode switch 114, a steering motor for automatic steering may begin to be powered, for example. Also, the image recognition system 1000 may be configured or programmed to, when the automatic steering mode is selected with the mode switch 114, start image recognition processing to detect row regions. In FIG. 4, "START" may be carried out in response to the automatic steering mode becoming selected with the mode switch 114.

The image recognition system 1000 may be configured or programmed to, when the image recognition system 1000 starts image recognition processing in response to the automatic steering mode becoming selected with the mode switch 114, perform the image processing separately in a plurality of steps. Such processing will be described later.

In the example of FIG. 3, the mode switch 114 is provided in the neighborhood of the steering wheel 118. In this example, the mode switch 114 is a push button. The mode switch 114 is switched from an OFF state to an ON state in order to switch from the manual steering mode to the automatic steering mode, for example. Conversely, it is switched from an ON state to an OFF state in order to switch from the automatic steering mode to the manual steering mode. In other words, the mode switch 114 is a switch that defines the start and the end of the automatic steering mode. However, in the present disclosure, the start of the automatic steering mode does not mean immediately starting row-following travel via automatic steering. As described earlier, if it is determined row-following travel is possible based on the result of detection by the image recognition system 1000 and if the operator gives a command to start row-following travel with the start switch 112, then the controller 180 starts row-following travel.

In one example embodiment, while in the automatic steering mode and when row-following travel is possible, if the operator shifts the start switch 112 downward from the neutral position, for example, row-following travel is started. During row-following travel, if the operator shifts the start switch 112 upward from the neutral position, for example, a signal from the start switch 112 that was commanding row-following travel to be started may cease to be output, or a signal commanding that row-following travel be stopped may be output from the start switch 112. Thus, although the start switch 112 is a switch to activate the functionality of row-following travel of the agricultural machine 100, the controller 180 according to an example embodiment of the present disclosure is configured or programmed not to immediately start row-following travel even if a command to start row-following travel is given from the start switch 112. As described above, the image recognition system 1000 determines whether row-following travel is possible or not, and validates the command from the start switch 112 only when it is determined that row-following travel is possible. This process and operation prevents row-following travel from starting when row-following travel is not possible, thus making it possible to avoid crop rows or ridges from being traveled on and crushed under the wheels.

During row-following travel, the traveling speed of the agricultural machine 100 may be controlled based on the position of operation members that are manipulated by the operator, e.g., an accelerator pedal and a brake pedal. However, the traveling speed of the agricultural machine 100 may also be automatically controlled by the controller 180.

Figure 7:
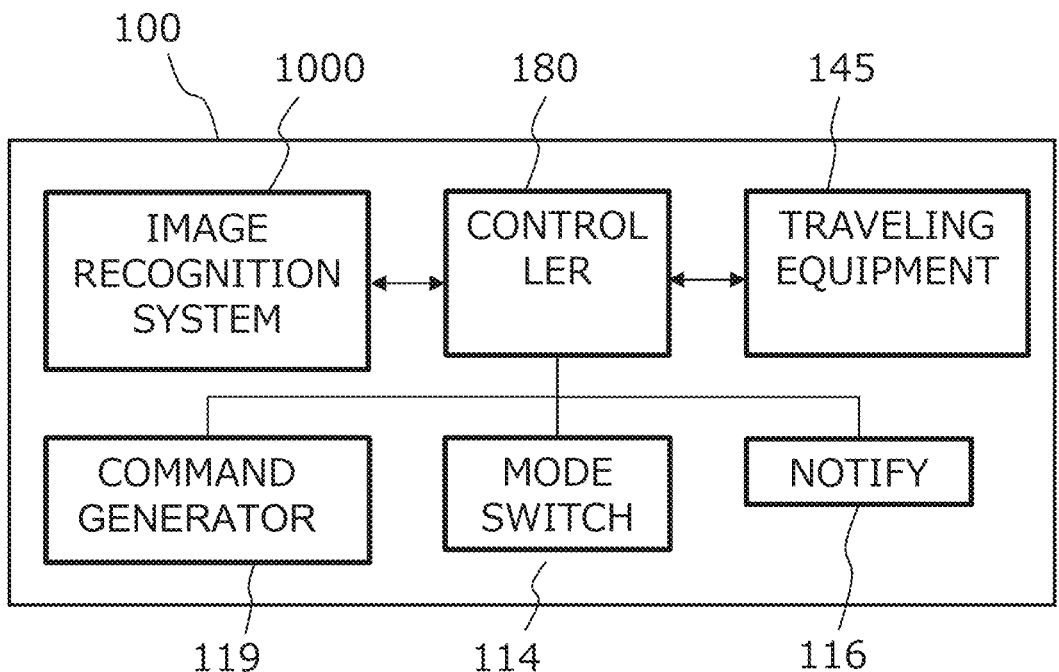
FIG. 7 is a block diagram schematically showing another example of a basic configuration of an agricultural machine according to the present disclosure.

FIG. 7 is a block diagram schematically showing another example of a basic configuration of an agricultural machine according to the present disclosure.

Similarly to the agricultural machine 100 described above, an agricultural machine 100 in this example includes an image recognition system 1000, a traveling equipment 145, and a controller 180. From an acquired image, the image recognition system 1000 detects at least one of a crop and a ridge that is made on the ground surface of the field, and determines a row region based on the at least one of a crop and a ridge detected. Herein, a process for "detecting at least one of a crop and a ridge" (first process) and a process for "determining a row region based on the at least one of a crop and a ridge detected" (second process) may be performed separately. In the first process, a region to be classified into a crop or a ridge is detected from an image. In the first process, there is no need to determine the accurate position of a region to be classified into a crop or a ridge. On the other hand, in the second process, the position of a row region as needed for row-following travel is identified. In other words, a range, i.e., edge positions, of the crop or ridge that was detected in the first process is calculated through computation. Thus, it is preferable that the first process to detect a crop or ridge is directed to a broad range of the image as a target. The positional accuracy of detection may be low. On the other hand, in the second process, the position of a row region is determined with an accuracy that is needed for row-following travel, which may result in an increased calculation load relative to the first process. Therefore, it would be efficient to start the second process in response to a command to start row-following travel by the operator.

The agricultural machine 100 in this example includes a command generator 119 that commands the image recognition system 1000 to perform computation to determine a row region (second process) with the image recognition system 1000. Computation to determine a row region means a computation for identifying the position (i.e., the range or edge positions) of a "row region" with a positional accuracy that enables row-following travel. In the present disclosure, such an act of "determining a row region" is distinguished from merely "detecting" a crop row or a ridge.

In the agricultural machine 100 of FIG. 7, for example, in response to the operator selecting the automatic steering mode with the mode switch 114, the aforementioned first process (low-positional accuracy detection process) may be begun. Then, when the operator uses the command generator 119 to command that the second process (high-positional accuracy detection process) be performed, row region determination is performed with a high accuracy that is needed for row-following travel.

The controller 180 may be configured or programmed to, when a command to perform computation has been given with the command generator 119, perform a determination process as to whether row-following travel is possible or not based on the at least one of a crop and a ridge detected.

Figure 8:
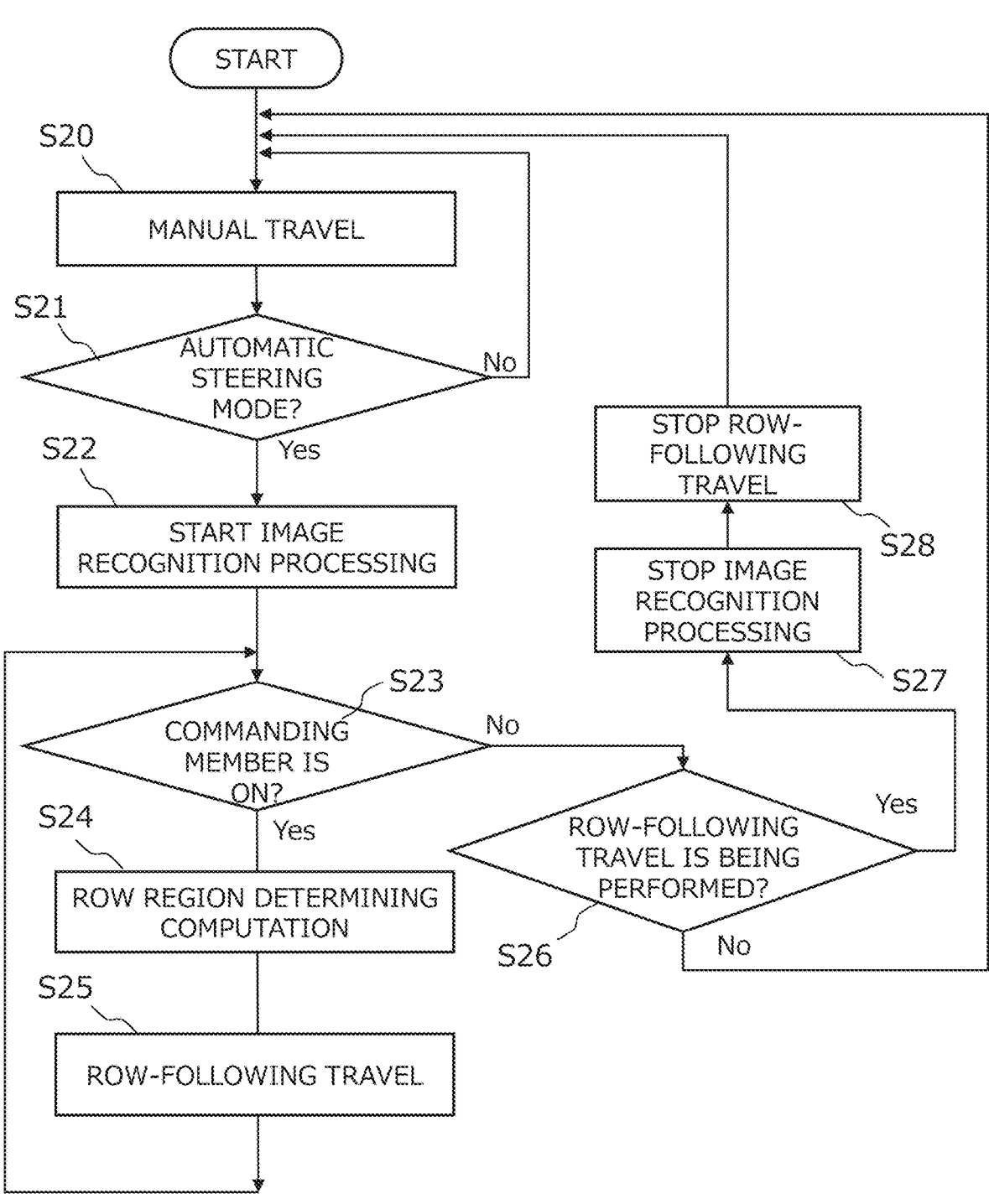
FIG. 8 is a flowchart showing an example of the action of a command generator that gives the image recognition system a command for computation to determine a row region.

Next, with reference to FIG. 8, an example action of the command generator 119 commanding the image recognition system to perform computation to determine a row region will be described.

First, after the agricultural machine 100 is started, at step S20, the agricultural machine 100 is in a state of being able to travel in a manual travel mode.

At step S21, it is determined whether the automatic steering mode is in effect or not. Specifically, if the automatic steering mode is selected with the mode switch 114 as shown in FIG. 7 (Yes), for example, control proceeds to step S22; if the manual steering mode is selected (No), control returns to step S20.

At step S22, the image recognition processing is begun. Herein, the aforementioned process for "detecting at least one of a crop and a ridge" (first process) is performed, for example. The image recognition processing may carry out any other process.

At step S23, it is determined whether the command generator 119 is ON or not. Specifically, if the image recognition system 1000 has been commanded via the command generator 119 to perform computation to determine a row region (Yes), control proceeds to step S24; if this command has not been given (No), control proceeds to step S26.

At step S24, the image recognition system 1000 starts computation to determine a row region. At step S25, the controller 180 performs row-following travel, where the traveling equipment 145 is caused to travel via automatic steering along the row region determined by the image recognition system 1000.

During row-following travel, control proceeds to step S23, whether it is determined whether the command generator 119 is ON or not. If the command generator 119 is switched from ON to OFF, control proceeds to step S26.

At step S26, if row-following travel is being performed (Yes), control proceeds to step S27; if row-following travel is not being performed (No), control proceeds to step S20.

When proceeding to step 27, row-following travel is stopped, and control proceeds to step S28. At step S28, the image recognition system 1000 stops image recognition processing.

In this example, the command generator 119 functions as an element to issue the operator's command to start row-following travel. When starting row-following travel, the image recognition system 1000 may perform a process of selecting an interest region as a target of image recognition processing, such that the interest region during the row-following travel is smaller than the interest region before the row-following travel. Specifically, when the automatic steering mode is selected with the mode switch 114 so that control proceeds to step S22, image processing is started by choosing as an interest region a range that includes a plurality of crop rows or ridges on both sides from the right and left wheels, in order to determine positions where following travel is possible. Then, when the command generator 119 is switched ON so that control proceeds to step 24, a narrow range that includes crop rows or ridges adjacent to the right and left wheels is selected as an interest region. Thus, a process of changing the range of the interest region as a target of image recognition processing between before and after the row-following travel may be performed. In other words, when the automatic steering mode is selected with the operator's manipulation of the mode switch 114, detection of crop rows or ridges is started for an interest region that covers a broader range than during row-following travel.

When the agricultural machine 100 is located before a crop row or ridge such that the crop row or ridge is not yet detectable, or when the position of the crop row or ridge and the positions and orientation of the wheels responsible for steering somehow make row-following travel impossible, the controller 180 does not start row-following travel even if a command from the operator to start row-following travel is given with the command generator 119. When row-following travel is possible, if a command from the operator to start row-following travel is given, the controller 180 sets the interest region to a narrow range, and starts row-following travel. In this configuration, image processing is carried out in a plurality of steps so that the first process is performed at step S22 and that the second process is performed at step 24; however, an alternative configuration may be possible where the same process is performed throughout, without being separated into a plurality of steps.

Note that the image recognition system 1000 may be configured or programmed to, when a command to perform computation for row region determination is given by the command generator 119, select from the image a region as a target of computation and start computation. In this example, in addition to commanding that the aforementioned computation be performed, the command generator 119 functions to give a command to start row-following travel. In other words, the command generator 119 may double as the start switch 112 in FIG. 1.

Although the mode switch in FIG. 7 is not essential, in the case where the agricultural machine 100 includes the mode switch 114, the controller 180 is preferably configured or programmed to, when the mode switch 114 has switched to automatic steering and if the command generator 119 has given a commanded to perform computation, perform following travel.

When a command to perform computation has been given with the command generator 119, similarly to the above-described example, the controller 180 preferably performs a determination process (FIG. 4) as to whether row-following travel is possible based on the at least one of a crop and a ridge detected.

Hereinafter, example embodiments of the image recognition system 1000 illustrated in FIG. 1 and FIG. 7 will be described. Thereafter, an example embodiment of the agricultural machine 100 according to the present disclosure will be described in detail.

First, an image recognition system according to an illustrative first example embodiment of the present disclosure will be described. In the present example embodiment, detection of crop rows is performed as a "row detection".

An image recognition system 1000 according to the present example embodiment includes an imaging device 120 to be mounted to an agricultural machine 100 in use (FIG. 2). The imaging device 120 is fixed to an agricultural machine 100 so as to acquire time-series color images including at least a portion of the ground surface.

Figure 9:
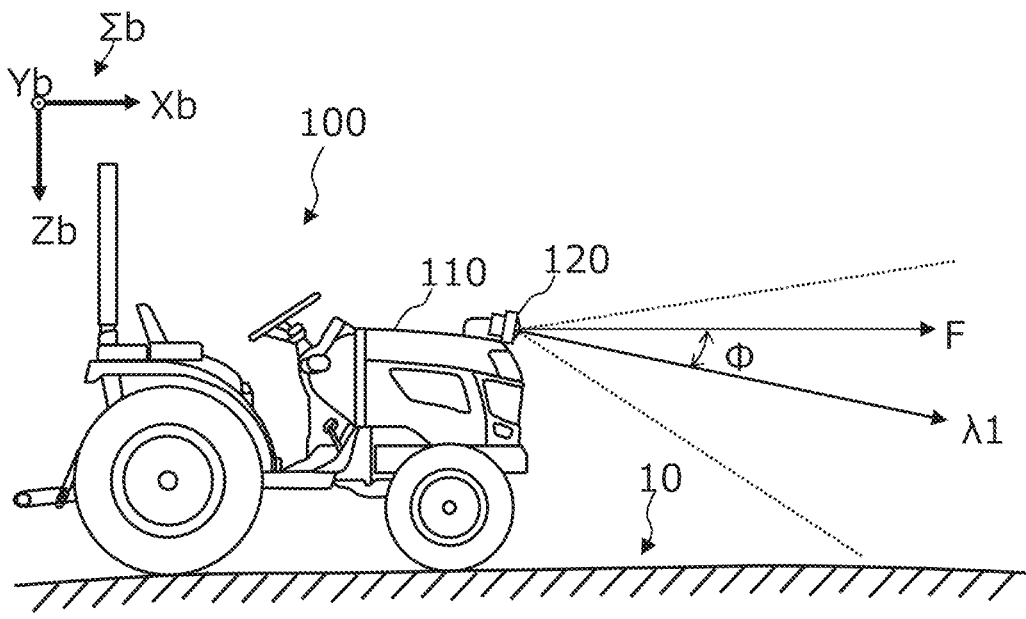
FIG. 9 is a diagram schematically showing how an imaging device that is mounted to an agricultural machine may image the ground surface.

FIG. 9 schematically shows how an imaging device 12 that is mounted to an agricultural machine 100 such as a tractor or a vehicle for crop management may image the ground surface 10, for example. In the example of FIG. 9, the agricultural machine 100 includes a vehicle body 110 that is capable of traveling, and the imaging device 120 is fixed to the vehicle body 110. For referencing sake, FIG. 9 shows a body coordinate system $\Sigma b$ having an Xb axis, a Yb axis, and a Zb axis that are orthogonal to one another. The body coordinate system $\Sigma b$ is a coordinate system that is fixed to the agricultural machine 100, and the origin of the body coordinate system $\Sigma b$ may be set near the centroid of the agricultural machine 100, for example. In the figure, for ease of viewing, the origin of the body coordinate system $\Sigma b$ is illustrated as lying external to the agricultural machine 100. In the body coordinate system $\Sigma b$ according to an example embodiment of the present disclosure, the Xb axis coincides with the traveling direction (direction of arrow F) when the agricultural machine 100 is traveling straight. When viewing from the coordinate origin in the positing direction along the Xb axis, the Yb axis coincides with the directly right direction, and the Zb axis coincides with the vertically downward direction.

The imaging device 120 is, for example, an onboard camera that includes a CCD (Charge Coupled Device) or a CMOS (Complementary Metal Oxide Semiconductor) image sensor. The imaging device 120 according to the present example embodiment is a monocular camera that is capable of capturing motion pictures at a frame rate of 3 frames/second (fps: frames per second) or above, for example.

Figure 10:
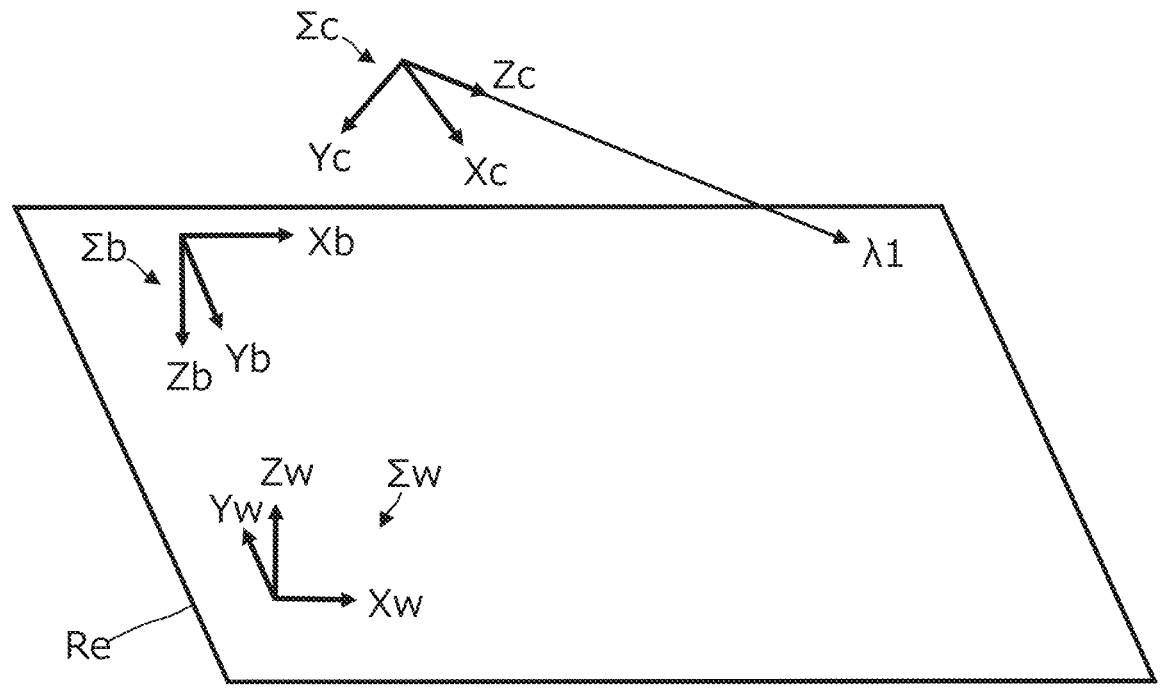
FIG. 10 is a perspective view schematically showing a relationship among a body coordinate system $\Sigma b$ and a camera coordinate system $\Sigma c$ that are fixed to the agricultural machine and a world coordinate system $\Sigma w$ that is fixed to the ground surface.

FIG. 10 is a perspective view schematically showing a relationship among the aforementioned body coordinate system Σb, a camera coordinate system Σc of the imaging device 120, and a world coordinate system Σw that is fixed to the ground surface 10. The camera coordinate system Σc has an Xc axis, a Yc axis, and a Zc axis that are orthogonal to one another, whereas the world coordinate system Σw has an Xw axis, a Yw axis, and a Zw axis that are orthogonal to one another. In the example of FIG. 10, the Xw axis and the Yw axis of the world coordinate system Σw are on a reference plane Re that expands along the ground surface 10.

The imaging device 120 is mounted at a predetermined position of the agricultural machine 100 so as to face in a predetermined direction. Therefore, the position and orientation of the camera coordinate system Σc with respect to the body coordinate system Σb are fixed in a known state. The Zc axis of the camera coordinate system Σc is on the camera optical axis λ1. In the illustrated example, the camera optical axis λ1 is inclined from the traveling direction F of the agricultural machine 100 toward the ground surface 10, with an angle of depression Φ that is greater than 0°. The traveling direction F of the agricultural machine 100 is schematically parallel to the ground surface 10 along which the agricultural machine 100 is traveling. The angle of depression Φ may be set to a range of, e.g., not less than 0° and not more than 60°. In the case where the position at which the imaging device 120 is mounted is close to the ground surface 10, the orientation of the camera optical axis λ1 may be set so that the angle of depression Φ has a negative value, that is, a positive angle of elevation.

When the agricultural machine 100 is traveling on the ground surface 10, the body coordinate system Σb and the camera coordinate system Σc translate relative to the world coordinate system Σw. If the agricultural machine 100 rotates or swings in directions of pitch, roll, and yaw during travel, the body coordinate system Σb and the camera coordinate system Σc may rotate relative to the world coordinate system Σw. In the following description, for simplicity, it is assumed that the agricultural machine 100 does not rotate in pitch and roll directions and that the agricultural machine 100 moves essentially parallel to the ground surface 10.

Figure 11:
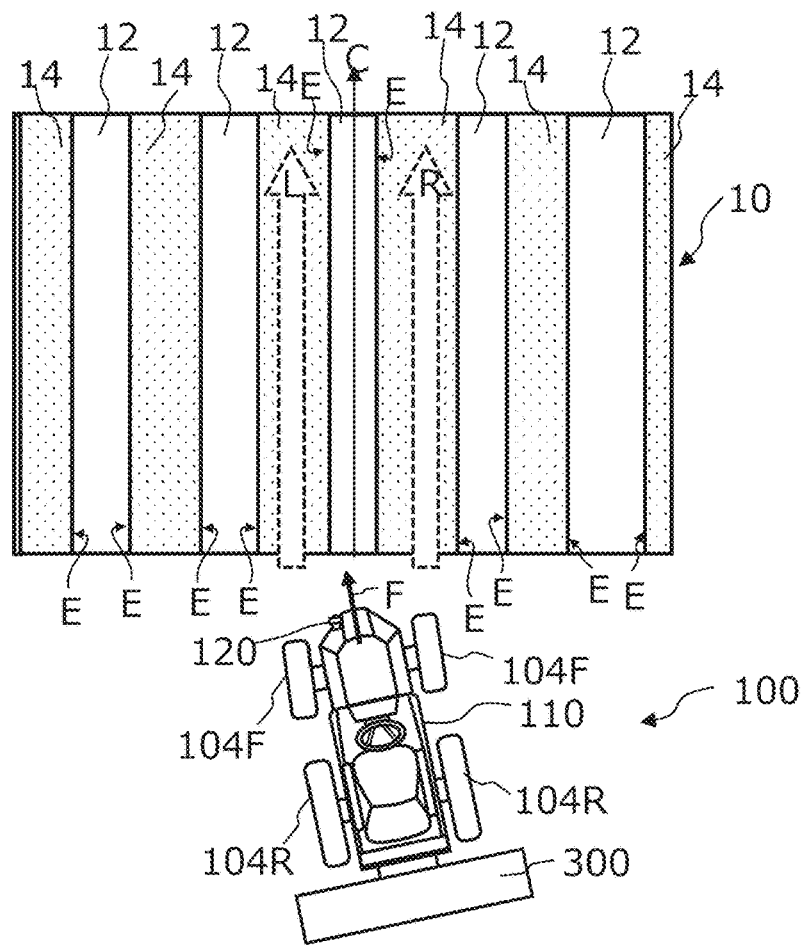
FIG. 11 is a top view schematically showing a portion of a field in which a multiple crop rows are made on the ground surface.

FIG. 11 is a top view schematically showing a portion of a field in which a multiple crop rows 12 are made on the ground surface 10. A crop row 12 is a row that is formed as crops are continuously planted on the ground surface 10 of the field in one direction. In other words, a crop row 12 is an aggregation of crops that are planted in a ridge of the field. Thus, because each individual crop row 12 is a row that is created by an aggregation of crops that have been planted in the field, strictly speaking, the shape of a crop row may be complex depending on the shapes of crops and the arrangement of crops. The width of the crop row 12 changes with crop growth.

Between adjacent crop rows 12, a belt-shaped intermediate region 14, in which no crops have been planted, exists. between two adjacent crop rows 12, each intermediate region 14 is a region that is interposed between two opposing edge lines E. In the case where multiple crops are planted for one ridge in a width direction of the ridge, multiple crop rows 12 will be formed upon the one ridge. In other words, multiple crop rows 12 will be formed within the width of the ridge. In such a case, among the multiple crop rows 12 that are formed on the ridge, an edge line E of the crop row 12 that is located at an end of the width direction of the ridge serves as a delineator of an intermediate region 14. In other words, an intermediate region 14 lies between the edge lines E of crop rows 12 that are located at ends of ridges along the width direction, among the edge lines E of multiple crop rows 12.

Since an intermediate region 14 functions as a region (work path) through which the wheels of the agricultural machine 100 may pass, an "intermediate region" may be referred to as a "work path".

In the present disclosure, an "edge line" of a crop row means a reference line segment (which may also include a curve) to define a target path for an agricultural machine to perform row-following travel via automatic steering. Such reference line segments may be defined as both ends of a belt-shaped region (work path) through which the wheels of the agricultural machine are allowed to pass. The specific method of determining the "edge lines" of a crop row will be described later.

FIG. 11 schematically depicts an agricultural machine 100 that is about to enter into a field in which crop rows 12 are made. The agricultural machine 100 includes right and left front wheels (wheels responsible for steering) 104F and right and left rear wheels 104R as traveling equipment 145, and is towing an implement 300. The front wheels 104F are the wheels responsible for steering.

In the example of FIG. 11, thick broken-lined arrows L and R are indicated for the respective work paths 14 that are located on opposite sides of a crop row 12 in the middle. When the agricultural machine 100 travels on a target path that is indicated by a solid-lined arrow C, the front wheels 104F and the rear wheels 104R of the agricultural machine 100 are expected to move along the arrows L and R in the work paths 14, so as not to travel on or contact the crop row 12. In the present example embodiment, because the image recognition system 1000 can detect the edge lines E of the crop row 12 by using the imaging device 120 mounted to the agricultural machine 100, it is possible, through the action of the controller 180 and traveling equipment 145, to control the steering and travel of the agricultural machine 100 so that the front wheels (wheels responsible for steering) 104F and the rear wheels 104R will move along arrows L and R in the work paths 14. Controlling the steering and travel of the agricultural machine 100 based on the edge lines E of the crop row in this manner may be referred to as "row-following control".

The agricultural machine 100 according to the present example embodiment is capable of travelling in the automatic steering mode for performing row-following travel and in the usual manual steering mode. In order for the operator to switch between the automatic steering mode and the manual steering mode, the agricultural machine 100 includes the mode switch 114 shown in FIG. 1 and FIG. 3. When performing row-following travel, the operator manipulates the mode switch 114 to select the automatic steering mode. When the automatic steering mode is selected by the mode switch 114, the image recognition system 1000 starts image recognition processing based on an image (s) acquired by the imaging device 120.

Figure 12:
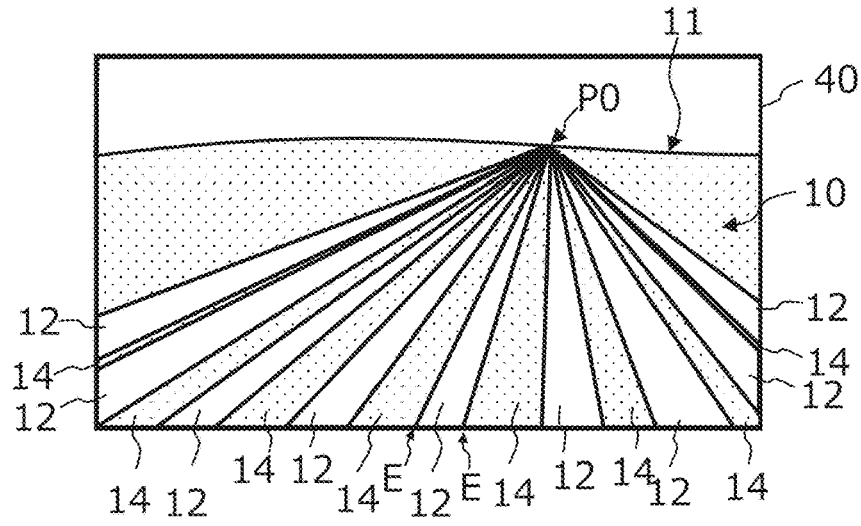
FIG. 12 is a diagram schematically showing an example of an image that is acquired by the imaging device of the agricultural machine shown in FIG. 11.

FIG. 12 is a diagram schematically showing an example of an image 40 that is acquired by the imaging device 120 of the agricultural machine 100 shown in FIG. 11. Theoretically, the multiple crop rows 12 and intermediate regions (work paths) 14 extending in parallel on the ground surface 10 intersect at a vanishing point P0 on the horizon 11. The reason why the vanishing point P0 is located in a right-hand region of the image 40 is that, as shown in FIG. 11, the traveling direction F of the agricultural machine 100 is inclined from the direction in which the crop rows 12 extend (a direction parallel to arrow C).

In the present example embodiment, by a method described below, it is possible to accurately detect the crop rows 12 from such an image 40 and determine edge lines E of the crop rows 12. Then, based on the edge lines E, a path in which the agricultural machine 100 should proceed (target path) during row-following travel can be appropriately generated. As a result, through automatic steering, it becomes possible to control the travel of the agricultural machine 100 so that the front wheels 104F and the rear wheels 104R of the agricultural machine 100 will move along arrows L and R within the work paths 14 (row-following control). Through such row-following control, a precise automatic steering that is adapted to the state of growth of crops can be achieved which cannot be attained by automatic steering techniques that utilize GNSS or other positioning systems.

However, as shown in FIG. 11, when the orientation of the agricultural machine 100 does not match the direction in which the work path 14 extends, it may be impossible for the front wheels 104F and the rear wheels 104R of the agricultural machine 100 to move in the work path 14 along arrows L and R via automatic steering. As described earlier, the image recognition system 1000 relies on the positions and orientation of the wheels responsible for steering (front wheels 104F) to determine whether row-following travel is possible or not. If the image recognition system 1000 determines that row-following travel is impossible, the operator is so notified. Based on the notification, the operator adjusts the position and/or orientation of the agricultural machine 100 via manual steering.

Figure 13:
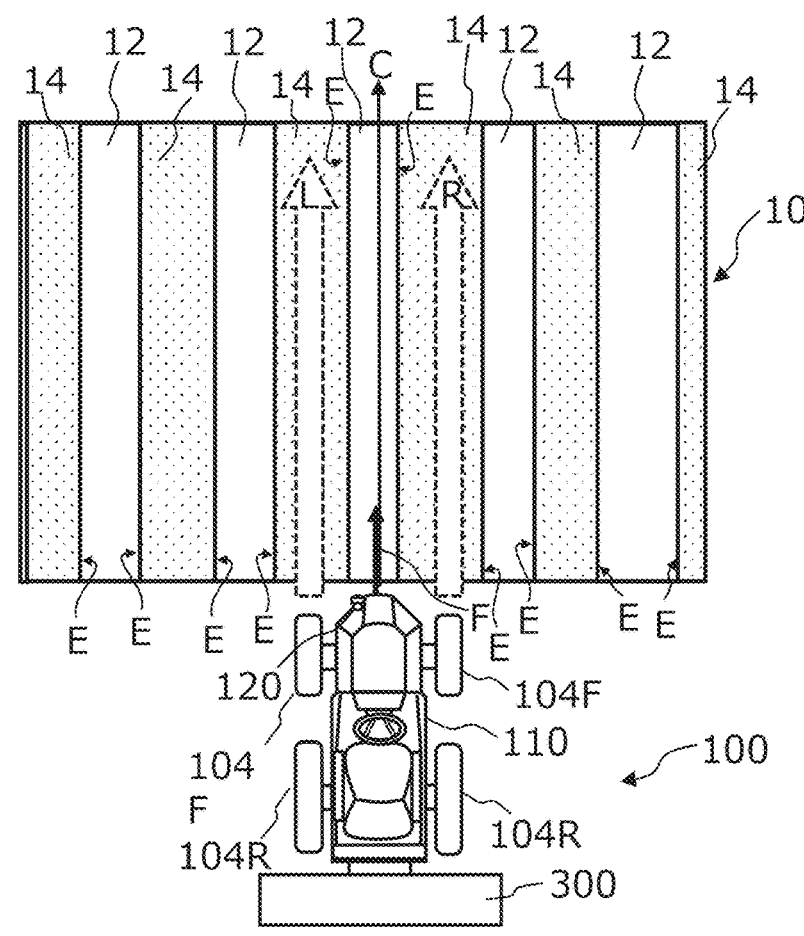
FIG. 13 is a top view schematically showing a state where the position and orientation (angle in yaw directions) of the agricultural machine are adjusted.
Figure 14:
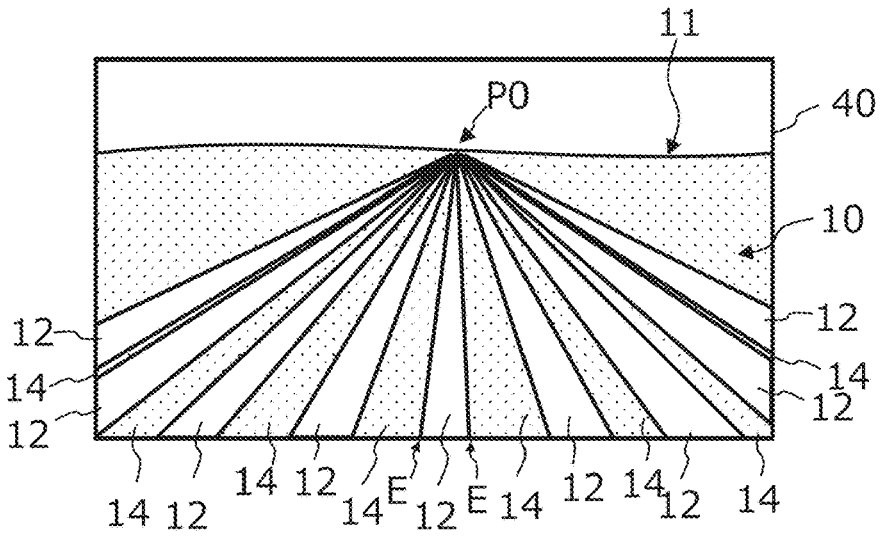
FIG. 14 is a diagram showing an example of an image acquired by the imaging device of the agricultural machine in the state of FIG. 13.

FIG. 13 is a top view schematically showing a state where the agricultural machine 100 is steered to reduce the positional error with respect to a target path (arrow C), thereby adjusting the position and orientation (angle in yaw directions) of the agricultural machine 100. FIG. 14 is a diagram showing an example of an image 40 acquired by the imaging device 120 of the agricultural machine 100 in such a state. The front wheels 104F and the rear wheels 104R of the agricultural machine 100 in the state of FIG. 13 are respectively located on lines in work paths 14 indicated by arrow L and arrow R. When the agricultural machine 100 travels along a target path C indicated by central arrow C, the automatic steering device in the agricultural machine 100 controls the steering angles of the wheels responsible for steering so that the front wheels 104F and the rear wheels 104R will not deviate from the work paths 14.

After the image recognition system 1000 determines that row-following travel is impossible, if the state of the agricultural machine 100 changes to that shown in FIG. 13 through manual steering by the operator, for example, the image recognition system 1000 may determine that row-following travel is possible, and give this notification the operator. In the present example embodiment, after the notification, automatic steering is not begun until the operator commands that row-following travel be started with the start switch 112 in FIG. 1. If in this state the operator manipulates the start switch 112 to issue a command to start row-following travel, the controller 180 permits row-following travel through automatic steering to be started.

When row-following travel through automatic steering is started and the agricultural machine 100 travels along a target path C indicated by central arrow C in FIG. 13, the controller 180 and the traveling equipment 145 in the agricultural machine 100 controls the steering angles of the wheels responsible for steering so that the front wheels 104F and the rear wheels 104R will not deviate from the work paths 14.

Hereinafter, the configuration and operation of an image recognition system according to an example embodiment of the present disclosure will be described in detail.

As shown in FIG. 2, an image recognition system 1000 according to the present example embodiment includes: the aforementioned imaging device 120; and a processing device 122 which performs image processing for time-series color images that are acquired from the imaging device 120. The processing device 122 is connected to the controller 180 that is included in the agricultural machine 100.

The processing device 122 in FIG. 2 can be implemented by an electronic control unit (ECU) for image recognition. The ECU is a computer for onboard use. The processing device 122 is connected to the imaging device 120 via serial signal lines, e.g., a wire harness, so as to receive image data that is output from the imaging device 120. A portion of the image recognition processing that is performed by the processing device 122 may be performed inside the imaging device 120 (inside a camera module).

Figure 15:
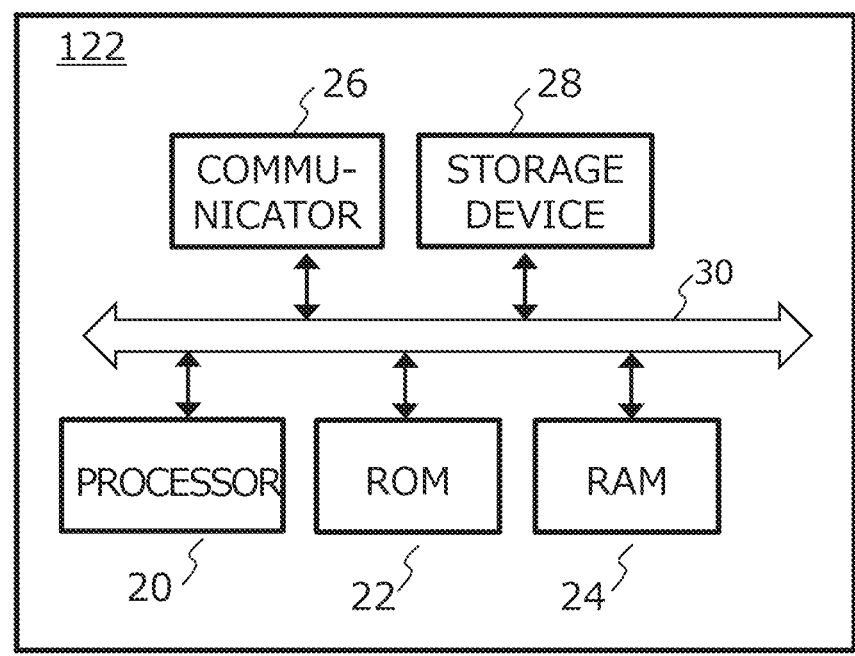
FIG. 15 is a block diagram schematically showing an example configuration of a processing device in the first example embodiment of the present disclosure.

FIG. 15 is a block diagram showing an example hardware configuration of the processing device 122. The processing device 122 includes a processor 20, a ROM (Read Only Memory) 22, a RAM (Random Access Memory) 24, a communicator 26, and a storage device 28. These component elements are connected to one another via buses 30.

The processor 20 may include a semiconductor integrated circuit, and referred to also as a central processing unit (CPU) or a microprocessor. The processor 20 may include an image processing unit (GPU). The processor 20 consecutively executes a computer program describing predetermined instructions, which is stored in the ROM 22, to realize processing that is needed for the row detection according to the present disclosure. A whole or a part of the processor 20 may be an FPGA (Field Programmable Gate Array), an ASIC (Application Specific Integrated Circuit), or an ASSP (Application Specific Standard Product) in which a CPU is mounted.

The communicator 26 is an interface to perform data communication between the processing device 122 and an external computer. The communicator 26 can perform wired communication based on a CAN (Controller Area Network) or the like, or wireless communication complying with the Bluetooth (registered trademark) standards and/or the Wi-Fi (registered trademark) standards.

The storage device 28 is able to store data of images acquired from the imaging device 120 or images which are under processing. Examples of the storage device 28 include a hard disk drive and a non-volatile semiconductor memory.

The hardware configuration of the processing device 122 is not limited to the above examples. A whole or a part of the processing device 122 does not need to be mounted on the agricultural machine 100. By utilizing the communicator 26, one or more computers located outside the agricultural machine 100 may be allowed to function as a whole or a part of the processing device 122. For example, a server computer that is connected to a network may function as a whole or a part of the processing device 122. On the other hand, a computer mounted in the agricultural machine 100 may perform all functions that are required of the processing device 122.

In the present example embodiment, such a processing device 122 acquires time-series color images from the imaging device 120, and performs operations S1, S2 and S3 below.

(S1) from time-series color images, generate an enhanced image in which the color of a crop row for detection is enhanced.

(S2) from the enhanced image, generate a plan view image as viewed from above the ground surface, the plan view image being classified into first pixels of which a color index value for the crop row is equal to or greater than a threshold and second pixels of which this index value is below the threshold.

(S3) based on the index values of the first pixels, determine the positions of edge lines of the crop row.

Hereinafter, specific examples of operations S1, S2 and S3 will be described in detail.

The time-series color images are an aggregation of images that are chronologically acquired by the imaging device 120 through imaging. Each image is composed of a frame-by-frame group of pixels. For example, when the imaging device 120 outputs images at a frame rate of 30 frames/second, the processing device 122 is able to acquire new images with a period of about 33 milliseconds. As compared to the speed of a common automobile that travels on public roads, the agricultural machine 100, such as a tractor, travels in a field at a speed which is relatively low, e.g., about 10 kilometers per hour or lower. In the case of 10 kilometers per hour, a distance of about 6 centimeters is travelled in about 33 milliseconds. Therefore, the processing device 122 may acquire images with a period of, e.g., about 100 to 300 milliseconds, and does not need to process every frame of image captured by the imaging device 120. The period with which images to be processed by the processing device 122 are acquired may be automatically changed by the processing device 122 in accordance with the traveling speed of the agricultural machine 100.

Figure 16:
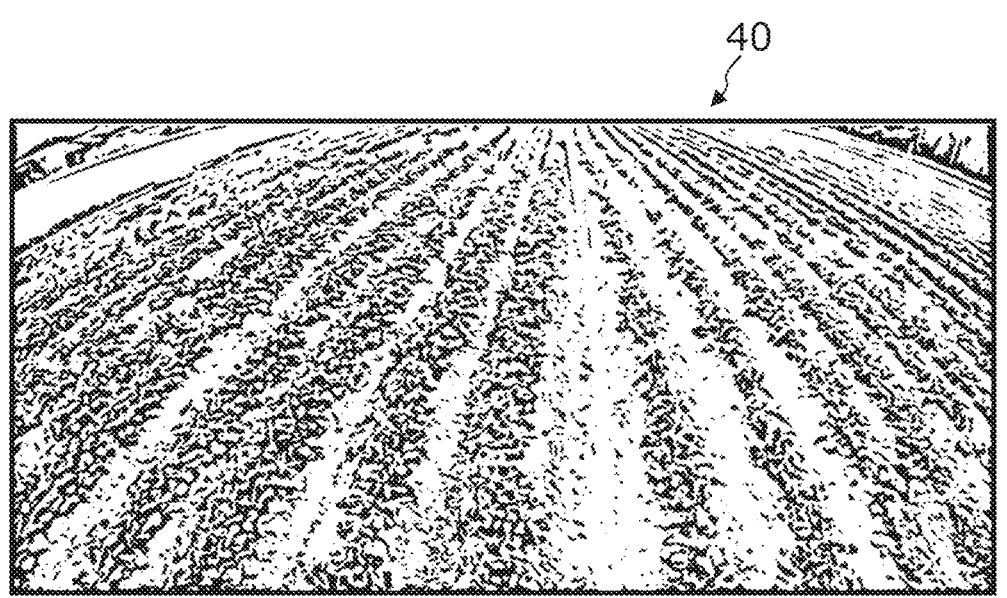
FIG. 16 is a monochromatic image corresponding to one frame of image, among time-series color images acquired by an onboard camera mounted on a tractor.

FIG. 16 is an image corresponding to one frame of image 40, among time-series color images that have been acquired by an imaging device mounted on the agricultural machine (which in this example is a monocular camera). Rows of crops (crop rows) appear in the image of FIG. 16, which are planted in the form of rows on the ground surface of a field. In this example, the rows of crops are arranged essentially in parallel and at equal intervals on the ground surface, such that the camera optical axis of the imaging device is in the traveling direction of the agricultural machine. As described earlier, the camera optical axis does not need to be parallel to the traveling direction of the agricultural machine, but may meet the ground surface frontward of the traveling direction of the agricultural machine. The mounted position of the imaging device is not limited to this example. In the case where a plurality of imaging devices are mounted to the agricultural machine, some of the imaging device may have their camera optical axes oriented in an opposite direction to the traveling direction, or in a direction intersecting the traveling direction.

In operation S1, based on time-series color images that have been acquired from the imaging device 120, the processing device 122 in FIG. 2 generates an image (enhanced image) in which the color of a crop row for detection is enhanced. Crops perform photosynthesis with sunlight (white light), and therefore contain chlorophyll. Chlorophyll has a lower optical absorption rate for green than for red or blue. Therefore, the spectrum of sunlight that is reflected by a crop shows a relatively high value in the green wavelength range, as compared to the spectrum of sunlight that is reflected from the soil surface. As a result, the crop color generally contains plenty of green components, and thus a typical example of the "color of the crop row" is green. However, as will be described below, the "color of the crop row" is not limited to green.

The image sensor in the imaging device 120 includes a multitude of photodetection cells that are arranged in rows and columns. Each individual photodetection cell corresponds to one of the pixels that constitute an image, and includes an R subpixel to detect the intensity of red light, a G subpixel to detect the intensity of green light, and a B subpixel to detect the intensity of blue light. The light outputs to be detected by the R subpixel, the G subpixel, and the B subpixel of each photodetection cell may be referred to as an R value, a G value, and a B value, respectively. Hereinafter, an R value, a G value, and a B value may be collectively referred to as "pixel values" or "RGB values". By using an R value, a G value, and a B value, it is possible to define a color based on coordinate values within an RGB color space.

In the case where the color of a crop row for detection is green, an enhanced image in which the color of a crop row is enhanced is an image resulting from converting the RGB values of each pixel of a color image acquired by the imaging device into pixel values having a relatively large weight on the G value. Such pixel value conversion for generating an enhanced image may be defined as "(2×G value-R value-B value)/(R value+G value+B value)", for example. Herein, the (R value+G value+B value) in the denominator is a factor for normalization. Hereinafter, normalized RGB values will be referred to as rgb values, which are defined as: r=R value/(R value+G value+B value); g=G value/(R value+G value+B value); and b=B value/(R value+G value+B value). Note that "2×g-r-b" is called an excess green index (ExG: Excess Green Index).

Figure 17:
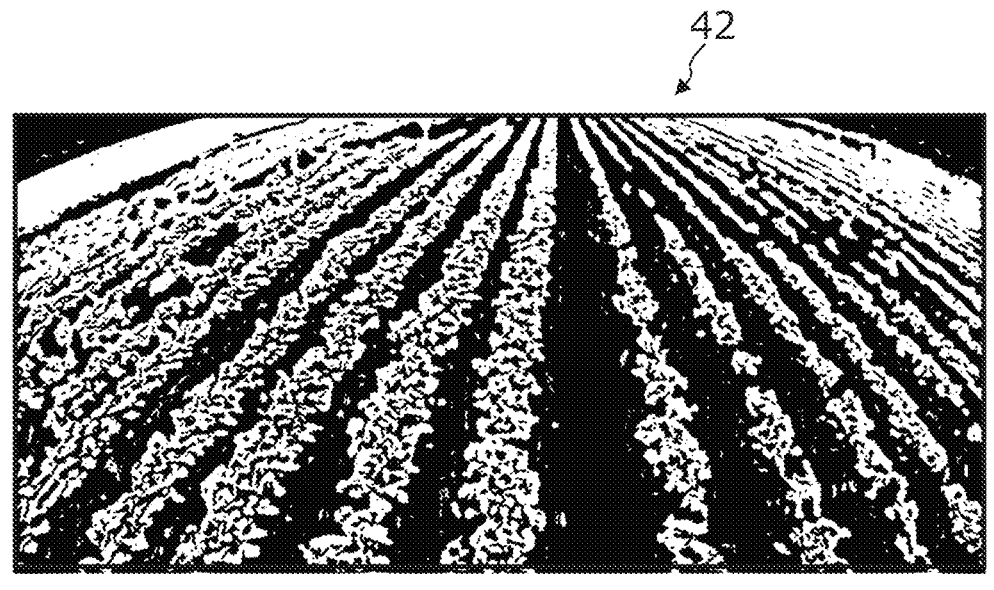
FIG. 17 is a diagram showing an enhanced image resulting from converting the RGB values of one frame of image among time-series color images RGB values into an excess green index (ExG=$2\times$g-r-b).

FIG. 17 is a diagram showing an enhanced image 42 resulting from converting the RGB values of the image of FIG. 16 into "2×g-r-b". Through this conversion, in the image 42 of FIG. 17, any pixel whose "r+b" is smaller than g is displayed brighter, and any pixel whose "r+b" is larger than g is displayed darker. Through this conversion, an image (enhanced image) 42 in which the color of a crop row for detection (i.e., "green" in this example) is enhanced is obtained. Any pixel which is relatively bright in the image of FIG. 17 is a pixel having a relatively large green component, and belongs to the crop region.

As the "color index value" regarding which the color of the crop is to be enhanced, any index other than the excess green index (ExG) may also be used, e.g., a green red vegetation index (G value-R value)/(G value+R value). In the case where the imaging device can also function as an infrared camera, NDVI (Normalized Difference Vegetation Index) may be used as the "color index value for the crop row".

There may be cases where each crop row is covered by a sheet called "mulch" (mulching sheet). In such cases, the "color of the crop row" is the "color of objects that are arranged in rows covering the crops". Specifically, when the sheet color is black, which is an achromatic color, the "color of the crop row" means "black". When the sheet color is red, the "color of the crop row" means "red". Thus, the "color of the crop row" may mean not only the color of the crops themselves, but also the color of the region defining the crop row (i.e., a color that is distinguishable from the color of the soil surface).

The generation of an enhanced image in which the "color of the crop row" is enhanced may utilize conversion from an RGB color space into an HSV color space. An HSV color space is a color space that is constituted by the three components of hue, saturation, and value. Using color information obtained by converting from an RGB color space into an HSV color space makes it possible to detect a "color" with low saturation, such as black or white. In the case of utilizing an OpenCV library to detect "black", the hue may be set to the maximum range (0-179), the saturation may be set to the maximum range (0-255), and the value range may be set to 0-30. In order to detect "white", the hue may be set to the maximum range (0-179), the saturation may be set to the maximum range (0-255), and the value range may be set to 200-255. Any pixel that has a hue, a saturation, and a value falling within such setting ranges is a pixel having the color to be detected. In the case of detecting a green pixel, for example, the hue range may be set to a range of, e.g., 30-90.

Generating an image in which the color of a crop row for detection is enhanced (enhanced image) makes it easy to distinguish (i.e., extract) crop row regions from the remaining background regions (segmentation).

Next, operation S2 will be described.

In operation S2, from the enhanced image 42, the processing device 122 generates a plan view image being classified into first pixels of which a color index value for the crop row is equal to or greater than a threshold and second pixels of which this index value is below the threshold. The plan view image is an image as viewed from above the ground surface.

Figure 18:
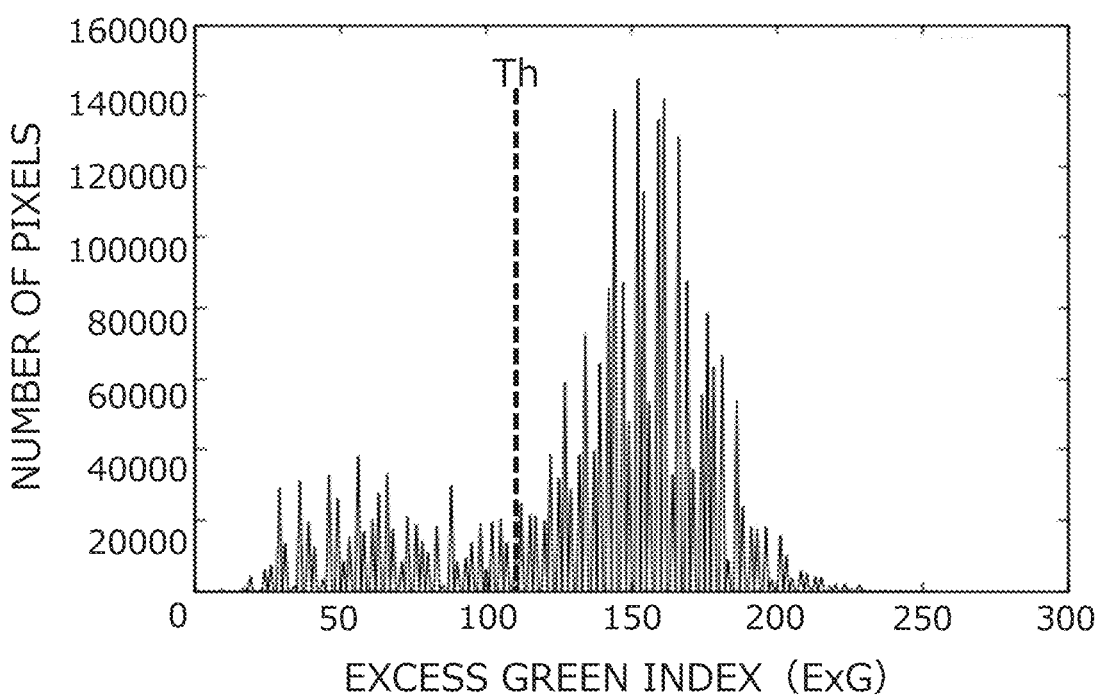
FIG. 18 is a histogram of an excess green index (ExG) in the image of FIG. 17.

In the present example embodiment, as a color index value for the crop row, the aforementioned excess green index (ExG) is adopted, and a discriminant analysis method (Otsu's binarization) is used to determine a discrimination threshold. FIG. 18 is a histogram of an excess green index (ExG) in the enhanced image 42 of FIG. 17. In the histogram, the horizontal axis represents the excess green index (ExG), and the vertical axis represents the number of pixels in the image (corresponding to frequency of occurrence). In FIG. 18, a broken line is shown indicating a threshold Th that is calculated by the discriminant analysis algorithm. Against this threshold Th, the pixels in the enhanced image 42 are classified into two class. The right side of the broken line indicating the threshold Th shows the frequency of occurrence of pixel whose excess green index (ExG) is equal to or greater than the threshold, these pixels being estimated as belonging to a crop class. On the other hand, the left side of the broken line indicating the threshold Th shows the frequency of occurrence of pixels whose excess green index (ExG) is below the threshold, these pixels being estimated as belonging to a non-crop class, e.g., the soil. In this example, the first pixels, i.e., the pixels whose index value is equal to or greater than the threshold, correspond to "crop pixels". On the other hand, the second pixels, whose index value is below the threshold, correspond to "background pixels". The background pixels correspond to objects other than those for detection, e.g., the soil surface, and the aforementioned intermediate regions (work paths) 14 may be constituted by background pixels. Note that the method of threshold determination is not limited to the above examples; for example, other methods utilizing machine learning may be used to determine the threshold.

By assigning each of the pixels constituting the enhanced image 42 as either a "first pixel" or a "second pixel", it becomes possible to extract a region for detection from the enhanced image 42. Also, by giving "zero" to the pixel value of any "second pixel", or removing the second pixel data from the image data, it becomes possible to mask any region other than the regions for detection. When finalizing the regions to be masked, it may be possible to perform a process of including any pixel whose excess green index (ExG) exhibits a locally high value, as a noise, into the masked regions.

Figure 19:
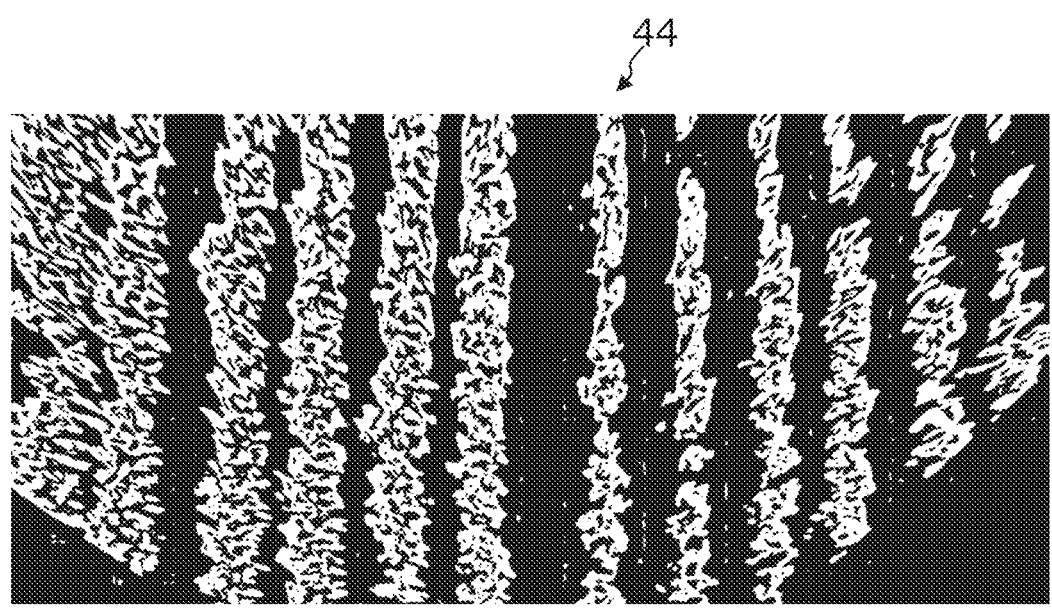
FIG. 19 is a diagram showing an example of a plan view image (overhead view image) being classified into first pixels (e.g., crop pixels) and second pixels (background pixels).

FIG. 19 is a diagram showing an example of a plan view image 44 being classified into first pixels and second pixels, as viewed from above the ground surface. The plan view image 44 of FIG. 19 is an image that is generated from the enhanced image 42 of FIG. 17 by an image transformation technique described below. In the plan view image 44, the second pixels whose color index value for the crop row (which in this example is the excess green index) is below the threshold Th are black pixels (pixels whose value is set to zero). The regions including second pixels are mainly regions where the surface of the soil on the ground surface is visible. In the plan view image 44 of FIG. 19, black triangular regions exist at right and left corners which are tangent to the bottom side. These triangular regions correspond to regions which do not appear in the enhanced image 42 of FIG. 17. Note that, in the image 40 of FIG. 16 and the enhanced image 42 of FIG. 17, a phenomenon where lines that would actually be straight lines are distorted in peripheral portions of the image is observed. Such image distortion is ascribable to the performance of the camera lenses, and may be corrected by using internal parameters of the camera. Processes such as enhancement of the crop regions, masking, and distortion correction may be referred to as preprocessing. The preprocessing may also include processes other than these processes.

The plan view image 44 of FIG. 19 is an overhead view image in which a reference plane Re that is parallel to the ground surface is viewed directly from above along the normal direction of the reference plane Re. This overhead view image can be generated from the enhanced image 42 of FIG. 17 through homography transformation (planar perspective projection). Homography transformation is a kind of geometric transformation where a point that is on a given plane in a three-dimensional space can be converted to a point that is on another arbitrary plane.

Figure 20:
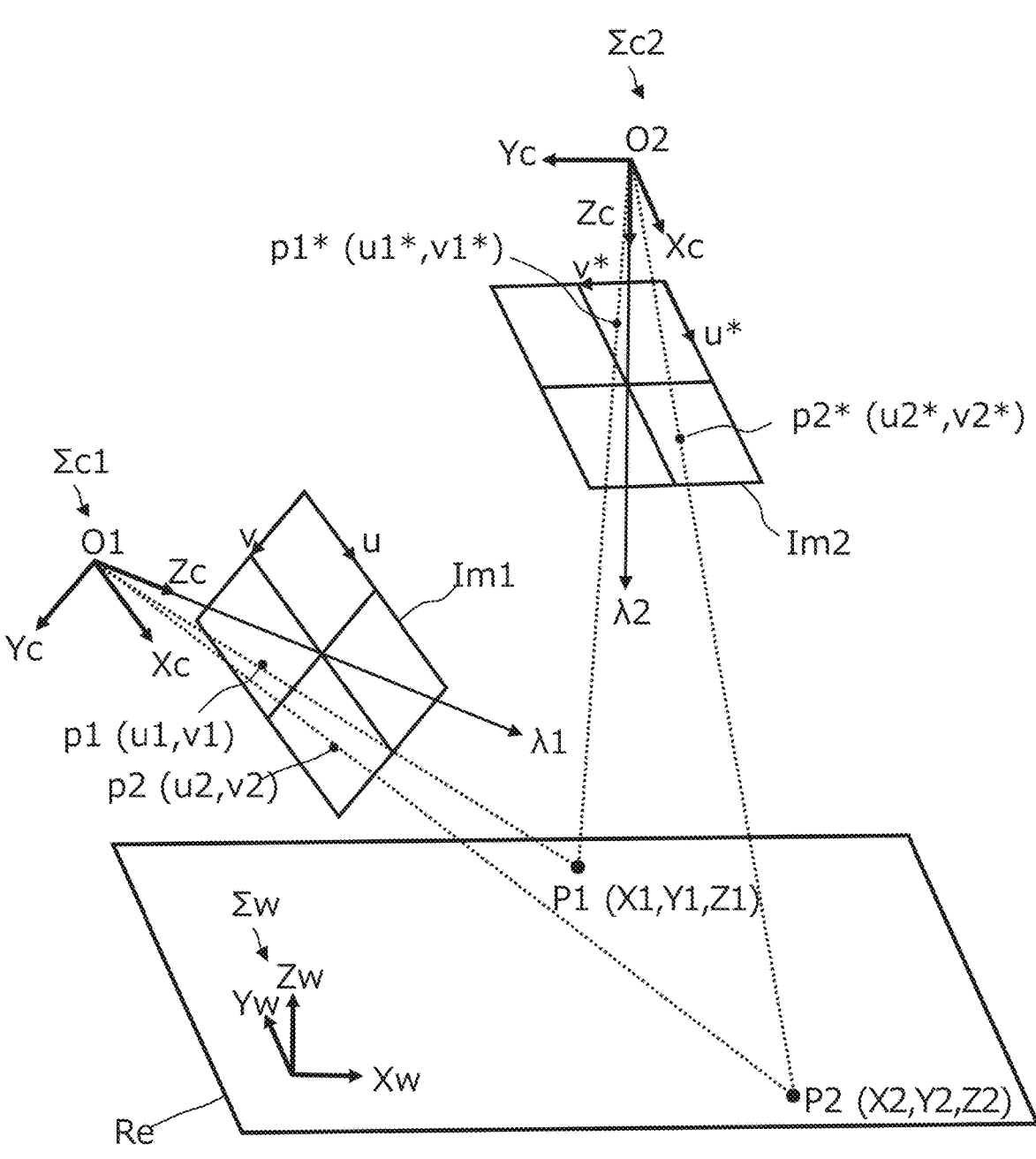
FIG. 20 is a perspective view schematically showing the relative locations between: each of a camera coordinate system $\Sigma c1$ and a camera coordinate system $\Sigma c2$; and a reference plane Re.

FIG. 20 is a perspective view schematically showing the relative locations between each of a camera coordinate system $\Sigma c1$ of an imaging device that has a first pose (position and orientation) and a camera coordinate system $\Sigma c2$ of an imaging device that has a second pose, and the reference plane Re. In the illustrated example, the camera coordinate system $\Sigma c1$ is inclined so that its Zc axis obliquely intersects the reference plane Re. An imaging device having the first pose corresponds to an imaging device that is mounted to the agricultural machine. On the other hand, the camera coordinate system $\Sigma c2$ has its Zc axis lying orthogonal to the reference plane Re. Stated otherwise, the camera coordinate system $\Sigma c2$ is placed in a state that allows for acquiring an overhead view image in which the reference plane Re is viewed directly from above along the normal direction of the reference plane Re.

At a position that is distant from an origin O1 of the camera coordinate system $\Sigma c1$ by the focal length of the camera along the Zc axis, an imaginary image plane Im1 exists. The image plane Im1 is orthogonal to the Zc axis and the camera optical axis $\lambda 1$. A pixel position on the image plane Im1 is defined by an image coordinate system having a u axis and a v axis that are orthogonal to each other. For example, a point P1 and a point P2 located on the reference plane Re may have coordinates (X1,Y1,Z1) and (X2,Y2,Z2) in the world coordinate system $\Sigma w$, respectively. In the example of FIG. 20, the Xw axis and the Yw axis of the world coordinate system $\Sigma w$ are on the reference plane Re. Therefore, Z1=Z2=0. The reference plane Re is set so as to expand along the ground surface.

Through perspective projection based on a pinhole camera model, the point P1 and the point P2 on the reference plane Re are converted, respectively, into a point p1 and a point p2 on the image plane Im1 of the imaging device having the first pose. On the image plane Im1, the point p1 and the point p2 are at pixel positions indicated by coordinates (u1,v1) and (u2,v2), respectively.

When the imaging device has the second pose, an imaginary image plane Im2 exists at a position that is distant from an origin O2 of the camera coordinate system Σc2 by the focal length of the camera along the Zc axis. In this example, the image plane Im2 is parallel to the reference plane Re. A pixel position on the image plane Im2 is defined by an image coordinate system having a u* axis and a v* axis that are orthogonal to each other. Through perspective projection, a point P1 and a point P2 on the reference plane Re are converted, respectively, into a point p1* and a point p2* on the image plane Im2. On the image plane Im2, the point p1* and point p2* are at pixel positions indicated by coordinates (u1*,v1*) and (u2*,v2*), respectively.

Once the relative locations of the camera coordinate systems Σc1 and Σc2 with respect to the reference plane Re (world coordinate system Σw) are given, then, for a given point (u,v) on the image plane Im1, it is possible to determine a corresponding point (u*,v*) on the image plane Im2 through homography transformation. When point coordinates are expressed by a homogeneous coordinate system, such homography transformation is defined by a transformation matrix H of 3 rows×3 columns.

$$\begin{pmatrix} u* \\ v* \\ 1 \end{pmatrix} = H \begin{pmatrix} u \\ v \\ 1 \end{pmatrix}$$ Equation 1

The content of the transformation matrix H is defined by numerical values of $h_{11}$, $h_{12}$, . . . , $h_{32}$, as indicated below.

$$\begin{pmatrix} u* \\ v* \\ 1 \end{pmatrix} = \begin{pmatrix} h11 & h12 & h13 \\ h21 & h22 & h23 \\ h31 & h32 & 1 \end{pmatrix} \begin{pmatrix} u \\ v \\ 1 \end{pmatrix}$$ Equation 2

The eight numerical values ($h_{11}$, $h_{12}$, . . . , $h_{32}$) can be calculated by a known algorithm once a calibration board that is placed on the reference plane Re is imaged by the imaging device 120 mounted to the agricultural machine 100.

When a point on the reference plane Re has coordinates (X,Y,0), the coordinates of the corresponding points on the respective camera image planes Im1 and Im2 are associated with the point (X,Y,0) by respective homography transformation matrices H1 and H2, as indicated by the formulae of Equations 3 and 4 below.

$$\begin{pmatrix} u \\ v \\ 1 \end{pmatrix} = H1 \begin{pmatrix} X \\ Y \\ 1 \end{pmatrix}$$ Equation 3

$$\begin{pmatrix} u* \\ v* \\ 1 \end{pmatrix} = H2 \begin{pmatrix} X \\ Y \\ 1 \end{pmatrix}$$ Equation 4

22

From the above two formulae, the following formula is derived. As is clear from this formula, the transformation matrix H is equal to H2H1⁻¹. H1⁻¹ is an inverse of H1.

$$\begin{pmatrix} u* \\ v* \\ 1 \end{pmatrix} = H2H1^{-1} \begin{pmatrix} u \\ v \\ 1 \end{pmatrix}$$ Equation 5

The content of the transformation matrices H1 and H2 depends on the reference plane Re; therefore, if the position of the reference plane Re changes, the content of the transformation matrix H also changes.

By utilizing such homography transformation, a plan view image of the ground surface can be generated from an image of the ground surface acquired by the imaging device having the first pose (imaging device mounted to the agricultural machine). In other words, through homography transformation, coordinates of a given point on the image plane Im1 of the imaging device 120 can be converted into coordinates of a point that is on the image plane Im2 of an imaginary imaging device having a predetermined pose with respect to the reference plane Re.

After calculating the content of the transformation matrix H, the processing device 122 executes a software program based on the aforementioned algorithm to generate, from time-series color images or preprocessed images of time-series color images, overhead view images in which the ground surface 10 is viewed from above.

In the above description, it is assumed that points (e.g., P1, P2) in a three-dimensional space are all located on the reference plane Re (e.g., Z1=Z2=0). In the case where the height of a crop with respect to the reference plane Re is non-zero, in the plan view image resulting after homography transformation, the position of a corresponding point will be shifted from its proper position. In order to prevent an increase in the amount of shift, it is desirable that the height of the reference plane Re is close to the height of the crop for detection. Bumps and dents, e.g., ridges, furrows, or trenches, may exist on the ground surface 10. In such cases, the reference plane Re may be offset upward from the bottoms of such bumps and dents. The offset distance may be appropriately set depending on the bumps and dents of the ground surface 10 on which crops are planted.

While the agricultural machine 100 is traveling on the ground surface 10, if the vehicle body 110 (see FIG. 9) undergoes a roll or pitch motion, the pose of the imaging device 120 changes, whereby the content of the transformation matrix H1 may change. In such a case, angles of rotation of roll and pitch of the vehicle body 110 may be measured with an IMU, and the transformation matrix H1 and the transformation matrix H can be corrected in accordance with the changes in the pose of the imaging device.

By the above-described method, the processing device 122 according to the present example embodiment generates a plan view image as viewed from above the ground surface, the plan view image being classified into first pixels of which a color index value for the crop row is equal to or greater than a threshold and second pixels of which this index value is below the threshold; thereafter, the processing device 122 performs operation S3.

Next, operation S3 will be described.

In operation S3, based on the index values of the first pixels, the processing device 122 determines the positions of the edge lines of the crop row. Specifically, the index values of the first pixels (i.e., pixels whose color index value is equal to or greater than a threshold) are totaled along a plurality of scanning lines in the plan view image.

Figure 21:
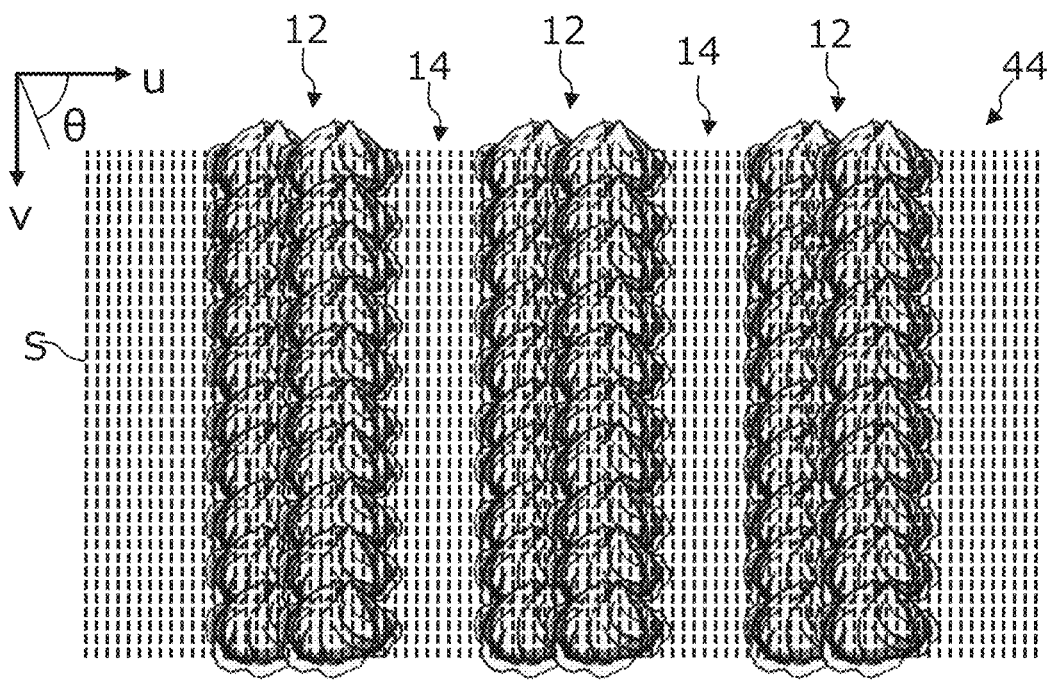
FIG. 21 is a schematic diagram showing an example in which the direction of crop rows in a plan view image and the direction of scanning lines are parallel.

FIG. 21 is an example of a plan view image 44 in which three crop rows 12 appear. In this example, the directions of the crop rows 12 are parallel to the vertical direction in the image (v axis direction). FIG. 21 shows a multitude of scanning lines (broken line) S that are parallel to the vertical direction in the image (v axis direction). The processing device 122 totals the index values of pixels that are located on the plurality of scanning lines S to obtain a total value for each scanning line S.

Figure 22:
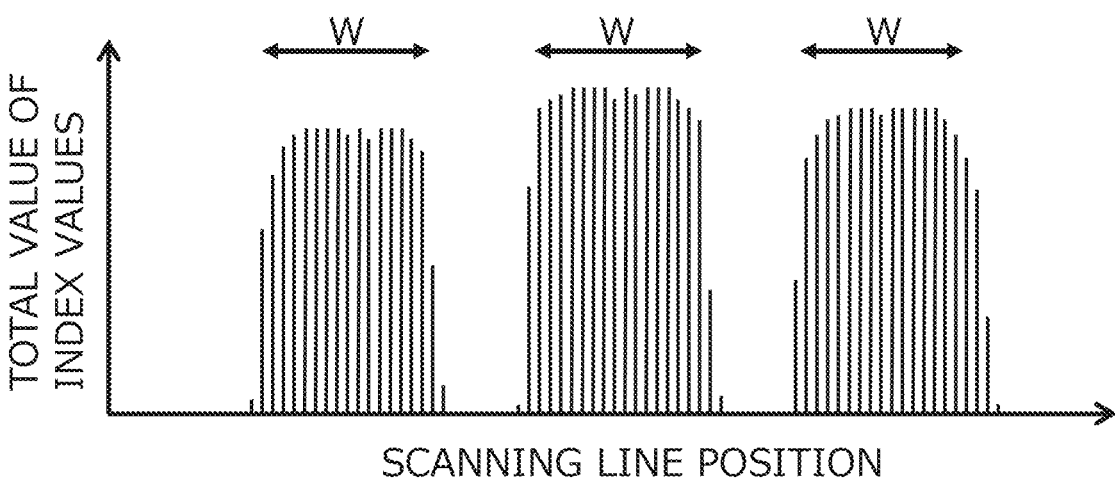
FIG. 22 is a diagram schematically showing an example of a total value histogram, as obtained with respect to the plan view image of FIG. 21.

FIG. 22 is a diagram schematically showing a relationship between positions of scanning lines S and total values of index values (histogram of total values), as obtained with respect to the plan view image of FIG. 21. In FIG. 22, the horizontal axis represents the positions of scanning lines S along the horizontal direction in the image (u axis direction). In the plan view image 44, when many of the pixels that are crossed by a scanning line S are first pixels belonging to a crop row 12, that scanning line S has a large total value. On the other hand, when many of the pixels that are crossed by a scanning line S are second pixels (background pixels) belonging to an intermediate region (work path) 14 existing between crop rows 12, that scanning line S has a small total value. Note that, in the present example embodiment, the intermediate regions (work paths) 14 are masked, so that the second pixels have an index value of zero.

In the histogram of FIG. 22, there exist concave regions whose total value is zero or near-zero, and convex regions that are distinguished by such concave regions. The concave regions correspond to intermediate regions (work paths) 14, whereas the convex regions correspond to crop rows 12. In the present example embodiment, the positions of scanning lines S having total values at predetermined positions on opposite sides of a peak of total values within a convex region, specifically, those which accounts for a predetermined rate (e.g., a value chosen in a range from 60% to 90%) with respect to the peak of total values, are determined as the positions of edge lines of a crop row 12. Both ends of an arrow W in FIG. 22 indicate the positions of edge lines of each crop row 12. In the example of FIG. 22, the positions of the edge lines of each crop row 12 are positions of scanning lines S having a 80% value of a peak of total values of the crop row 12, for example.

In the present example embodiment, the second pixels are masked before color index values for the crop row is totaled upon each scanning line S. In other words, it is not that the number of first pixels (number of pixels) is counted in a plan view image that has been binarized based on a classification between first pixels and second pixels. In the case where the number of first pixels is counted, if a multitude of pixels (classified as first pixels) that slightly exceed the threshold Th due to fallen leaves and weeds or the like exist, for example, the count value of first pixels will increase. On the other hand, as in the example embodiment of the present disclosure, totaling color index values for the crop row with respect to first pixels, rather than relying on the number of first pixels, reduces or prevents misjudgments associated with fallen leaves or weeds, thus enhancing the robustness of row detection.

Figure 23:
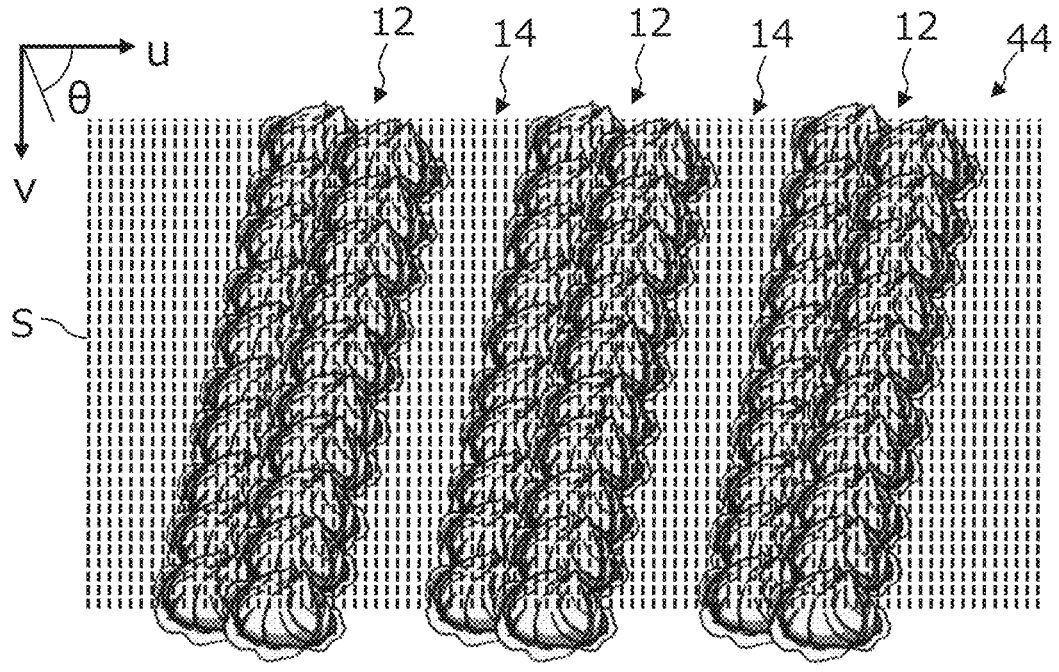
FIG. 23 is a schematic diagram showing an example where the direction of crop rows and the direction of scanning lines intersect in a plan view image.

FIG. 23 shows an example of a plan view image 44 in which crop rows 12 extend obliquely. As has been described with reference to FIG. 11 and FIG. 12, depending on the orientation of the agricultural machine 100, the crop rows 12 may extend in directions that are inclined right or left in the image 40 acquired by the imaging device 120. If the plan view image 44 is generated from such an image through homography transformation, as in the example of FIG. 23, the direction of the crop rows 12 will be inclined from the vertical direction in the image (v axis direction).

Figure 24:
FIG. 24 is a diagram schematically showing an example of a total value histogram, as obtained with respect to the plan view image of FIG. 23.

FIG. 23 also shows a multitude of scanning lines (broken line) S that are parallel to the vertical direction in the image (v axis direction). When the processing device 122 totals the index values of pixels that are located on such a plurality of scanning lines S to obtain a total value for each scanning line S, a histogram of total values as shown in FIG. 24 may result. FIG. 24 is a diagram schematically showing a relationship between positions of scanning lines S and total values of index values, as obtained with respect to the plan view image of FIG. 23. From this histogram, edge lines of the crop rows 12 cannot be determined.

Figure 25:
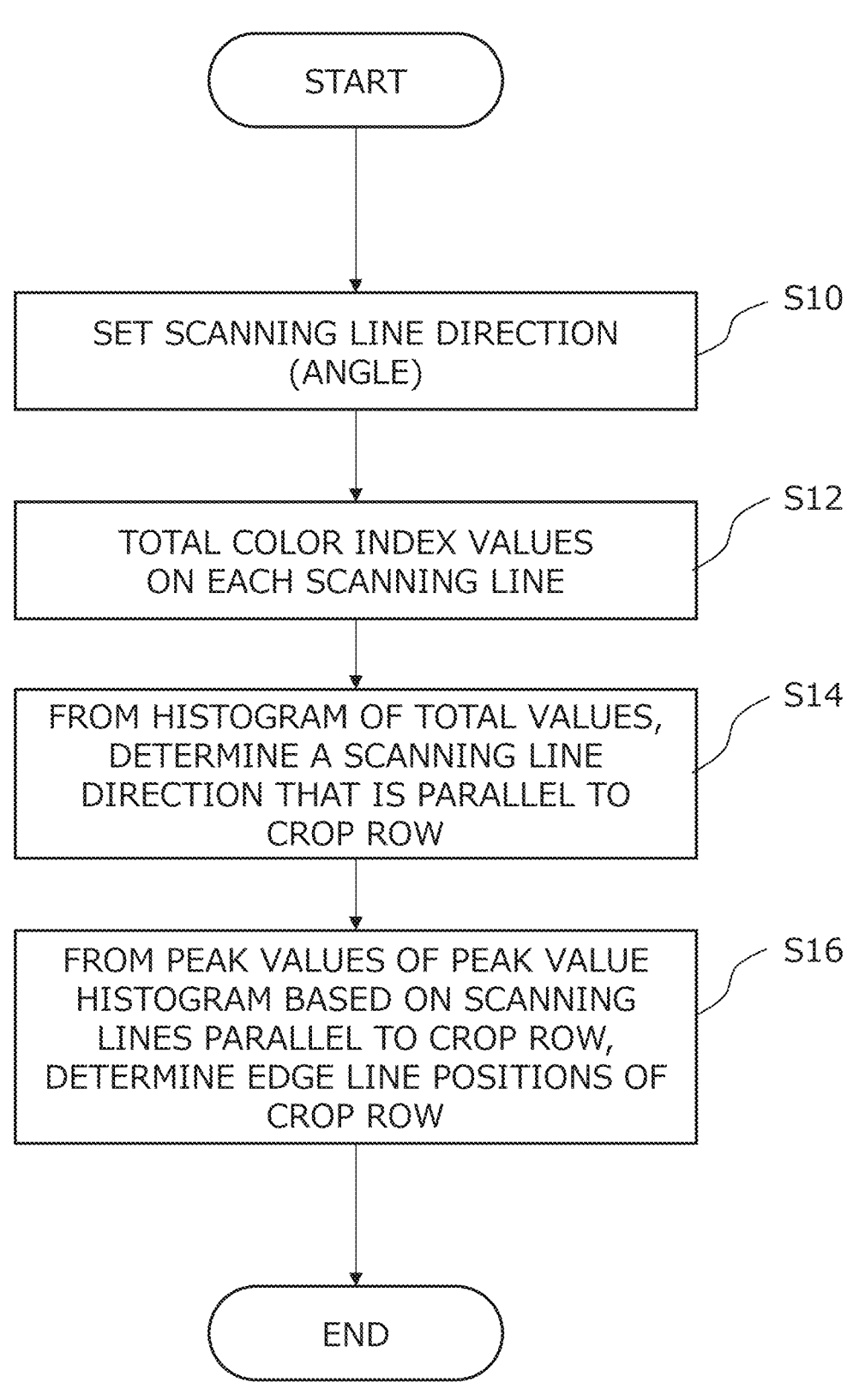
FIG. 25 is a flowchart showing an example algorithm by which a processing device in an example embodiment of the present disclosure determines edge lines of a crop row.

FIG. 25 is a flowchart showing an example procedure of varying the direction (angle) of scanning lines S in order to search for a direction (angle) of scanning lines S that is parallel to the direction of the crop rows 12.

At step S10, a direction (angle) of the scanning lines S is set. Herein, clockwise angles $\theta$ are defined relative to the u axis of the image coordinate system (see FIG. 21 and FIG. 23). The search through angles $\theta$ may be done by setting a range of, e.g., 60 to 120 degrees and using angle variations of 1 degree, for example. In this case, at step S1, 60, 61, 62, . . . , 119 and 120 degrees are given as the angle $\theta$ of scanning lines S.

At step S12, index values are totaled for the pixels on any scanning line S extending in the direction of each angle $\theta$, thereby generating a histogram of total values. The histogram will exhibit a different distribution depending on the angle $\theta$.

At step S14, from among a plurality of histograms thus obtained, a histogram is selected that has steep boundaries between bumps and dents, e.g., as shown in FIG. 22, such that the crop rows 12 are clearly distinguishable from the intermediate regions 14, and the angle $\theta$ of scanning lines S that is conducive to that histogram is determined.

At step S16, from the peak values of the histogram corresponding to the angle $\theta$ determined at step S14, edge lines of each crop row 12 are determined. As described above, positions of scanning lines S having a total value that is 0.8 times the peak, for example, may be adopted as the edge lines.

Note that, when searching through directions (angles) of the scanning lines S, each time the angle $\theta$ is varied by 1 degree within the range of search, a histogram of total values on the scanning lines S at that angle $\theta$ may be generated. A feature (e.g., recess depth/protrusion height, a differential value of the envelope, etc.) may be calculated from the waveform of the histogram, and based on that feature, it may be determined whether the direction of the crop rows 12 is parallel to the direction of the scanning lines S or not.

Note that the method of determining the angle $\theta$ is not limited to the above examples. In the case where the direction in which the crop rows extend is known through measurements, the direction of the agricultural machine may be measured with an inertial measurement unit (IMU) mounted on the agricultural machine 100, and its angle $\theta$ with respect to the direction in which the crop rows extend may be determined.

Figure 26:
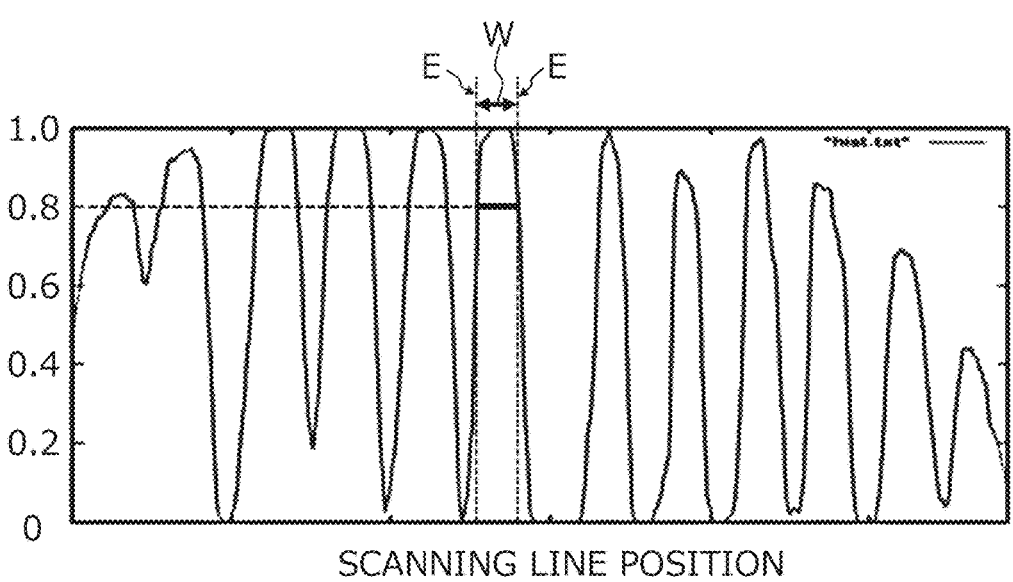
FIG. 26 is a diagram showing a total value histogram obtained from the plan view image of FIG. 19.

FIG. 26 is a diagram showing an example of a total value histogram that is generated by the plan view image of FIG. 19. For a protrusion of the histogram that is located in the center, scanning line positions that are 0.8 times its peak value are determined as the positions of edge lines E, for example. In this histogram, the protrusion peaks become lower and the protrusion peaks become more spread out as the scanning line positions become more distant toward the right and the left from the center. This is because, as is clear from the image of FIG. 19, the image has little distortion at the center of the plan view image, whereas distortion of the image increases away from the center toward the right and the left, and the black triangular regions located at opposite sides of the bottom side cause a decrease in the total values.

When detection of crop rows is utilized for the traveling of the agricultural machine, the crop rows to be accurately detected are at the center of the image or its vicinity. Therefore, distortion in regions near both ends of the right-left direction of the plan view image can be ignored.

Figure 27:
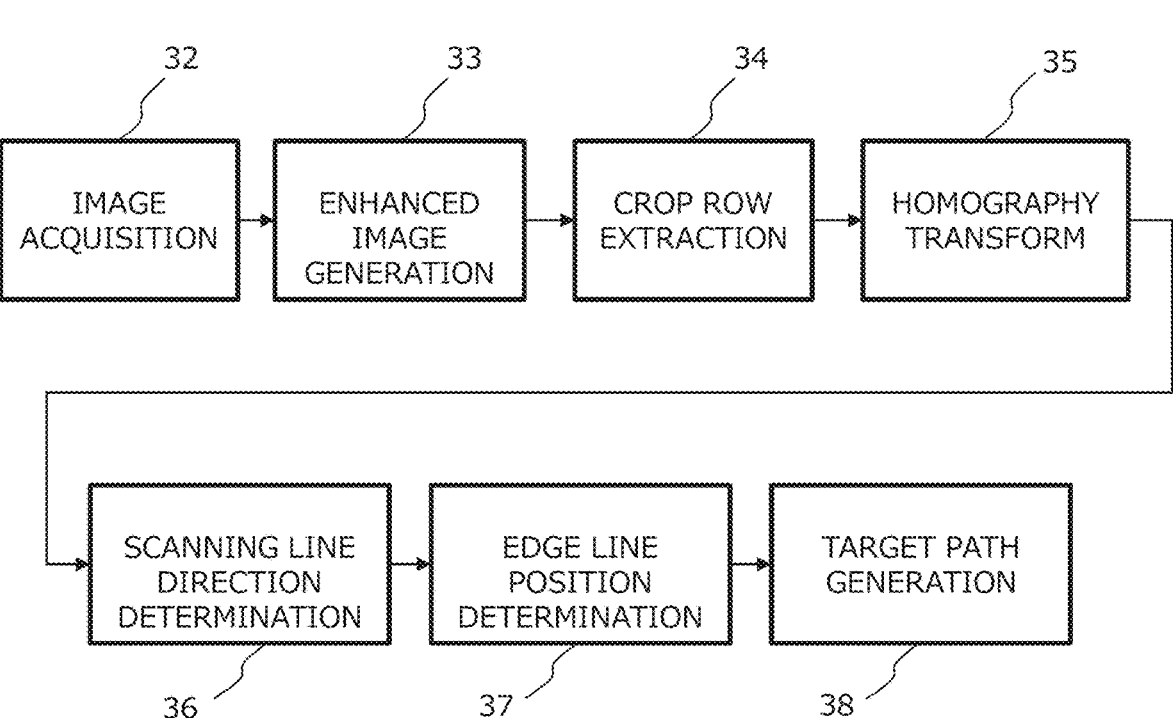
FIG. 27 is a block diagram showing processes that are executed by a processing device according to an example embodiment of the present disclosure.

FIG. 27 is a block diagram showing a series of processes that are executed by the processing device 122 according to the present example embodiment. As shown in FIG. 27, by executing an image acquisition 32, an enhanced image generation 33, a crop row extraction 34, and a homography transformation 35, the processing device 122 is able to obtain the plan view image 44 shown in FIG. 23, for example. By further executing a scanning line direction determination 36 and an edge line position determination 37, the processing device 122 is able to obtain the positions of edge lines of the crop rows. Thereafter, the processing device 122, or a path generator that has acquired information indicating the positions of the edge lines from the processing device 122, is able to execute a target path generation 38 for the agricultural machine, on the basis of the edge lines. A target path may be generated such that wheels that are included in the agricultural machine are maintained within an intermediate region (work path) 14 that is interposed between the edge lines E. For example, a target path may be generated such that the central portion along the width direction of any tire that is attached to a metal wheel passes through the center between two edge lines that are located at both ends of an intermediate region (work path) 14. With such a target path, even if the agricultural machine goes off the target path during travel by about several centimeters, the tires are less likely to go into a crop row.

It has been confirmed that, according to example embodiments of the present disclosure, crop row detection with high accuracy is possible by reducing or preventing the influences of forward light, backlight, sunny weather, cloudy weather, fog, and other weather conditions, or daylighting conditions that vary depending on the time zone of work. It has also been confirmed that crop row detection with high robustness is possible even when there is a change in the kind of crop (cabbage, broccoli, radish, carrot, lettuce, Chinese cabbage, etc.), growth state (from seedling to fully grown), presence/absence of diseases, presence/absence of fallen leaves or weeds, and soil color.

In the above example embodiment, thereafter homography transformation is executed after performing a step of determining a binarization threshold and extracting crop regions based on pixels at a threshold or above. However, the step of extracting crop regions may be performed after homography transformation. Specifically, in the series of processes shown in FIG. 27, the homography transformation 35 may be executed between the enhanced image generation 33 and the crop row extraction 34, or executed between the image acquisition 32 and the enhanced image generation 33.

Hereinafter, a modified example of the method of row detection to be performed by an image recognition system according to the present disclosure will be described.

Figure 28:
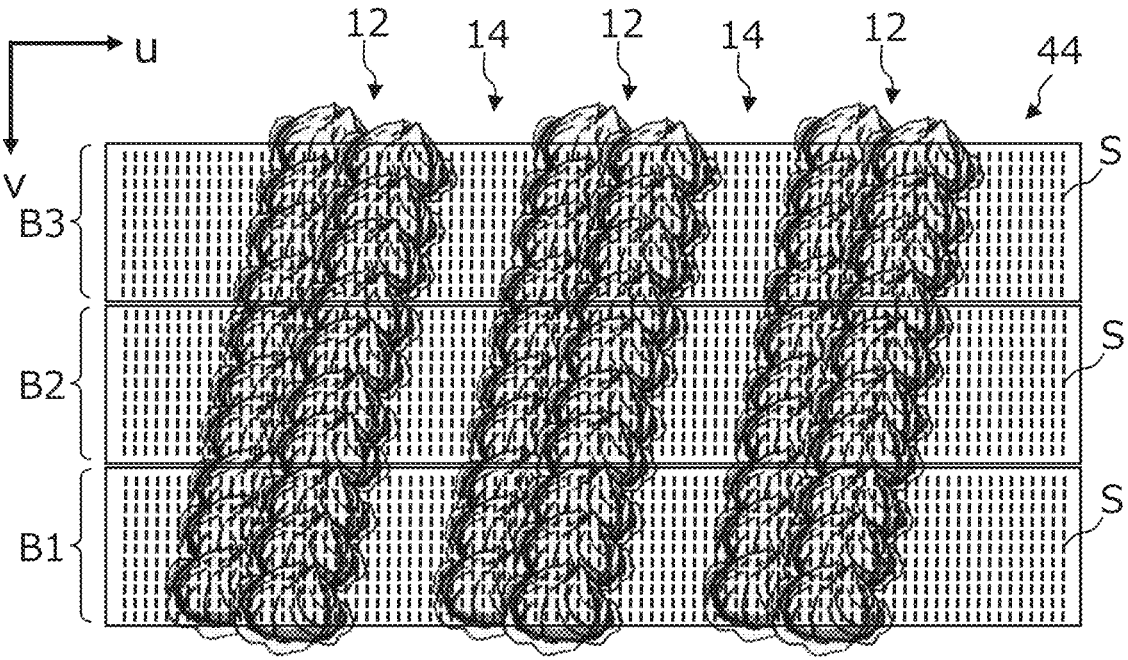
FIG. 28 is a diagram for describing an implementation in which a plan view image is split into a plurality of blocks.

FIG. 28 is a diagram for describing a method which splits a whole or a part of the plan view image into a plurality of blocks, and determines the positions of edge lines for each of the plurality of blocks.

In this modified example, the processing device 122 splits a whole or a part of the plan view image 44 into a plurality of blocks. Then, for each of the plurality of blocks, the positions of edge lines E of crop rows 12 are determined. In the illustrated example, in the plan view image, there are three blocks B1, B2 and B3 in belt shapes that are continuous along the horizontal direction in the image. The processing device 122 is able to determine edge lines of crop rows based on a belt shape in a direction that is different from the traveling direction of the agricultural machine 100.

Figure 29:
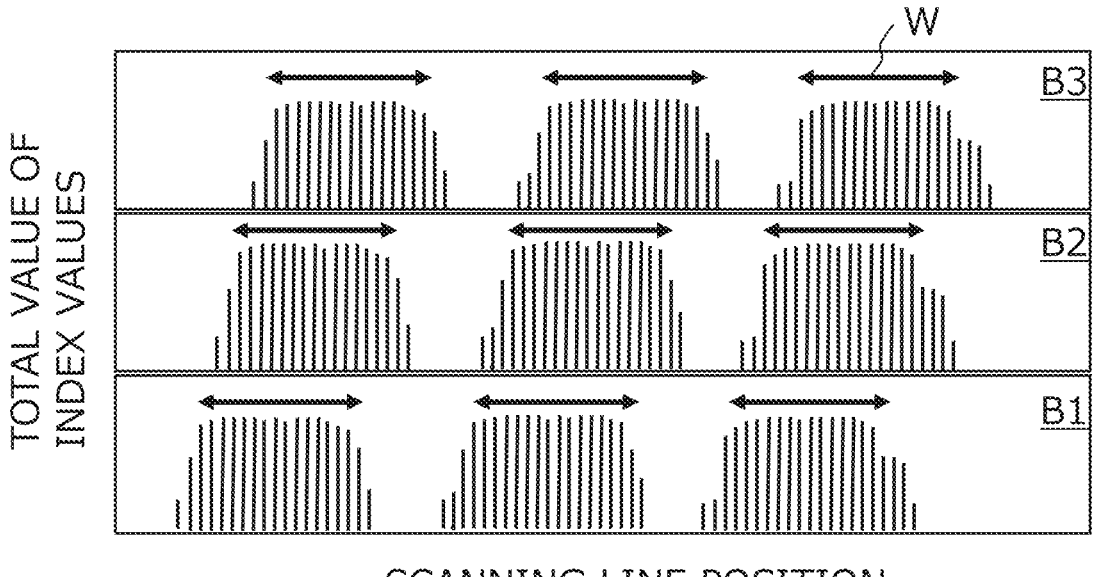
FIG. 29 is a diagram schematically showing a relationship between positions of scanning lines and total values of index values for each of the blocks in FIG. 28.

FIG. 29 is a diagram schematically showing a relationship (total value histogram) between positions of scanning lines S and total values of index values for each of blocks B1, B2 and B3 of the plan view image of FIG. 28. The scanning line S for which to perform totalization is always parallel to the vertical direction in the image. Totalization of index values is performed block by block, and there is no need to change the direction (angle) of the scanning lines S. By reducing the length of the scanning lines S, even if the crop rows 12 extend obliquely, it is possible to appropriately detect regions of the second pixels (background pixels) that are ascribable to the intermediate regions (work paths) 14. This eliminates the need to change the angles of the scanning lines S.

In FIG. 29, both ends of an arrow W indicate the positions of edge lines of a crop row, as determined for each of blocks B1, B2 and B3. In the example shown in FIG. 28, the directions of the crop rows 12 are inclined with respect to the direction of the scanning lines S. Therefore, in the earlier-described case where scanning line positions exhibiting a value that is, for example, 0.8 times a peak value of the total value histogram are adopted as the positions of edge lines E of a crop row 12, the positions of such edge lines E correspond to both ends of a "width" passing near the center of the crop row 12, in each of blocks B1, B2 and B3.

Figure 30:
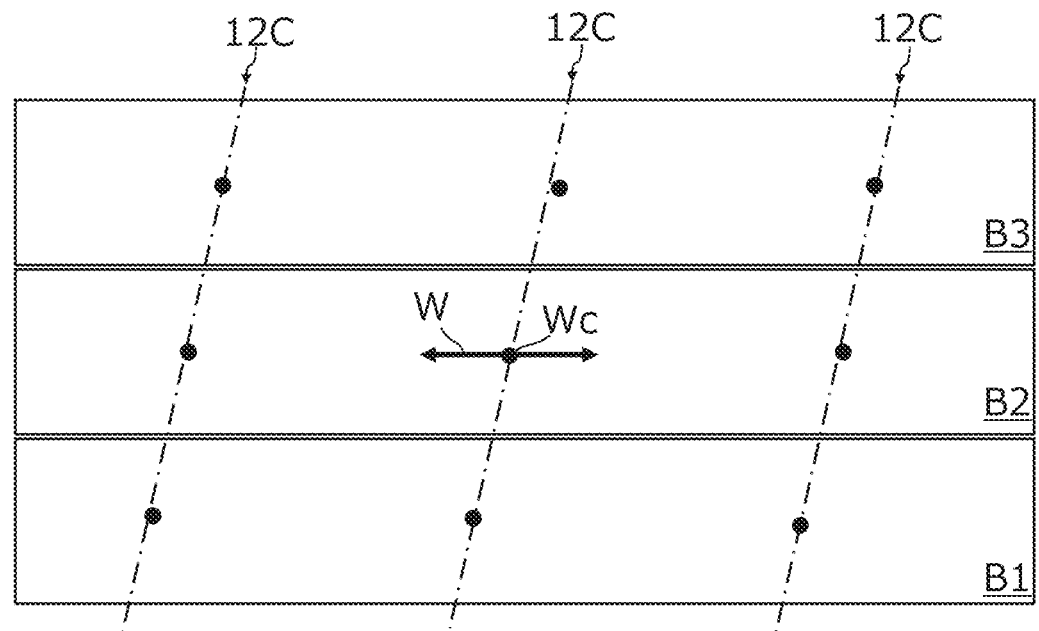
FIG. 30 is a diagram showing an example of crop row centers in each of the blocks in FIG. 29 and approximation lines for the crop row centers.

FIG. 30 shows crop row centers Wc in each of blocks B1, B2 and B3 in FIG. 29. A crop row center Wc is determined from the center of an arrow W that defines the edge lines of a crop row as determined from the total value histogram of FIG. 29, and is located at the center of each block along the vertical direction in the image. FIG. 30 shows examples of approximation line 12C for crop row centers Wc belonging to each identical crop row 12. An approximation line 12C is a straight line that is determined so that a mean square of its distances (errors) from the plurality of crop row centers Wc of each crop row 12 is minimum, for example. Such an approximation line 12C corresponds to a line passing through the center of the crop row 12.

Figure 31:
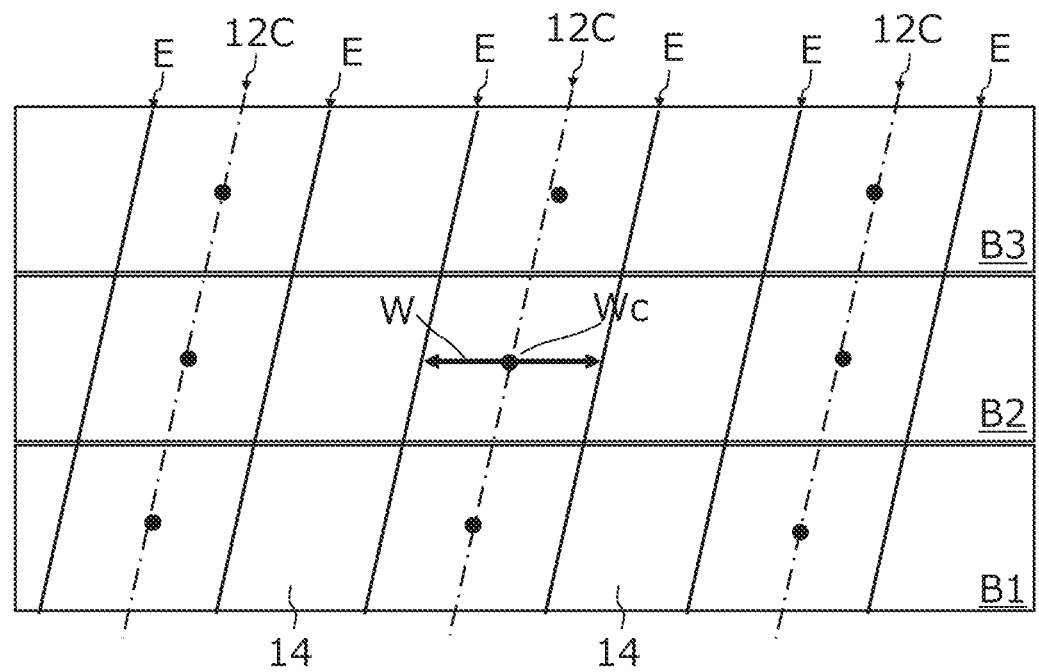
FIG. 31 is a top view showing examples of edge lines of crop rows as determined from the approximation lines in FIG. 30.

FIG. 31 is a top view showing examples of edge lines E of crop rows 12 as determined from the approximation lines 12C in FIG. 30. In this example, two edge lines E that are associated with each crop row 12 have an interval that is equal to the length of an arrow W, and are at equidistant positions from an approximation line 12C.

According to this modified example, there is no need to change the directions (angles) of the scanning lines, and the edge lines E of the crop rows 12 can be determined with less computational load. Note that the length of each block along the vertical direction in the image may be set to an equivalent of a distance of 1 to 2 meters on the ground surface, for example. Although this modified example splits one image into three blocks to derive total value histograms, the number of blocks may be four or more. The block shape are not limited to the above examples. In the plan view image, the block may be in belt shapes that are continuous along either the horizontal direction in the image or the vertical direction in the image. The processing device 122 is able to determine the edge lines of the crop rows through splitting into blocks of belt shapes extending in a direction that is different from the traveling direction of the agricultural machine 100.

Figure 32:
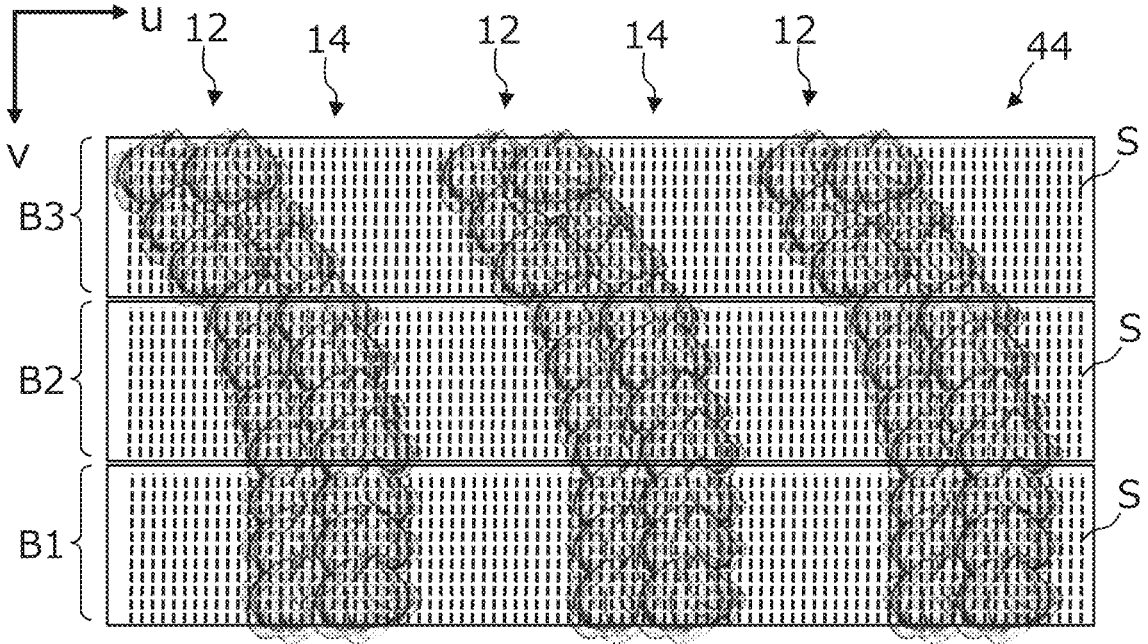
FIG. 32 is a diagram for describing a method which, in the case where crop rows include portions that are bent in curve shapes, splits a whole or a part of the plan view image into a plurality of blocks, and determines the positions of edge lines for each of the plurality of blocks.
Figure 33:
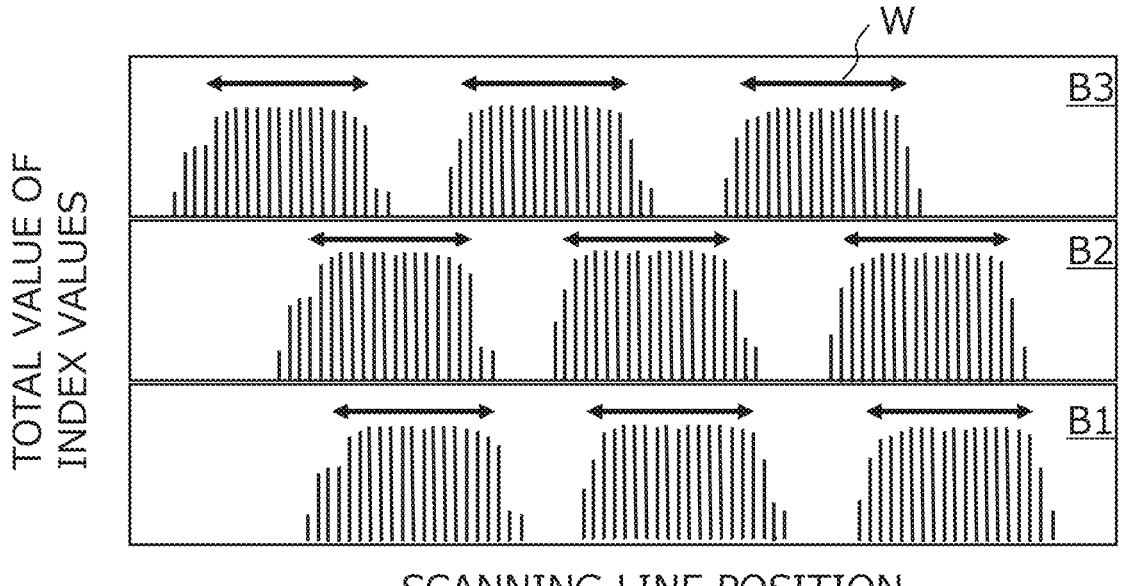
FIG. 33 is a diagram schematically showing a relationship between positions of scanning lines and total values of index values (histogram) for each of the blocks in FIG. 32.

FIG. 32 schematically illustrates the crop rows 12 in the plan view image 44 including portions that are bent in curve shapes. FIG. 33 schematically shows a total value histogram for each of blocks B1, B2 and B3 of the plan view image 44 of FIG. 32.

Figure 34:
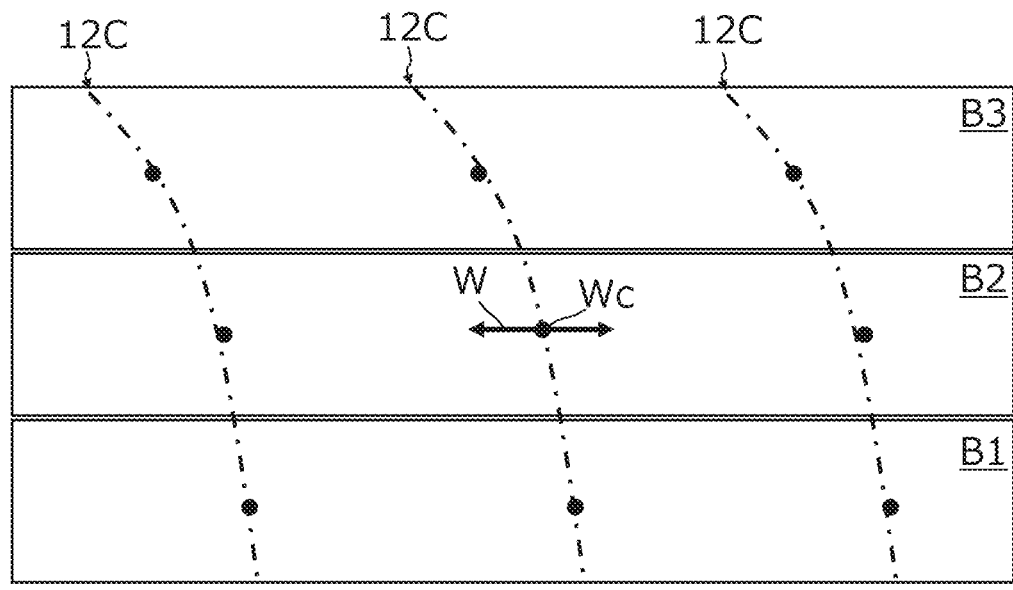
FIG. 34 is a diagram showing an example of crop row centers in each of the blocks in FIG. 33 and approximation lines for the crop row centers.

FIG. 34 is a diagram showing crop row centers Wc in each of blocks B1, B2 and B3 in FIG. 33, and examples of approximation lines 12C for the respective crop row centers Xc. An approximation line 12C in this example is a curve (e.g., a higher-order curve such as a cubic curve) that is derived so that a mean square of its distances (errors) from the crop row centers Wc of each crop row 12 is minimum, for example. Such approximation lines 12C correspond to curved lines which pass through the centers of the crop rows 12 having a curved portion.

Figure 35:
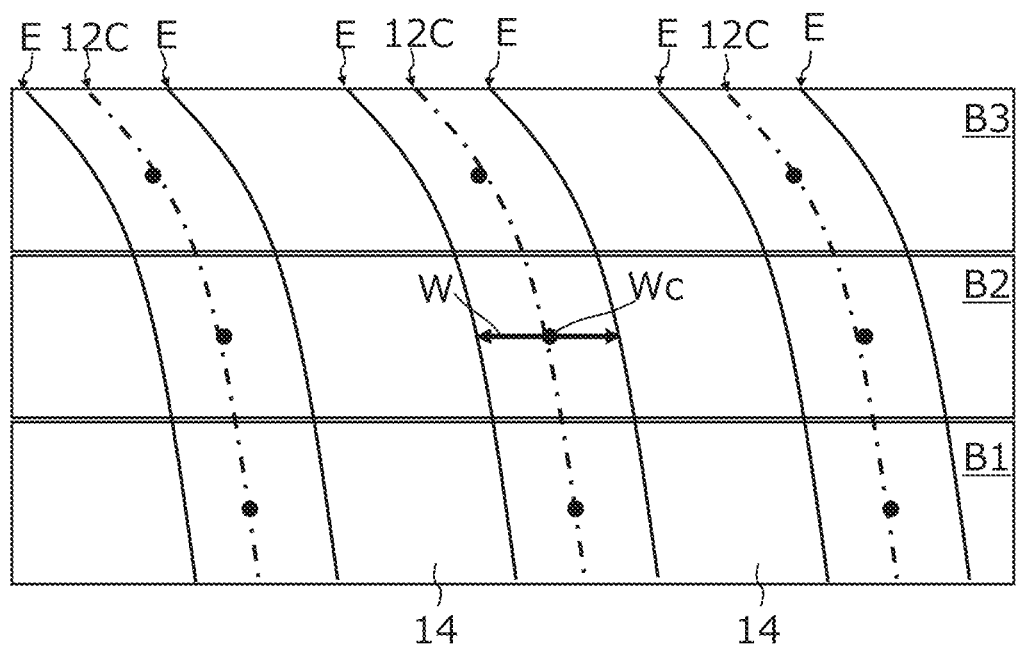
FIG. 35 is a top view showing examples of edge lines of crop rows as determined based on the approximation curves in FIG. 34.

FIG. 35 is a top view showing examples of edge lines E of crop rows 12 as determined from the approximation lines in FIG. 34. The edge lines E are generated by a similar method to the method that has been described with reference to FIG. 31. In other words, two edge lines E that are associated with each crop row 12 have an interval that is equal to the length of an arrow W, and are at equidistant positions from an approximation line 12C.

As described above, by splitting the plan view image into a plurality of blocks and generating a total value histogram for each block, it becomes easy to determine the direction of a crop row, and even if the crop row changes its direction in the middle, it is possible to know the direction after the change.

The above-described methods of row detection can all be implemented by a computer, and carried out by causing the computer to execute desired operations.

As can be seen from the above explanation, in order to determine the positions of edge lines E of crop rows 12 with a high positional accuracy, it is preferable to increase the number of scanning lines, or reduce the length of each block along the vertical direction in the image. However, performing row detection by the above method for all of the time-series images that are acquired by the imaging device 120 or the entire range of each image may increase the computational load for the processing device 122.

As described above, after the image recognition system 1000 has started the image processing operation in response to the operator selecting the automatic steering mode with the mode switch 114, the period until detecting a row region such as a crop row may be used for a low-positional accuracy detection process. This low-positional accuracy detection process may be, for example, a process that is directed to some selected images among the time-series images acquired by the imaging device 120 as the target. Then, once a row region is detected, it is preferable to start a detection process with an enhanced positional accuracy by increasing the number of scanning lines, reducing the length of each block along the vertical direction in the image, or increasing the number of blocks. In a state where a row region has been detected and it has been determined that row-following travel is possible, after the operator issues a command to start row-following travel with the start switch 112, a detection process with an enhanced accuracy may be started.

Thus, by carrying out the processing to be performed by the image recognition system 1000 in two or more steps, it becomes possible to reduce the computational load for the processing device 122 in effect. Moreover, because a computation to determine a row region that is executed with a high positional accuracy imposes a high computational load on the processing device 122 of the image recognition system 1000, it is preferable to start the execution based on a command from the command generator 119 (FIG. 7) as a trigger.

In order to determine row detection, the aforementioned blocks may be set in a region (interest region) that is selected from within the image. When starting row-following travel, the image recognition system 1000 may perform a process of selecting an interest region as a target of image recognition processing, such that the interest region during the row-following travel is smaller than the interest region before the row-following travel. Specifically, before the row-following travel, in order to determine positions where following travel is possible, a range that is estimated to include, e.g., two crop rows on both sides from the right and left wheels is selected as an interest region. On the other hand, when starting row-following travel, a range that includes crop rows adjacent to the right and left wheels is selected as an interest region. Thus, during row-following travel, by reducing the interest region before the row-following travel at least along the right-left width direction, such that a relatively narrow range that includes a row region(s) to be followed is selected as the interest region, the computational load of the processing device 122 can be reduced.

Row detection by an image recognition system according to an illustrative second example embodiment of the present disclosure will be described. In the present example embodiment, ridge detection is performed as a "row detection".

Figure 36:
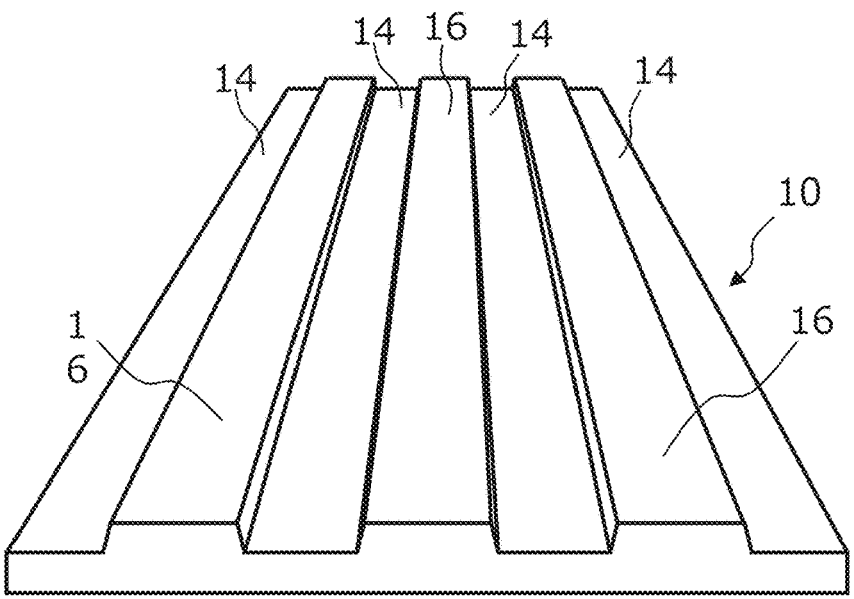
FIG. 36 is a perspective view schematically showing rows of ridges made on the ground surface.

FIG. 36 is a perspective view schematically showing rows of ridges 16 made on the ground surface 10. "Ridges" are places where plants for serial sowing or serial planting are to be planted, in which earth is raised high at intervals to result in bumps that extend essentially linearly. A cross-sectional shape of a ridge 16 taken perpendicularly to the direction in the ridge 16 extends may be, schematically, a trapezoid, a semicylindrical shape, or semicircular shape. In FIG. 36, ridges 16 having a trapezoidal cross section are schematically shown. The actual ridges will not have such simple shapes as those shown in FIG. 36. What exists between two adjacent ridges 16 is an intermediate region 14, called interridge land. The intermediate regions 14 function as work paths. Crops may be planted in the ridges 16; or, without planting having taken place, only the soil may be exposed on the ridges 16 as a whole. Each of the ridges 16 may be covered with a mulch.

The height, width, and intervals of the ridge 16 do not need to be uniform, but may vary from place to place. Generally speaking, the height of a ridge 16 is a difference of the ridge in height from the interridge land. In the present specification, the "height" of a ridge 16 is defined by the distance to an upper surface of the ridge 16 from the aforementioned reference plane Re.

In the example of FIG. 36, the edge lines of the ridges 16 are clear. However, actual ridges 16 are portions of the ground surface 10 that are continuous from the intermediate regions 14, and the "cross-sectional shapes" of the ridges 16 may be various as aforementioned; therefore, the boundaries between the ridges 16 and the intermediate regions 14 are not always clear. In example embodiments of the present disclosure, the edge lines of a ridge 16, i.e., the boundaries between a ridge 16 and intermediate regions 14, are defined as positions that are located on opposite sides of a peak of the ridge 16, the positions being at a height which accounts for a predetermined rate with respect to the peak. The positions of edge lines are positions having a height that is 0.8 times the peak of each ridge 16, for example.

As shown in FIG. 2, an image recognition system 1000 according to the present example embodiment also includes an imaging device 120 and a processing device 122 that performs image processing for time-series color images that have been acquired from the imaging device 120. The hardware configuration of the processing device 122 is identical to the configuration of the processing device 122 according to the first example embodiment.

In the present example embodiment, the processing device 122 acquires time-series images from the imaging device 120, and performs operations S21, S22 and S23 below.

(S21) from a plurality of images among time-series images that have been acquired at different points in time, determine a first amount of movement of each of a plurality of feature points in an image plane, through feature point matching.

(S22) through perspective projection of each of the plurality of feature points from the image plane onto a reference plane corresponding to the ground surface, determine a second amount of movement of each projection point in the reference plane based on the first amount of movement.

(S23) based on the second amount of movement, estimate heights of the plurality of feature points from the reference plane to detect a ridge on the ground surface.

Hereinafter, specific examples of operations S21, S22 and S23 will be described in detail.

First, operation S21 will be described. In operation S11, from a plurality of images among the time-series images that have been acquired at different points in time, a first amount of movement of each of the plurality of feature points in an image plane is determined through feature point matching. The time-series images are an aggregation of images that are chronologically acquired by the imaging device 120 through imaging. The time-series images do not need to be color images, but may be color images. In the case where the imaging device 120 outputs time-series color images, the processing device 122 may apply gray-scale processing to a given color image for processing among the time-series color images. As has been described with reference to the first example embodiment, each image is composed of a frame-by-frame group of pixels. Similarly, the frame rate is as has been described with reference to the first example embodiment.

Figure 37:
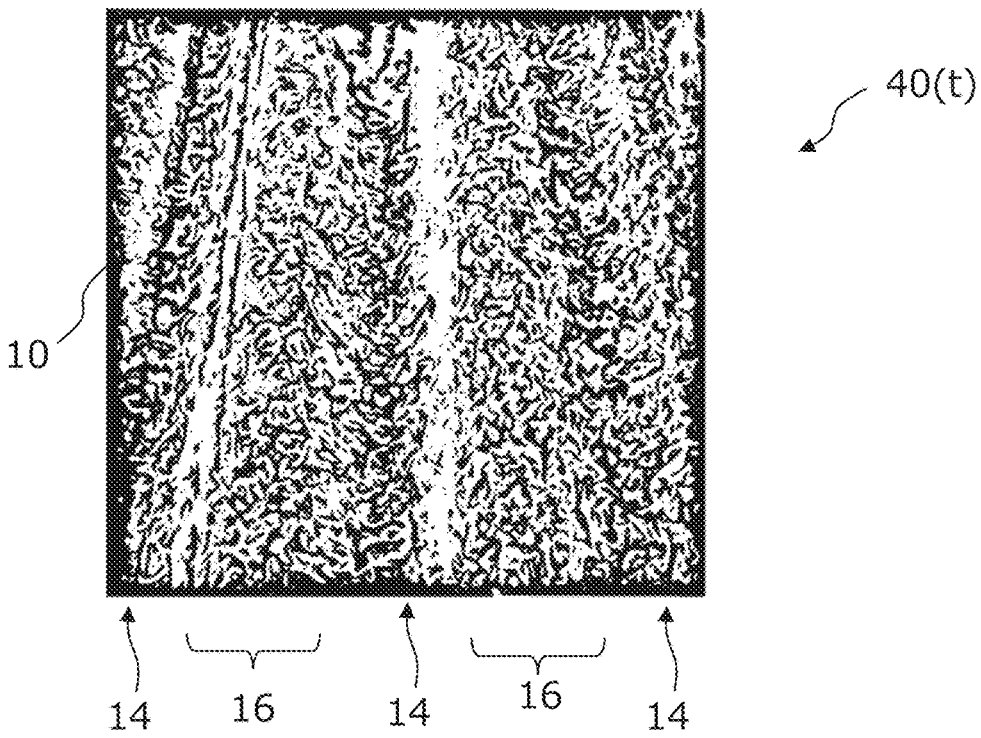
FIG. 37 is a diagram showing an image acquired from the imaging device at time t.

FIG. 37 shows one frame of image 40(t) among time-series images acquired by the imaging device (which in this example is a monocular camera) 122 mounted on the agricultural machine 100 at time t. In this example, crops are not planted on the ridges 16. The data of the image 40(t) captured by the monocular camera does not contain depth information. Therefore, it is impossible to know from the single image 40(t) the difference in height between the ridges 16 and the intermediate regions 14.

Not only at time t but also at other points in time, e.g., time t+1, t+2, t+3, . . . , the imaging device 120 chronologically acquires an image 40(t+1), an image 40(t+2), and image 40(t+3), . . . Each of the plurality of images that are chronologically acquired by the imaging device 120 during the travel of the agricultural machine 100 may contain the same region of the ground surface 10 in a partially overlapping manner.

In the present example embodiment, the processing device 122 extracts feature points from the image 40(t), the image 40(t+1), . . . A "feature point" is a point whose pixel(s) has a luminance value or color that is distinguishable from those of the surrounding pixels, such that the position(s) of the pixel(s) can be identified within the image. By extracting feature points in the image, a plurality of images that have captured the same scene can be associated with one another. In a region of the image where the luminance value and color are uniform, it is difficult to distinguish any pixel in that region from the surrounding pixels. Therefore, a feature point is to be selected from within a region in which the luminance value or color locally changes within the image. A feature point is a pixel or a group of pixels that has a "local feature".

In the present example embodiment, the purpose of extracting a feature point is to measure an amount of movement of the feature point through feature point matching from time-series images 40(t), 40(t+1), . . . that are acquired while the agricultural machine 100 is moving. Extraction of a feature point that is suitable for such feature point matching can be performed by the processing device 122 based on image processing. Examples of feature-point extraction algorithms based on image processing include SIFT (Scale-invariant feature transform), SURF (Speed-Upped Robust Feature), KAZE, and A-KAZE (ACCELER-ATED-KAZE). Similarly to SIFT or SURF, KAZE and A-KAZE are feature-point extraction algorithms that are robust because of their strength in scaling, rotation, and changes in lighting. Unlike SIFT and SURF, KAZE and A-KAZE do not employ a Gaussian filter. Therefore, KAZE and A-KAZE are unlikely to be affected by rotation, scales, and changes in luminance values, and are able to extract feature points even from a region of the image where changes in the luminance value and color are relatively small. This makes it easy to extract feature points that are suitable for feature point matching, even from an image of the soil surface or the like. As compared to KAZE, A-KAZE is advantageous due to its high robustness and ability to enhance the processing speed. In the present example embodiment, the A-KAZE algorithm is used to extract feature points. However, the algorithm for feature point matching is not limited to this example.

Figure 38:
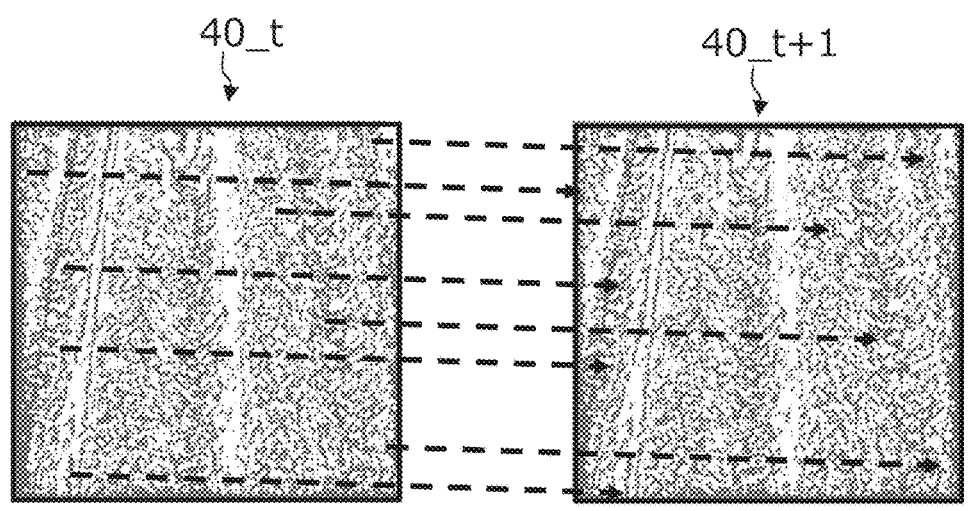
FIG. 38 is a diagram schematically showing a correspondence of feature points between an image acquired from the imaging device at time t and an image acquired at time t+1.

FIG. 38 schematically shows a correspondence of feature points between the image 40(t) acquired from the imaging device at time t and the image 40(t+1) acquired at time t+1. Herein, the time interval between time t and time t+1 may be, e.g., not less than 100 milliseconds and not more than 500 seconds.

Finding the association between a plurality of feature points extracted from the image 40(t) and a plurality of feature points in the image 40(t+1) corresponding to the aforementioned plurality of feature points is carried out by the algorithm of feature point matching. In FIG. 38, 8 pairs of corresponding feature points are connected by arrows. In the present example embodiment, by A-KAZE, the processing device 122 is able to extract, e.g., hundreds to over one thousand feature points from each of the image 40(t) and the image 40(t+1). The number of feature points to be extracted may be determined based on the number of images to be processed in one second.

After performing such feature point matching, for each of the plurality of feature points, the processing device 122 determines an amount of movement (first amount of movement) in the image plane. It is not that the first amount of movement determined from the two images 40(t) and 40(t+1) has one common value for all feature points. Depending on the physical difference in height between feature points existing on the ground surface 10, the first amount of movement exhibits different values.

Figure 39:
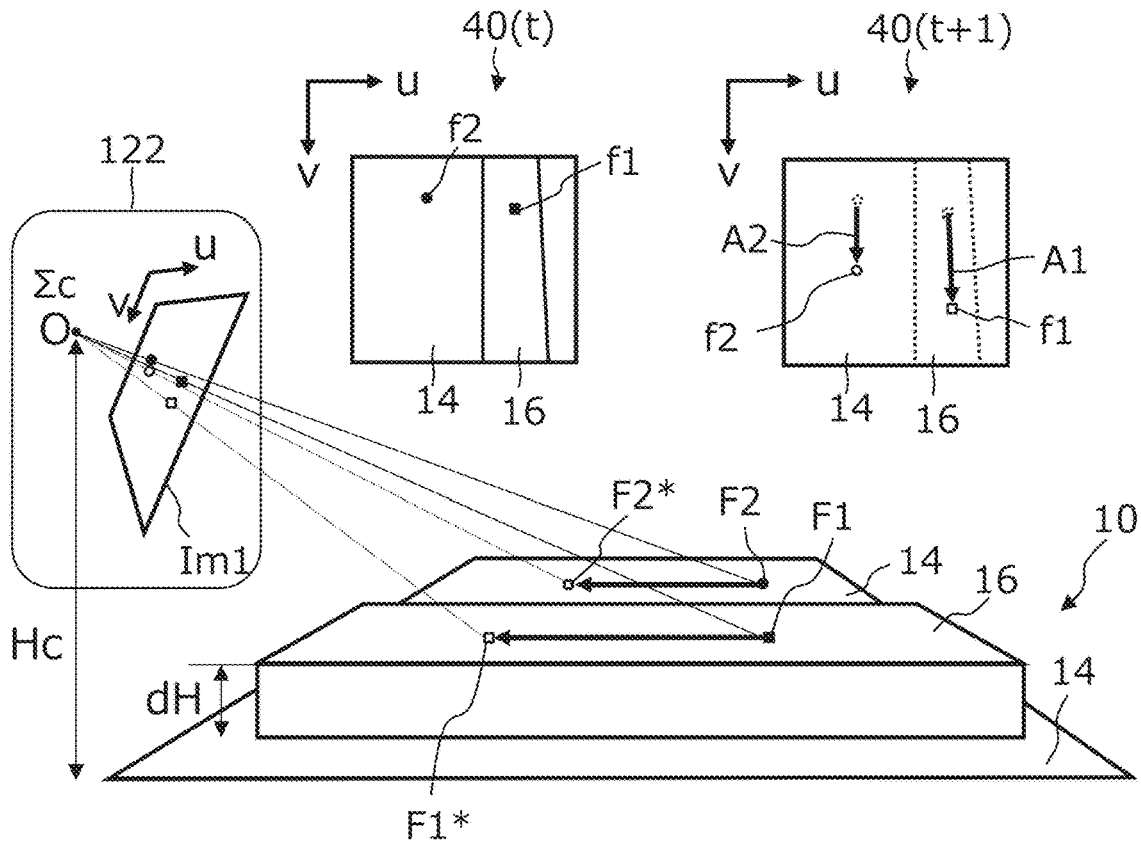
FIG. 39 is a perspective view schematically showing the movements of feature points on a ridge and an intermediate region (work path) appearing in images acquired by the imaging device.

FIG. 39 is a perspective view schematically showing the movement of a ridge 16 and an intermediate region (work path) 14 appearing in images acquired by the imaging device 120, where the image 40(t) and the image 40(t+1) are also schematically shown. FIG. 39 schematically shows how a point F1 on the ridge 16 and a point F2 on the intermediate region (interridge land or work path) 14 may horizontally move toward the left side of the figure. This horizontal movement is a relative motion that occurs as the imaging device 120 fixed to the agricultural machine 100 moves toward the right side together with the agricultural machine 100. In FIG. 39, for simplicity, an origin O of the camera coordinate system Σc of the imaging device 120 is kept stationary, while the ground surface 10 moves toward the left side. The origin O of the camera coordinate system Σc has a height Hc. In the illustrated example, the ridge 16 is a simplified ridge shape having a height dH.

In the image 40(t) of FIG. 39, the feature point f1 of the ridge 16 and the feature point f2 of the intermediate region 14 are shown. These feature points f1 and f2 are examples of a multitude of feature points which are extracted by a feature-point extraction algorithm such as A-KAZE. In the image 40(t+1), the feature points f1 and f2 after the movement are shown. Also in the image 40(t+1), for referencing sake, arrow A1 indicating the movement of the feature point f1 and arrow A2 indicating the movement of the feature point f2, during the period of time from time t to t+1, are shown. The length of arrow A1 (corresponding to the first amount of movement) is greater than the length of arrow A2 (corresponding to the first amount of movement). Thus, the amount of movement of a feature point in the image (first amount of movement) differs depending on the distance of the corresponding point of the subject from the origin O of the camera coordinate system Σc. This id due to the geometric nature of perspective projection.

The feature points f1 and f2 in the image 40(t) are, respectively, points resulting through a perspective projection of the points F1 and F2 on the ground surface 10, as the subjects, onto the image plane Im1 of the imaging device 120. Similarly, the feature points f1 and f2 in the image 40(t+1) are, respectively, points resulting through a perspective projection of the points F1* and F2* on the ground surface 10, as the subjects, onto the image plane Im1 of the imaging device 120. The center point of perspective projection is the origin O of the camera coordinate system Σc of the imaging device 120. Since perspective projection has a bidirectional relationship, the points F1 and F2 can be said to be points resulting through a perspective projection of the feature points f1 and f2 in the image 40(t) onto the ground surface 10. Similarly, the points F1* and F2* can be said to be points resulting through a perspective projection of the feature points f1 and f2 in the image 40(t) onto the ground surface 10.

As shown in FIG. 39, from time t to time t+1, the point F1 on the ridge 16 moves to the position of the point F1*, and the point F2 on the intermediate region 14 moves to the position of the point F2*. The distances of these movements are each equal to the distance (distance of horizontal movement) that was traveled by the agricultural machine 100 from time t to time t+1. On the other hand, the amounts of movement of the feature points f1 and f2 on the image plane Im1 of the imaging device 120 are different from each other.

Figure 40:
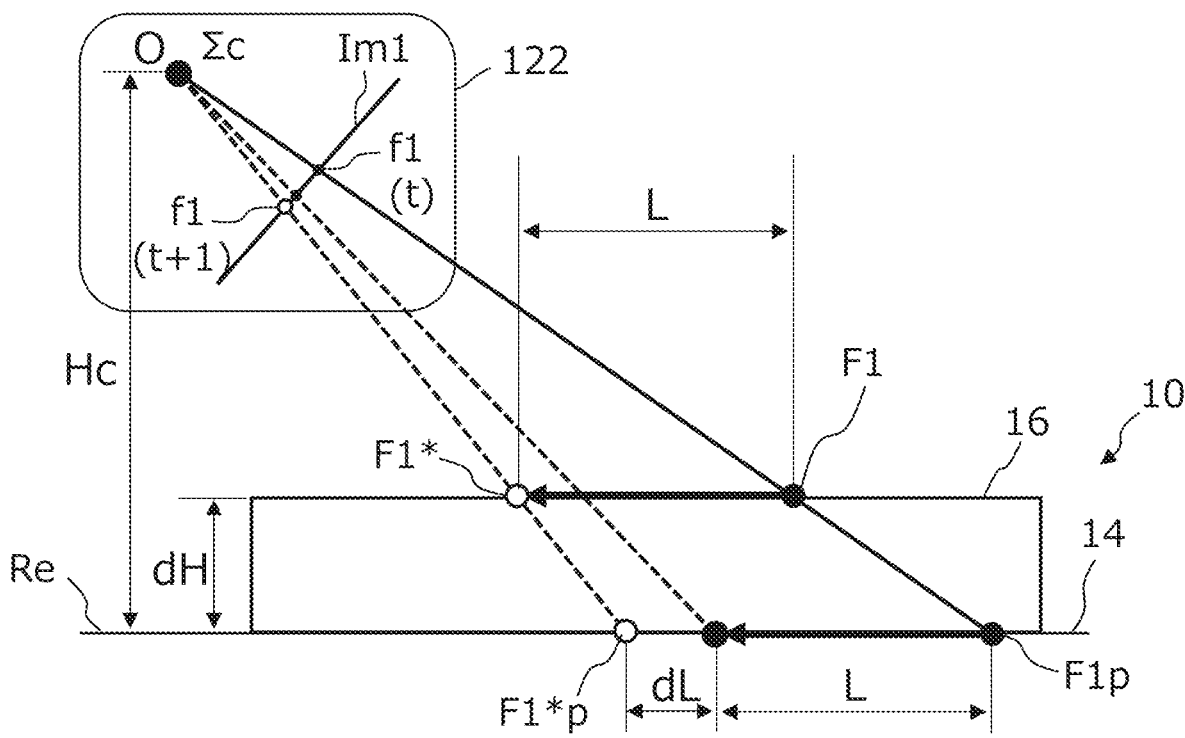
FIG. 40 is a diagram schematically showing a relationship between: the amount of movement (first amount of movement) of a feature point projected onto the image plane; and the amount of movement (second amount of movement) of the feature point projected onto the reference plane.

FIG. 40 is a diagram schematically showing a relationship between the amount of movement (L) of the point F1 on the ridge 16, corresponding to the feature point f1 on the image plane Im1 of the imaging device 120, and the amount of movement (second amount of movement L+dL) of a point (projection point) F1p projected onto the reference plane Re. In this example, the height of the reference plane Re is matched to the height of the intermediate region (interridge land) 14, while the ridge 16 has the height dH.

As can be seen from FIG. 40, the point F1 on the ridge 16 has moved toward left by a distance (amount of movement) L that is equal to the traveled distance of the agricultural machine 100; however, the amount of movement (second amount of movement) of the point (projection point) F1p resulting through perspective projection onto the reference plane Re is expressed as L+dL, which is longer than L. This is because the point F1 on the ridge 16 is at a higher position than the reference plane Re, and is closer to the center (origin O of the camera coordinate system) of the perspective projection. Corresponding to this excess length dL, the amount of movement (first amount of movement) on the image plane Im1 is increased.

From the ratio (homothetic ratio) between lengths of the sides of two homothetic triangles shown in FIG. 40, the following formula is derived.

$$\frac{Hc}{L+dL} = \frac{(Hc-dH)}{L} \qquad \text{Equation 6}$$

The above formula is transformed to give the following formula.

$$dH = Hc\left(1.0 - \frac{L}{L+dL}\right) \qquad \text{Equation 7}$$

In order to estimate the size of a bump-dent difference on the ground surface 10 based on the above formula, the processing device 122 according to the present example embodiment performs operation S22. That is, each of the plurality of feature points is perspective-projected from the image plane onto the reference plane Re corresponding to the ground surface 10, and the second amount of movement (L+dL) of each projection point in the reference plane Re is determined based on the first amount of movement. The distance L in the above formula can be acquired by measuring the traveled distance of the agricultural machine 100. Moreover, the height Hc of the origin O of the camera coordinate system from the reference plane Re is known. Therefore, once the second amount of movement (L+dL) becomes known, the height dH of the ridge 16 can be calculated from the formula of Equation 7. The second amount of movement (L+dL) itself can be determined from the first amount of movement.

After performing operation 522, the processing device 122 performs operation 523.

In operation S23, based on the second amount of movement (L+dL) of each feature point, the processing device 122 estimates the height dH of each feature point from the reference plane Re, and detects the ridge 16 on the ground surface 10.

Thus, in the present example embodiment, given a height Hc of the center point O of perspective projection from the reference plane Re, heights dH of the plurality of feature points from the reference plane Re, a second amount of movement L of a feature point (whose dH is zero) on the reference plane Re, and a second amount of movement L+dL of a feature point whose dH is greater than zero, the height of each feature point can be determined as Hc·(1.0− L/(L+dL)).

When determining the second amount of movement from the first amount of movement, homography transformation can be utilized. Specifically, by using the aforementioned inverse H1$^{-1}$ of the transformation matrix H1, the coordinates of each feature point on the image plane Im1 may be converted into coordinates of a corresponding point on the reference plane Re. Therefore, first, the processing device 122 determines a first amount of movement from the coordinates of each feature point on the image plane Im1 before and after the movement. Next, after the coordinates of each feature point are changed through homography transformation into coordinates of a corresponding point on the reference plane Re, a second amount of movement can be determined from the coordinates before and after the movement on the reference plane Re.

$$\begin{pmatrix} X \\ Y \\ 1 \end{pmatrix} = H1^{-1} \begin{pmatrix} u \\ v \\ 1 \end{pmatrix} \qquad \text{Equation 8}$$

Figure 41:
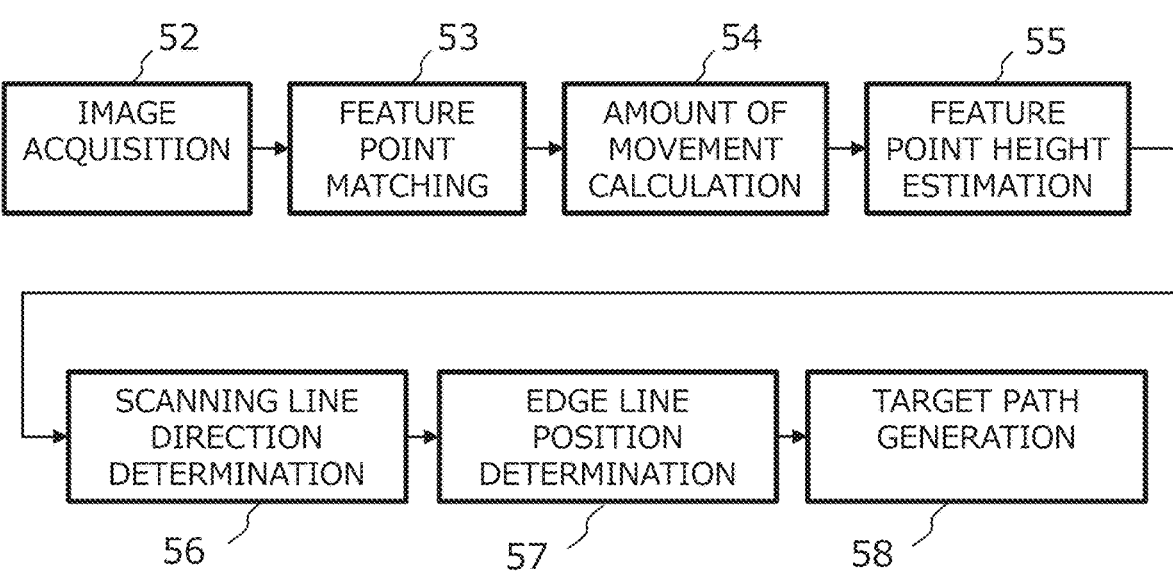
FIG. 41 is a block diagram showing processes that are executed by a processing device according to a second example embodiment of the present disclosure.

FIG. 41 is a block diagram showing a series of processes that are executed by the processing device 122 according to the second example embodiment. As shown in FIG. 41, the processing device 122 executes an image acquisition 52, a feature point matching 53, an amount of movement calculation 54, and a feature point height estimation 55. As a result, for each of a multitude of feature points in the image, an estimated value of height from the reference plane Re can be obtained. A two-dimensional map of such estimated values of height represents a distribution of differences in height of bumps and dents existing on the ground surface 10.

As has been described with respect to the first example embodiment, a plurality of scanning lines are also set in the present example embodiment. In the present example embodiment, however, a mean value of heights of feature points is calculated along each scanning line. Moreover, by varying the direction (angle) of the scanning lines, the direction in which a ridge extends can be found from the distribution of height mean values of feature points. Once the direction in which the ridge 16 extends is determined, edge lines of the ridge 16 can be determined by a method similar to the method of determining the edge lines of a crop row 12. As has been described with reference to FIG. 28 and the like, adopting a method of splitting the image into a plurality of blocks makes it possible to omit a scanning line direction determination 56.

Thus, as shown in FIG. 41, the processing device 122 according to the present example embodiment executes the scanning line direction determination 56, an edge line position determination 57, and a target path generation 58.

Figure 42:
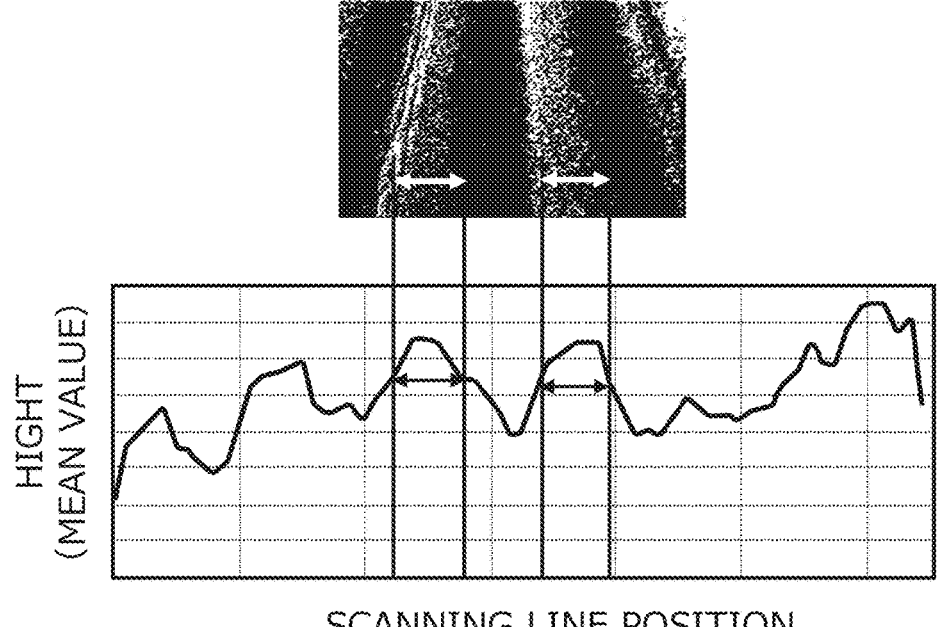
FIG. 42 is a diagram showing a relationship between a mean value of heights of feature points on a scanning line and the position of the scanning line.

FIG. 42 is a diagram showing a relationship between a mean value of heights of feature points on a scanning line that is parallel to the direction in which ridges extend and the position of the scanning line. In the graph of FIG. 42, the horizontal axis represents the positions of scanning lines, whereas the vertical axis represents the height mean value of feature points on each scanning line. As shown by the graph, the height mean value repetitively increases and decreases as the position of the scanning line moves from left to right. Any position at which the height mean value exhibits a peak corresponds to the center of a ridge. Note that the curve indicating the height mean values forms a trough between two adjacent peaks. This trough corresponds to the neighborhood of the center of an intermediate region (interridge land or work path) 14.

In the present example embodiment, the processing device 122 determines, as edge lines of the ridge, positions that are located on opposite sides of the position of a peak as indicated by the height mean values, the positions having a height which accounts for a predetermined rate (e.g., 0.8 times) with respect to the peak. Above the graph of FIG. 42, blank arrows indicating the positions of the edge lines are shown for each of two ridges in the image.

In the present example embodiment, too, as has been described with reference to FIG. 28 to FIG. 35, an image may be split into a plurality of blocks, and mean values of heights of feature points on scanning lines may be determined for each block.

According to the present example embodiment, row detection does not depend on the "color of the crop row", thus providing an advantage of not being susceptible to the kind of crop or the daylighting conditions. It has been confirmed that detection is possible not only for tall ridges, e.g., "high ridges" that are often made in growing vegetables, but also for relatively low ridges whose height is in the range of 5 to 10 centimeters, for example.

The detection of crop rows in the first example embodiment and the detection of ridges in the second example embodiment may be simultaneously or selectively performed by the processing device 122. In the case where crops are planted on the ridges, edge lines of crop rows and edge lines of ridges are determined. The target path for the agricultural machine may be determined based on both kinds of, or one kind of, edge lines.

The processing device 122 may calculate a detection reliability for each of crop row detection and ridge detection. The reliability of crop row detection may be determined based on the distribution of total values of index values shown in FIG. 29, the magnitude of the peak values, etc., for example. The reliability of ridge detection may be determined based on the magnitude of the difference between a local maximum and a local minimum in the height distribution shown in FIG. 42, etc., for example. For instance, in the case where a target path has been generated based on the edge lines of a detected crop row and the agricultural machine is traveling along that target path, ridge detection may be performed in the background so that a target path based on the edge lines of a ridge will be generated at any place where crop row detection is impossible or its reliability has decreased to below a predetermined level.

In the case where the processing device 122 is capable of performing both crop row detection and ridge detection, one of crop row detection and ridge detection, or both, may be performed in accordance with the operator's selection.

In the present example embodiment, too, when starting row-following travel, the image recognition system 1000 may perform a process of selecting an interest region as a target of image recognition processing, such that the interest region during the row-following travel is smaller than the interest region before the row-following travel. Specifically, before the row-following travel, in order to determine positions where following travel is possible, a range that is estimated to include two ridges on both sides from the right and left wheels is selected as an interest region. On the other hand, when starting row-following travel, a range that includes adjacent ridges on both sides of the right and left wheels is selected as an interest region. Thus, during row-following travel, by reducing the interest region before the row-following travel at least along the right-left width direction, such that a relatively narrow range that includes a row region(s) to be followed is selected as the interest region, the computational load of the processing device 122 can be reduced.

Hereinafter, row detection system in an illustrative third example embodiment of the present disclosure will be described. Herein, selection of an interest region will be described in detail.

Figure 43:
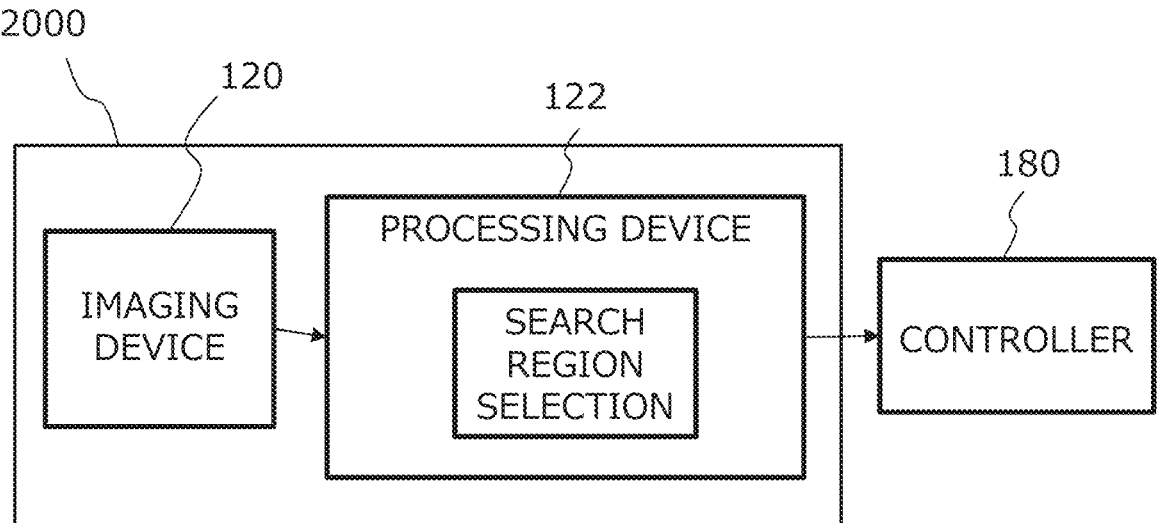
FIG. 43 is a diagram showing an example of a basic configuration of an image recognition system according to a third example embodiment of the present disclosure.

FIG. 43 shows an example of a basic configuration of the image recognition system 1000 according to the present example embodiment. The image recognition system 1000 includes a processing device 122 having a similar hardware configuration to those of the other example embodiments. From time-series images, the processing device 122 selects an interest region in which to detect at least one of crop rows and ridges. This interest region has a size and shape including at least a portion of the wheel(s).

Figure 44:
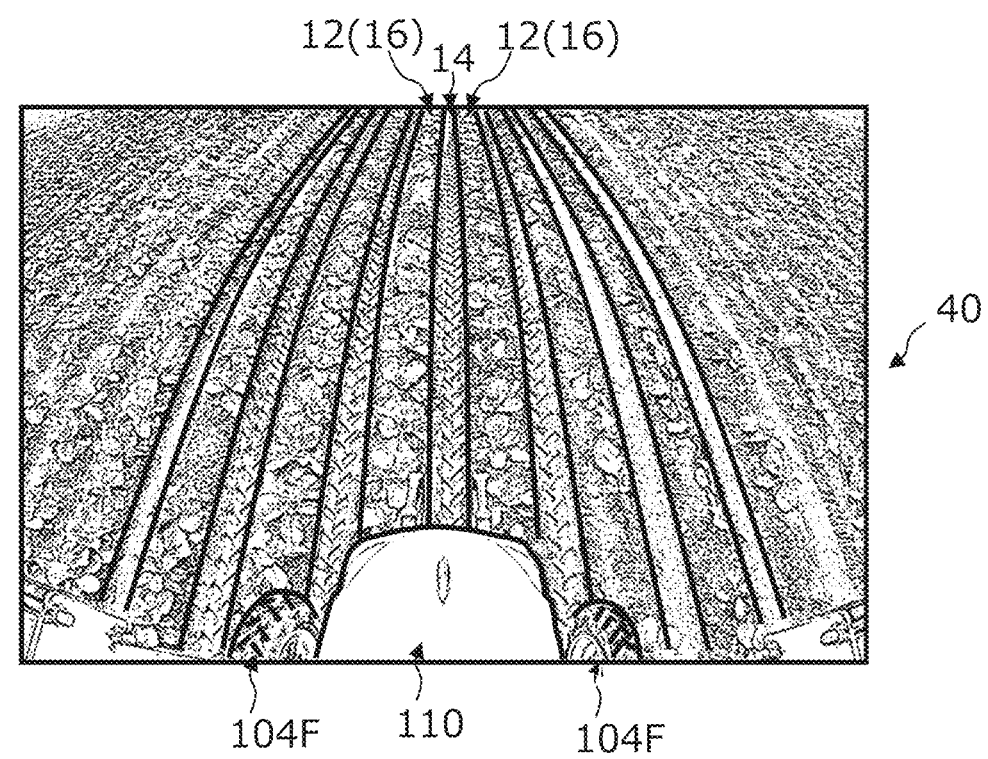
FIG. 44 is a diagram showing an example of an image which the processing device has acquired from the imaging device.

FIG. 44 shows an example of the image 40 acquired by the processing device 122 from the imaging device 120. The image 40 is one of the time-series images. The following appears in this image 40: crop rows 12, intermediate regions 14, a portion of the vehicle body 110 of the agricultural machine 100, and portions of the front wheels 104F. In FIG. 44, for referencing sake, edge lines are indicated by blank lines.

Figure 45:
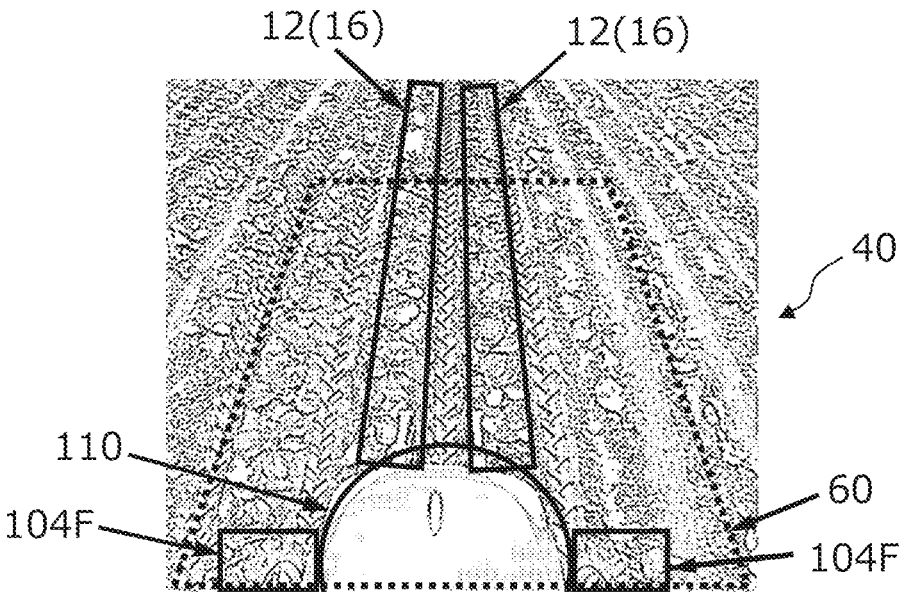
FIG. 45 is a diagram showing a portion of the image of FIG. 44.

FIG. 45 is a diagram showing a portion of the image of FIG. 44. In FIG. 45, the portion of the vehicle body 110 of the agricultural machine 100 and the portions of the front wheels 104F appearing in the image 40 are surrounded by blank lines. In the image 40 of FIG. 45, an example of an interest region 60 is indicated by a trapezoid of broken lines including the portions of the front wheels 104F. The interest region 60 has a shape that contains, among at least one of the crop rows and the ridges existing in the image 40, a crop row or ridge that is located on a left side of the front wheels 104F over to a crop row or ridge that is located on a right side of the front wheels 104F.

As can be seen from the image exemplified in FIG. 19, peripheral portions suffer from more distortion than does the central portion in a plan view image. Therefore, as shown in FIG. 26, for example, the peak value becomes lower and the interval between peaks becomes broader as the scanning line position becomes more distant from the central portion.

On the other hand, the crop rows or ridges to be detected, which are needed for selecting a target path, are around the front of the traveling agricultural machine. More specifically, it suffices to accurately detect crop rows or ridges that are located near the wheels included in the traveling equipment of the agricultural machine. In the present example embodiment, row detection is performed not with respect to the entire image that is acquired by the imaging device 120, but only in a partial region, whereby the amount of computation to be performed by the processing device 122 and the time required for computation can be reduced. Because outliers caused by distortion at the image periphery can be eliminated, the accuracy of row detection is enhanced.

The selection of the interest region 60 (region setting) depends on the position and orientation in which the imaging device 120 is mounted to the agricultural machine 100, and also on the structure or shape of the agricultural machine 100. For example, after the imaging device 120 is mounted to the agricultural machine 100, the range (shape, size, position) of the interest region 60 may be manually determined while confirming the image obtained from the imaging device 120 on a monitor screen. Based on the optical performance and mounted position of the imaging device

120, the particular model of the agricultural machine, etc., the range of the interest region 60 may be finalized and input to the processing device 122.

The processing device 122 according to the present example embodiment may be configured or programmed to detect at least a portion of the wheels 10F from the image 40 as shown in FIG. 45 by using an image recognition technique, for example. In that case, it may also be possible to adaptively change the range of the interest region 60 so as to select a region including at least the detected portions of the front wheels 104F as the interest region 60.

The processing device 122 may estimate a positional relationship between the at least detected one of crop rows 12 and ridges 16 and the front wheels 104F based on an image of the portions of the front wheels 104F that are included in the interest region 60. The processing device 122 may be configured or programmed to estimate a positional relationship between the at least detected one of crop rows 12 and ridges 16 and the agricultural machine 100 based on such a positional relationship.

Note that the processing device 122 may not possess any information indicating accurate positions of the front wheels 104F relative to the agricultural machine 100. Such information indicating positions may be coordinates of the front wheels 104F relative to the body coordinate system Σb fixed to the agricultural machine 100, for example. Even when such coordinates are previously stored in the storage device 28 of the processing device 122, its accuracy may be compromised if the operator changes the tire size of the front wheels 104F or changes the interval between the right and left front wheels 104F, for example. In such cases, the processing device 122 may detect portions of the front wheels 104F that are included in the interest region 60, and based on an image of the detected portions of the front wheels 104F, estimate the positions of the front wheels 104F relative to the agricultural machine 100.

Figure 46:
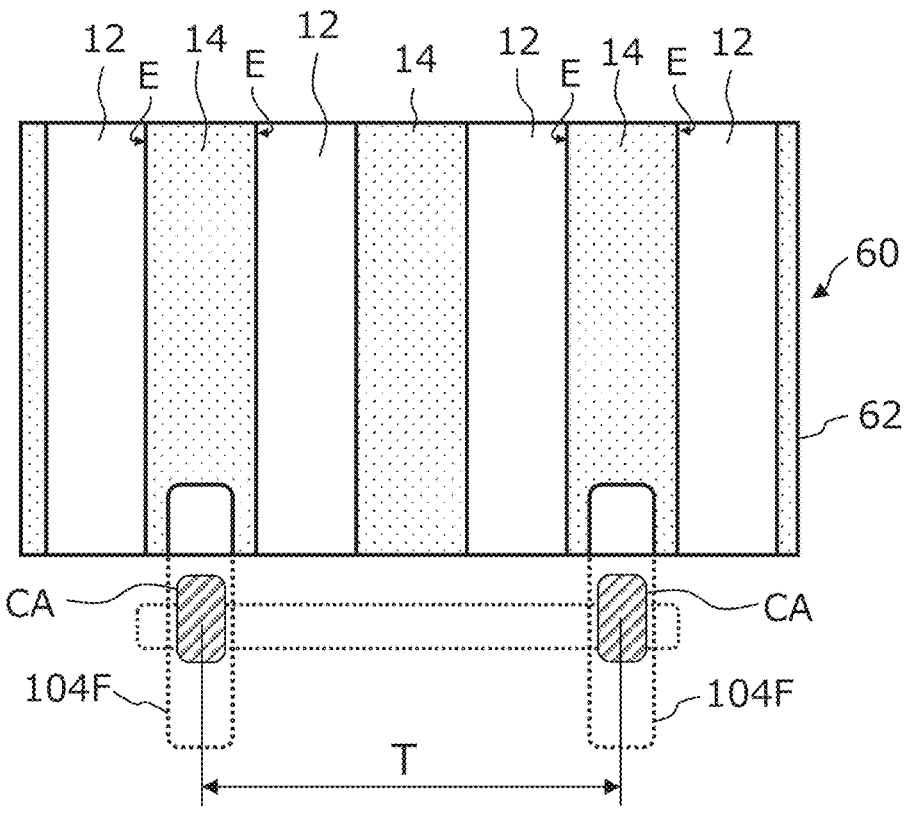
FIG. 46 is a top view schematically showing a portion of the ground surface in which crop rows are made.

FIG. 46 is a top view schematically showing a portion of the ground surface 10 in which crop rows 12 are made. A pair of front wheels 104F are shown in FIG. 46. The rectangular area 62 in such a top view is a plan view image that is generated by applying the aforementioned homography transformation to the interest region 60 of the image of FIG. 45. In FIG. 46, the vehicle body 110 appearing in the interest region 60 of FIG. 45 is omitted from illustration. Also, because images of the portions of the front wheels 104F appearing in the interest region 60 will be considerably deformed through homography transformation, FIG. 46 illustrates the front wheels 104F with the shapes of figures that have just undergone "parallel projection" onto the reference plane Re. Furthermore, for referencing sake, FIG. 46 schematically shows tire treads (ground plane) CA at which the front wheels 104F come in contact with the ground surface 10. The distance T between centers of the right and left tire treads CA is the "tread width (track)".

In general, relative to the vehicle body 110 of the agricultural machine 100, positions of the tire treads CA are known. Therefore, the positional relationship of the tire treads CA with the plan view image (rectangular area) 62 of the interest region 60 is also known. However, setting the interest region 60 so as to contain at least a portion of one or more wheels as in the present example embodiment can provide the following effects.

The structure of the vehicle body 110 may differ from model to model, and also the tread width (distance between centers of tire treads CA) T may differ from model to model. Even within the same model, the operator may change the tread width T as aforementioned. Therefore, selecting the shape and size of the interest region 60 so as to contain the wheels 104 appearing in the image will realize an image processing that can cope with various models, and cope with changes in the tread width T that may be made by the operator.

It is no longer required to input the positions of the tire treads CA as coordinates in the body coordinate system $\Sigma b$ in advance. It becomes possible to automatically acquire coordinates of the front wheels 104F or the tire treads CA in the body coordinate system $\Sigma b$ based on an image that is acquired by the imaging device 120.

On the basis of an image, it becomes possible to monitor a positional error between the edge lines of a row determined by the image recognition system or a target path that is generated based on the edge lines, and the wheels.

Note that, as mentioned earlier, the wheels will be deformed when a plan view image of the ground surface is generated through homography transformation. In order to accurately estimate a positional relationship of the wheels (in particular tire treads CA) with the edge lines of a row or a target path, it is desirable to correct the homography transformation. Hereinafter, this aspect will be described.

Figure 47:
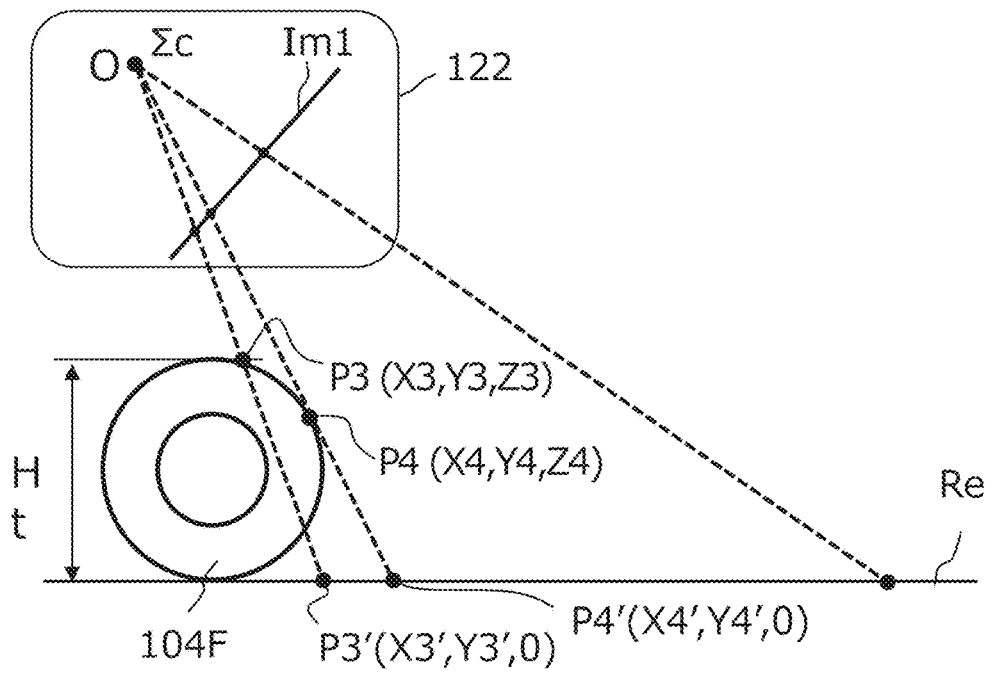
FIG. 47 is a diagram schematically showing a positional relationship between: points P3 and P4 which are included in portions of front wheels appearing in an image; and corresponding points P3' and P4' on the reference plane Re.

FIG. 47 is a diagram schematically showing a positional relationship between points P3 and P4 which are included in portions of the front wheels 104F appearing in the image 40, and corresponding points P3' and P4' resulting through perspective projection of these points P3 and P4 onto the reference plane Re. It is assumed that the points P3 and P4 have coordinates (X3,Y3,Z3) and (X4,Y4,Z4), respectively, in the world coordinate system. It is also assumed that the corresponding points P3' and P4' have coordinates (X3',Y3', 0) and (X4',Y4',0), respectively, in the world coordinate system. As can be seen from FIG. 47, the points P3 and P4 are at higher positions than the reference plane Re. Therefore, if a plan view image as viewed directly from above the reference plane Re is generated through homography transformation, the X coordinates and Y coordinates of the corresponding points P3' and P4' on the reference plane Re will respectively be shifted from the X coordinates and Y coordinates of the points P3 and P4. Therefore, if a plan view image is generated by applying homography transformation to the image 40 having portions of the front wheels 104F appearing therein, images of the front wheels 104F will appear in distorted shapes in the plan view image, thus making it difficult to estimate an accurate positional relationship.

In order to know the positional relationship between front wheels 104F and the edge lines of a crop row 12 or a ridge 16 based on such a plan view image, it is preferable to estimate the centers of the tire treads CA based on the coordinates (X3',Y3',0) and (X4',Y4',0) of the corresponding points P3' and P4'.

In the example of FIG. 47, if the height Ht of the front wheels 104F is known, then the positions, as taken on the front wheels 104F, of the points P3 and P4 on the front wheels 104F as appearing in the image can be estimated from their shapes in the image, for example, by a technique such as pattern matching. Once the positions of the points P3 and P4 on the front wheels 104F are estimated, it is possible to estimate the center positions of the tire treads CA by correcting the coordinates (X3',Y3',0) and (X4',Y4',0) of the corresponding points P3' and P4', for example.

Thus, in the present example embodiment, by including at least a portion of the wheel(s) in the interest region, it becomes possible to monitor the relative locations of the wheels relative to a row that has been detected from within the interest region, on the basis of time-series images.

Next, an example embodiment of an agricultural machine having an image recognition system of Example Embodiments 1 to 3 will be described. Note that the procedure or algorithm of row detection by the image recognition system is not limited to the procedure or algorithms described with respect to Example Embodiments 1 to 3 above.

An agricultural machine according to the present example embodiment includes the above-described image recognition system. Moreover, this agricultural machine includes a control system for performing control to achieve auto-steer driving. The control system is a computer system that includes a storage device and a controller, and is configured or programmed to control steering, travel, and other operations of the agricultural machine.

In a usual automatic steering operation mode, the controller may be configured or programmed to identify the position of the agricultural machine by using the positioning device, and, based on a target path which has been generated in advance, control the steering of the agricultural machine so that the agricultural machine travels along the target path. Specifically, it may control the steering angle of the wheels responsible for steering (e.g., the front wheels) of the agricultural machine so that the work vehicle travels along the target path within the field. The agricultural machine according to the present example embodiment includes an automatic steering device which performs not only such a usual automatic steering mode, but also travel under "row-following control" within any field in which rows of crops or ridges are made.

The positioning device includes a GNSS receiver, for example. Such a positioning device is able to identify the position of the work vehicle based on signals from GNSS satellites. However, when there are rows in the field, even if the positioning device is able to measure the position of the agricultural machine with a high accuracy, the interspaces between rows are narrow, such that the traveling equipment, e.g., wheels, of the agricultural machine may be liable to protrude into the rows depending on how the crops are planted or depending on the state of growth. In the present example embodiment, however, the aforementioned image recognition system can be used to detect actually-existing rows and perform appropriate automatic steering. In other words, the automatic steering device included in the agricultural machine (controller) according to an example embodiment of the present disclosure is configured or programmed to control the steering angle of the wheels responsible for steering based on the positions of the edge lines of a row that are determined by the image recognition system.

Moreover, in the agricultural machine according to the present example embodiment, the processing device of the image recognition system can monitor the positional relationship between the edge lines of rows and the wheels responsible for steering on the basis of time-series color images. By generating a positional error signal from this positional relationship, it becomes possible for the automatic steering device of the agricultural machine to appropriately adjust the steering angle so as to reduce the positional error signal.

Figure 48:
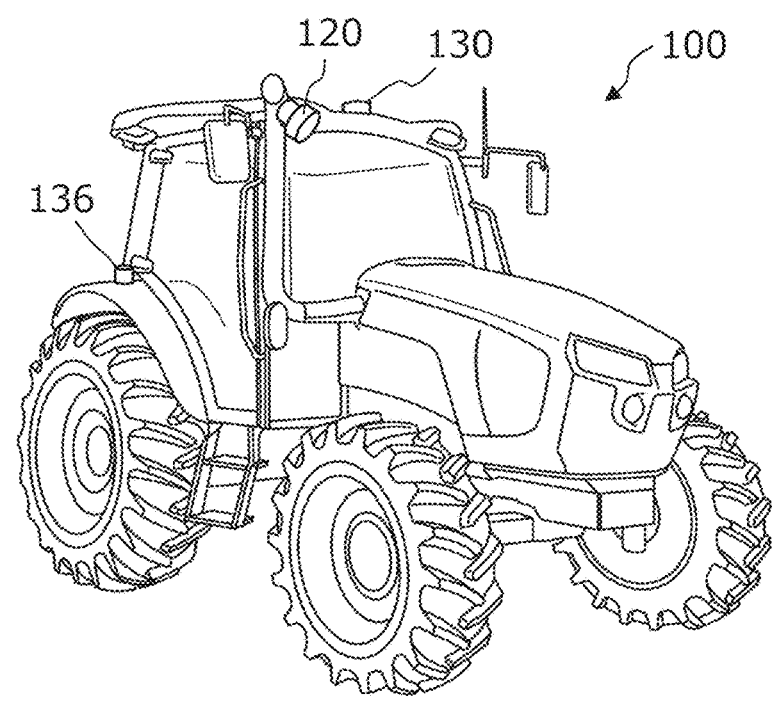
FIG. 48 is a perspective view showing an example appearance of an agricultural machine according to an example embodiment of the present disclosure.
Figure 49:
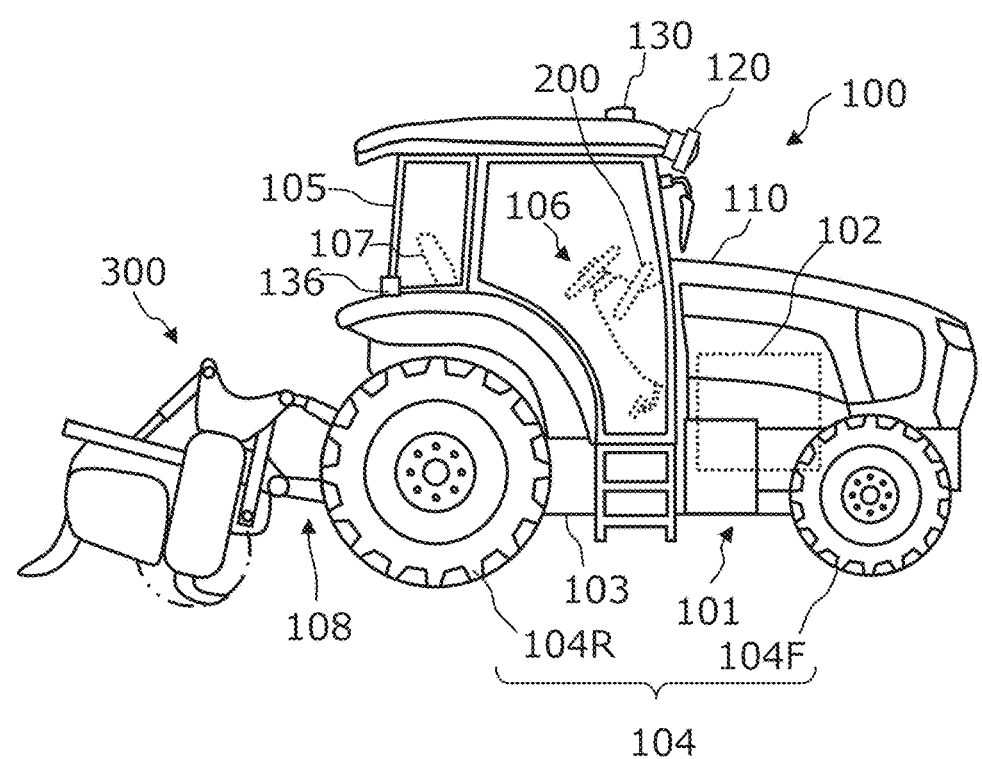
FIG. 49 is a side view schematically showing an example of the agricultural machine to which an implement is attached.

FIG. 48 is a perspective view showing an example appearance of the agricultural machine 100 according to the present example embodiment. FIG. 49 is a side view schematically showing an example of the agricultural machine 100 to which an implement 300 is attached. The agricultural machine 100 according to the present example embodiment is an agricultural tractor (work vehicle) having the implement 300 attached thereto. The agricultural machine 100 is not limited to a tractor, and does not need to have the implement 300 attached thereto. The row detection technique according to the present disclosure can exhibit excellent effects when used in small-sized crop management machines and vegetable transplanters that may be used for tasks associated with the interridge land, such as ridge making, intertillage, ridging, weeding, side dressing, and preventive pest control, for example.

The agricultural machine 100 according to the present example embodiment includes an imaging device 120 and an obstacle sensor(s) 136. Although one obstacle sensor 136 is illustrated in FIG. 48, obstacle sensors 136 may be provided at a plurality of positions of the agricultural machine 100.

As shown in FIG. 49, the agricultural machine 100 includes a vehicle body 110, a prime mover (engine) 102, and a transmission 103. On the vehicle body 110, wheels 104 and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. The switches may include the start switch 112, the mode switch 114, and the command generator 119 shown in FIG. 1 and FIG. 7. Either one or both of the front wheels 104F and the rear wheels 104R may be replaced by a wheel(s) with a track(s) attached thereon (a crawler(s)), rather than a tired wheel(s). The agricultural machine 100 is a four-wheel drive vehicle including four wheels 104 as driving wheels, or a two-wheel drive vehicle including a pair of front wheels 104F or a pair of rear wheels 104R as driving wheels.

The positioning device 130 in the present example embodiment includes a GNSS receiver. The GNSS receiver includes an antenna to receive a signal(s) from a GNSS satellite(s) and a processing circuit to determine the position of the agricultural machine 100 based on the signal(s) received by the antenna. The positioning device 130 receive a GNSS signal(s) transmitted from a GNSS satellite(s), and performs positioning on the basis of the GNSS signal(s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 130 in the present example embodiment is disposed above the cabin 105, it may be disposed at any other position.

Furthermore, the positioning device 130 may complement the position data by using a signal from an inertial measurement unit (IMU). The IMU can measure tilts and minute motions of the agricultural machine 100. By complementing the position data based on the GNSS signal using the data acquired by the IMU, the positioning performance can be improved.

In the examples shown in FIGS. 48 and 49, the obstacle sensor(s) 136 is provided at the rear of the vehicle body 110. The obstacle sensor(s) 136 may be disposed at any other position than the rear of the vehicle body 110. For example, one or more obstacle sensors 136 may be disposed at any position selected from among the sides of the vehicle body 110, the front of the vehicle body 110, and the cabin 105. The obstacle sensor(s) 136 detects objects around the agricultural machine 100. Each obstacle sensor 136 may include a laser scanner and/or an ultrasonic sonar, for example. When an obstacle exists at a position within a predetermined detection area (search area) from the obstacle sensor 136, the obstacle sensor 136 outputs a signal indicating the presence of an obstacle. A plurality of obstacle sensors 136 may be provided at different positions of the body of the agricultural machine 100. For example, a plurality of laser scanners and a plurality of ultrasonic sonars may be disposed at different positions of the body. Providing a multitude of obstacle sensors 136 can reduce blind spots in monitoring obstacles around the agricultural machine 100.

The prime mover 102 may be a diesel engine, for example. Instead of a diesel engine, an electric motor may be used. The transmission 103 can change the propulsion and moving speed of the agricultural machine 100 through a speed changing mechanism. The transmission 103 can also switch between forward travel and backward travel of the agricultural machine 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the agricultural machine 100. During manual steering, the steering angle of the front wheels 104F can be changed as the operator manipulates the steering wheel. The power steering device includes a hydraulic device or an electric motor to supply an assisting force for changing the steering angle of the front wheels 104F. When automatic steering is performed, under the control of a controller disposed in the agricultural machine 100, the steering angle may be automatically adjusted by the power of the hydraulic device or electric motor (steering motor).

A linkage device 108 is provided at the rear of the vehicle body 110. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the agricultural machine 100. The linkage device 108 is able to raise or lower the three-point linkage device with a hydraulic device, for example, thus controlling the position or pose of the implement 300. Moreover, motive power can be sent from the agricultural machine 100 to the implement 300 via the universal joint. While towing the implement 300, the agricultural machine 100 allows the implement 300 to perform a predetermined task. The linkage device may be provided frontward of the vehicle body 110. In that case, the implement may be connected frontward of the agricultural machine 100.

The implement 300 shown in FIG. 49 is a rotary cultivator, for example. The implement 300 to be towed by or attached to a tractor or other work vehicles when traveling in a manner of following rows may be any kind, so long as it is used in operations associated with the interridge land, such as ridge making, intertillage, ridging, weeding, side dressing, and preventive pest control.

Figure 50:
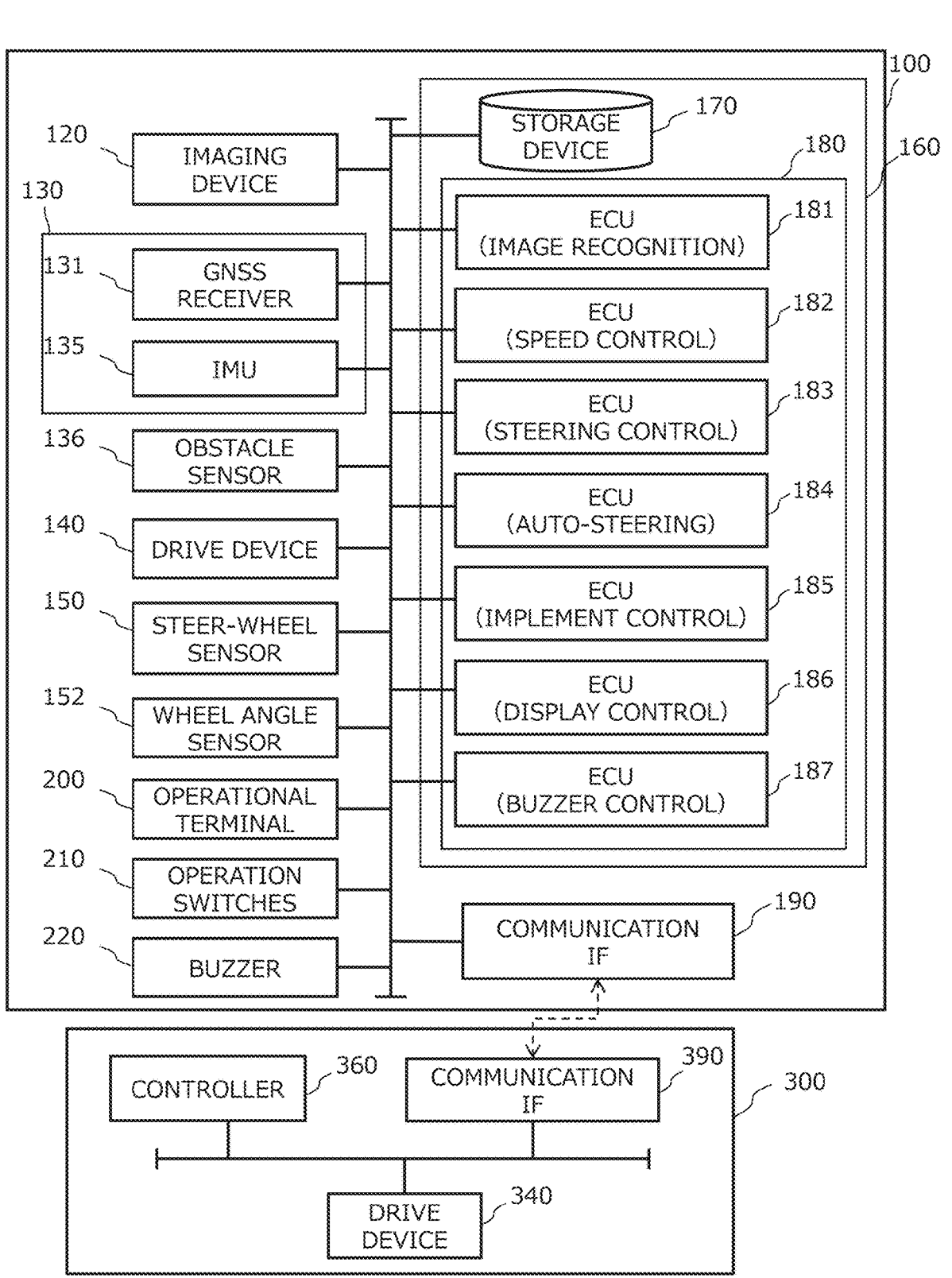
FIG. 50 is a block diagram showing an example of a schematic configuration of an agricultural machine and an implement.

FIG. 50 is a block diagram showing an example of a schematic configuration of the agricultural machine 100 and the implement 300. The agricultural machine 100 and the implement 300 can communicate with each other via a communication cable that is included in the linkage device 108.

In addition to the imaging device 120, the positioning device 130, the obstacle sensor 136, and the operational terminal 200, the agricultural machine 100 in the example of FIG. 50 includes a drive device 140, a steering wheel sensor 150, an angle-of-turn sensor (wheel angle sensor) 152, a control system 160, a communication interface (IF) 190, operation switches 210, and a buzzer 220. The positioning device 130 includes a GNSS receiver 131, an RTK receiver 122, and an inertial measurement unit (IMU) 125. The control system 160 includes a storage device 170 and a controller 180. The controller 180 includes a plurality of electronic control units (ECU) 181 to 186. The implement 300 includes a drive device 340, a controller 380, and a communication interface (IF) 390. Note that FIG. 50 shows component elements which are relatively closely related to the operation of automatic steering or self-driving by the agricultural machine 100, while other component elements are omitted from illustration.

The positioning device 130 performs positioning of the agricultural machine 100 by utilizing GNSS. In the case where the positioning device 130 includes a RTK receiver, not only GNSS signals transmitted from multiple GNSS satellites, but also a correction signal that is transmitted from a reference station is used. The reference station may be disposed around the field that is traveled by the agricultural machine 100 (e.g., at a position within 10 km of the agricultural machine 100). The reference station generates a correction signal based on the GNSS signals received from the multiple GNSS satellites, and transmits the correction signal to the positioning device 130. The GNSS receiver 131 in the positioning device 130 receives the GNSS signals transmitted from the multiple GNSS satellites. Based on the GNSS signals and the correction signal, the positioning device 130 calculates the position of the agricultural machine 100, thus achieving positioning. Use of an RTK-GNSS enables positioning with an accuracy on the order of several cm of errors, for example. Positional information (including latitude, longitude, and altitude information) is acquired through the highly accurate positioning by an RTK-GNSS. Note that the positioning method is not limited to an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System).

The IMU 135 includes a 3-axis accelerometer and a 3-axis gyroscope. The IMU 135 may include a direction sensor such as a 3-axis geomagnetic sensor. The IMU 135 functions as a motion sensor which can output signals representing parameters such as acceleration, velocity, displacement, and pose of the agricultural machine 100. Based not only on the GNSS signals and the correction signal but also on a signal that is output from the IMU 135, the positioning device 130 can estimate the position and orientation of the agricultural machine 100 with a higher accuracy. The signal that is output from the IMU 135 may be used for the correction or complementation of the position that is calculated based on the GNSS signals and the correction signal. The IMU 135 outputs a signal more frequently than the GNSS signals. Utilizing this highly frequent signal allows the position and orientation of the agricultural machine 100 to be measured more frequently (e.g., about 10 Hz or above). Instead of the IMU 135, a 3-axis accelerometer and a 3-axis gyroscope may be separately provided. The IMU 135 may be provided as a separate device from the positioning device 130.

In addition to or instead of the GNSS receiver 131 and the IMU 135, the positioning device 130 may include other kinds of sensors. Depending on the environment that is traveled by the agricultural machine 100, it is possible to estimate the position and orientation of the agricultural machine 100 with a high accuracy based on data from such sensors.

By using the positioning device 130 as such, it is possible to generate a map of crop rows and ridges as detected by the aforementioned image recognition system 1000.

For example, the drive device 140 may include various devices that are needed for the traveling of the agricultural machine 100 and the driving of the implement 300, e.g., the aforementioned prime mover 102, transmission 103, differential including a locking differential mechanism, steering device 106, and linkage device 108. The prime mover 102 includes an internal combustion engine such as a diesel engine. Instead of an internal combustion engine or in addition to an internal combustion engine, the drive device 140 may include an electric motor that is dedicated to traction purposes.

The steering wheel sensor 150 measures the angle of rotation of the steering wheel of the agricultural machine 100. The angle-of-turn sensor 152 measures the angle of turn of the front wheels 104F, which are the wheels responsible for steering. Measurement values by the steering wheel sensor 150 and the angle-of-turn sensor 152 are used for the steering control by the controller 180.

The storage device 170 includes one or more storage media such as a flash memory or a magnetic disc. The storage device 170 stores various data that is generated by the sensors and the controller 180. The data that is stored by the storage device 170 may include map data in the environment that is traveled by the agricultural machine 100, and data of a target path of automatic steering. The storage device 170 also stores a computer program(s) to cause the ECUs in the controller 180 to perform various operations to be described later. Such a computer program(s) may be provided for the agricultural machine 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs include an ECU 181 for image recognition, an ECU 182 for speed control, an ECU 183 for steering control, an ECU 184 for automatic steering control, an ECU 185 for implement control, an ECU 186 for display control, and an ECU 187 for buzzer control. The ECU 181 for image recognition functions as a processing device of the image recognition system. The ECU 182 controls the prime mover 102, the transmission 103, and the brakes included in the drive device 140, thus controlling the speed of the agricultural machine 100. The ECU 183 controls the hydraulic device or electric motor included in the steering device 106 based on a measurement value of the steering wheel sensor 150, thus controlling the steering of the agricultural machine 100. The ECU 184 performs computations and controls for achieving auto-steer driving, based on signals which are output from the positioning device 130, the steering wheel sensor 150, and the angle-of-turn sensor 152. During auto-steer driving, the ECU 184 sends the ECU 183 a command to change the steering angle. In response to this command, the ECU 183 controls the steering device 106 to change the steering angle. In order to cause the implement 300 to perform a desired operation, the ECU 185 controls the operation of the linkage device 108. Also, the ECU 185 generates a signal to control the operation of the implement 300, and transmits this signal from the communication IF 190 to the implement 300. The ECU 186 controls displaying on the operational terminal 200. For example, the ECU 186 may cause a display device of the operational terminal 200 to present various indications, e.g., a map of the field, detected crop rows or ridges, the position of the agricultural machine 100 and a target path in the map, pop-up notifications, and setting screens. The ECU 187 controls outputting of alarm sounds by the buzzer 220.

Through the action of these ECUs, the controller 180 realizes driving via manual steering or automatic steering. During usual auto-steer driving, the controller 180 controls the drive device 140 based on the position of the agricultural machine 100 as measured or estimated by the positioning device 130 and the target path stored in the storage device 170. As a result, the controller 180 causes the agricultural machine 100 to travel along the target path. On the other hand, in a row-following control mode where travel is done along the rows, the ECU 181 for image recognition determines from a detected crop row or ridge the edge lines of the crop row or ridge, and generates a target path based on these edge lines. The controller 180 performs an operation in accordance with this target path.

The plurality of ECUs included in the controller 180 may communicate with one another according to a vehicle bus standard such as CAN (Controller Area Network). Although the ECUs 181 to 187 are illustrated as individual corresponding blocks in FIG. 50, each of these functions may be implemented by a plurality of ECUs. Alternatively, an onboard computer that integrates the functions of at least some of the ECUs 181 to 187 may be provided. The controller 180 may include ECUs other than the ECUs 181 to 187, and any number of ECUs may be provided in accordance with functionality. Each ECU includes a control circuit including one or more processors.

The communication IF 190 is a circuit that performs communications with the communication IF 390 of the implement 300. The communication IF 190 performs exchanges of signals complying with an ISOBUS standard such as ISOBUS-TIM, for example, between itself and the communication IF 390 of the implement 300. This causes the implement 300 to perform a desired operation, or allows information to be acquired from the implement 300. Moreover, the communication IF 190 can communicate with an external computer via a wired or wireless network. The external computer may be a server computer in a farming support system which centralizes management of information concerning fields by using a cloud, and assists in agriculture by utilizing the data on the cloud, for example.

The operational terminal 200 is a terminal for the operator to perform a manipulation related to the traveling of the agricultural machine 100 and the operation of the implement 300, and may also be referred to as a virtual terminal (VT). The operational terminal 200 may include a display device such as a touch screen panel, and/or one or more buttons. By manipulating the operational terminal 200, the operator can perform various manipulations, such as switching ON/OFF the automatic steering mode, switching ON/OFF the cruise control, setting an initial position of the agricultural machine 100, setting a target path, recording or editing a map, switching between 2WD/4WD, switching ON/OFF the locking differential, and switching ON/OFF the implement 300. At least some of these manipulations can also be realized by manipulating the operation switches 210. Displaying on the operational terminal 200 is controlled by the ECU 186.

The buzzer 220 is an audio output device to present an alarm sound for alerting the operator of an abnormality. For example, during auto-steer driving, the buzzer 220 may present an alarm sound when the agricultural machine 100 has deviated from the target path by a predetermined distance or more. While row-following travel is not possible, the buzzer 220 may make an alarm sound when the operator manipulates the start switch 112 to issue a command to start row-following travel. Instead of the buzzer 220, a loudspeaker of the operational terminal 200 may provide a similar function. The buzzer 220 is controlled by the ECU 186.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the agricultural machine 100 via the communication IF 390, the controller 380 causes the drive device 340 to perform various operations. Moreover, a signal that is in accordance with the state of the implement 300 may be transmitted from the communication IF 390 to the agricultural machine 100.

In the above example embodiments, the agricultural machine 100 may be an unmanned work vehicle which performs self-driving. In that case, component elements which are only required for human driving, e.g., the cabin, the driver's seat, the steering wheel, and the operational terminal, do not need to be provided in the agricultural machine 100. The unmanned work vehicle may perform a similar operation to the operation according to any of the above example embodiments via autonomous driving, or by remote manipulations by an operator.

Systems that provide the various functions according to example embodiments can be mounted to agricultural machines lacking such functions as an add-on. Such systems may be manufactured and sold independently from the agricultural machine. A computer program for use in such a system may also be manufactured and sold independently from the agricultural machine. The computer program may be provided in a form stored in a computer-readable, non-transitory storage medium, for example. The computer program may also be provided through downloading via telecommunication lines (e.g., the Internet).

The techniques according to example embodiments of the present disclosure can be applied to agricultural machines, such as vehicles for crop management, vegetable transplanters, or tractors, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:

an image recognition system to detect, from an acquired image, a row region including at least one of a crop and a ridge on a ground surface of a field;

traveling equipment including a wheel responsible for steering;

a controller configured or programmed to control the traveling equipment; and a start switch to give a command to start row-following travel during which the controller is configured or programmed to control the traveling equipment to travel along the row region as detected by the image recognition system; wherein the controller is configured or programmed to determine whether row-following travel is possible or not based on a result of detection by the image recognition system, and if the row-following travel is possible, start row-following travel in response to the command from the start switch to start row-following travel, and if row-following travel is not possible, does not start row-following travel even in the presence of the command from the start switch to start row-following travel.

2. The agricultural machine of claim 1, further comprising a notifier to notify an operator as to whether row-following travel is possible or not.

3. The agricultural machine of claim 1, wherein, when the image recognition system detects the row region and also detects a work path region having a predetermined width or greater on both sides or one side of the row region, the controller is configured or programmed to determine whether the wheel responsible for steering is able to pass through the work path region or not based on a position of the wheel responsible for steering, and when deciding that the wheel responsible for steering is able to pass through the work path region, the controller is configured or programmed to determine that row-following travel is possible.

4. The agricultural machine of claim 3, wherein the controller is configured or programmed to determine that row-following travel is possible when an orientation of the wheel responsible for steering makes an angle of a predetermined value or smaller with respect to the row region.

5. The agricultural machine of claim 1, further comprising a mode switch to switch between an automatic steering mode and a manual steering mode; wherein when the automatic steering mode is selected with the mode switch, the controller is configured or programmed to permit row-following travel to be started with the start switch.

6. The agricultural machine of claim 5, wherein, when the automatic steering mode is selected with the mode switch, the image recognition system starts image recognition processing to detect the row region.

7. An agricultural machine comprising:

an image recognition system to detect, from an acquired image, at least one of a crop and a ridge on a ground surface of a field, and to determine a row region based on the at least one of a crop and a ridge detected;

traveling equipment including a wheel responsible for steering;

a command generator to command the image recognition system to perform computation to determine the row region with the image recognition system; and a controller configured or programmed to perform row-following travel by causing the traveling equipment to travel along the row region as determined by the image recognition system; wherein the image recognition system, when a command for the computation is given by the command generator, is configured or programmed to:

select, from the image, an interest region as a target of the computation, and start a first process before the row-following travel to detect at least one of the crop and the ridge;

upon detecting at least one of the crop and the ridge, start a second process, in response to a command from an operator to start the row-following travel, to determine the row region; and set the interest region during the row-following travel to be smaller than the interest region before the row-following travel.

8. The agricultural machine of claim 7, wherein, when a command for the computation has been provided by the command generator, the controller is configured or programmed to perform a determination process as to whether the row-following travel is possible or not based on the at least one of a crop and a ridge detected.

9. The agricultural machine of claim 7, wherein the image recognition system is operable to select an interest region as a target of image recognition processing, such that the interest region during the row-following travel is smaller than the interest region before the row-following travel.

10. The agricultural machine of claim 7, wherein, when a command for the computation is provided by the command generator, the image recognition system selects from the image a region as a target of the computation, and starts the computation.

11. The agricultural machine of claim 7, wherein, in addition to commanding that the computation be performed, the command generator also provides the command to start row-following travel.

12. The agricultural machine of claim 7, further comprising a mode switch to switch between an automatic steering mode and a manual steering mode, wherein, when the mode switch has switched to the automatic steering mode and if the command generator has provided a command to perform the computation, the controller is configured or programmed to perform the row-following travel.

* * * * *